United States Patent
Finnerty et al.

(10) Patent No.: US 9,627,700 B2
(45) Date of Patent: *Apr. 18, 2017

(54) LIQUID FUEL CPOX REFORMER AND FUEL CELL SYSTEMS, AND METHODS OF PRODUCING ELECTRICITY

(71) Applicant: Watt Fuel Cell Corp., Mount Pleasant, PA (US)

(72) Inventors: Caine M. Finnerty, Port Washington, NY (US); Paul DeWald, Scottdale, PA (US)

(73) Assignee: WATT Fuel Cell Corp., Mount Pleasant, PA (US)

(*) Notice: Subject to any disclaimer, the term of this patent is extended or adjusted under 35 U.S.C. 154(b) by 267 days.

This patent is subject to a terminal disclaimer.

(21) Appl. No.: 14/533,803

(22) Filed: Nov. 5, 2014

(65) Prior Publication Data
US 2016/0254557 A1    Sep. 1, 2016

Related U.S. Application Data

(60) Provisional application No. 61/900,529, filed on Nov. 6, 2013.

(51) Int. Cl.
*B01J 7/00* (2006.01)
*C01B 3/36* (2006.01)
(Continued)

(52) U.S. Cl.
CPC .......... *H01M 8/0631* (2013.01); *B01J 4/001* (2013.01); *B01J 4/002* (2013.01); *B01J 4/005* (2013.01);
(Continued)

(58) Field of Classification Search
CPC .................. C01B 3/386; C01B 2203/0261
See application file for complete search history.

(56) References Cited

U.S. PATENT DOCUMENTS 2,945,077 A    7/1960  Polk
3,518,284 A    6/1970  Foster
(Continued)

FOREIGN PATENT DOCUMENTS

EP    1382382 A1    1/2004
EP    1787950 A2    5/2007
(Continued)

OTHER PUBLICATIONS

Caine Finnerty, Geoff A. Tompesett, Kevin Kandall, R. Mark Ormerod SOFC System with Integrated Catalytic Fuel Processing, Accepted Nov. 24, 1999, pp. 459-463, vol. 88 (2000), Journal of Power Sources. Staffordshire, England.
(Continued)

*Primary Examiner* — Imran Akram
(74) *Attorney, Agent, or Firm* — Dilworth & Barrese, LLP.; Michael J. Musella

(57) ABSTRACT

Integrated liquid fuel catalytic partial oxidation (CPOX) reformer and fuel cell systems can include a plurality or an array of spaced-apart CPOX reactor units, each reactor unit including an elongate tube having a gas-permeable wall with internal and external surfaces, the wall enclosing an open gaseous flow passageway with at least a portion of the wall having CPOX catalyst disposed therein and/or comprising its structure. The catalyst-containing wall structure and open gaseous flow passageway enclosed thereby define a gaseous phase CPOX reaction zone, the catalyst-containing wall section being gas-permeable to allow gaseous CPOX reaction mixture to diffuse therein and hydrogen rich product reformate to diffuse therefrom. The liquid fuel CPOX reformer also can include a vaporizer, one or more igniters, and a source of liquid reformable fuel. The hydrogen-rich reformate can be converted to electricity within a fuel cell unit integrated with the liquid fuel CPOX reactor unit.

41 Claims, 22 Drawing Sheets

(51) Int. Cl.

| | |
|---|---|
| *H01M 8/0612* | (2016.01) |
| *B01J 12/00* | (2006.01) |
| *B01J 19/24* | (2006.01) |
| *B01J 4/00* | (2006.01) |
| *C01B 3/32* | (2006.01) |
| *C01B 3/38* | (2006.01) |
| *H01M 8/04302* | (2016.01) |
| *H01M 8/04007* | (2016.01) |
| *H01M 8/0432* | (2016.01) |
| *H01M 8/0438* | (2016.01) |
| *H01M 8/04791* | (2016.01) |

(52) U.S. Cl.
CPC ......... *B01J 12/007* (2013.01); *B01J 19/2425* (2013.01); *C01B 3/323* (2013.01); *C01B 3/386* (2013.01); *H01M 8/04037* (2013.01); *H01M 8/04302* (2016.02); *H01M 8/04328* (2013.01); *H01M 8/04335* (2013.01); *H01M 8/04373* (2013.01); *H01M 8/04388* (2013.01); *H01M 8/04395* (2013.01); *H01M 8/04798* (2013.01); *H01M 8/0618* (2013.01); *B01J 2219/002* (2013.01); *B01J 2219/0006* (2013.01); *B01J 2219/00006* (2013.01); *B01J 2219/00058* (2013.01); *B01J 2219/00069* (2013.01); *B01J 2219/00135* (2013.01); *B01J 2219/00159* (2013.01); *B01J 2219/00213* (2013.01); *B01J 2219/00234* (2013.01); *B01J 2219/00238* (2013.01); *C01B 2203/0261* (2013.01); *C01B 2203/0283* (2013.01); *C01B 2203/044* (2013.01); *C01B 2203/0405* (2013.01); *C01B 2203/047* (2013.01); *C01B 2203/066* (2013.01); *C01B 2203/169* (2013.01); *C01B 2203/1633* (2013.01)

(56) References Cited

U.S. PATENT DOCUMENTS

| | | | |
|---|---|---|---|
| 3,560,167 A | | 2/1971 | Bruckner et al. |
| 4,588,659 A | | 5/1986 | Abens et al. |
| 4,751,057 A | | 6/1988 | Westerman |
| 4,894,205 A | | 1/1990 | Westerman et al. |
| 5,149,156 A | | 9/1992 | Kleefeldt |
| 5,149,516 A | | 9/1992 | Han et al. |
| 5,447,705 A | | 9/1995 | Petit et al. |
| 5,527,631 A | | 6/1996 | Singh et al. |
| 5,573,737 A | | 11/1996 | Balachandran et al. |
| 5,596,514 A | | 1/1997 | Maher, Jr. et al. |
| 5,648,582 A | | 7/1997 | Schmidt et al. |
| 5,670,269 A | * | 9/1997 | Hamada ............... B01J 8/0207 422/625 |
| 5,690,763 A | | 11/1997 | Ashmead et al. |
| 5,846,641 A | * | 12/1998 | Abeles ............... B01D 53/228 428/116 |
| 5,980,840 A | * | 11/1999 | Kleefisch ............ B01D 53/885 252/373 |
| 6,033,793 A | | 3/2000 | Woods et al. |
| 6,284,398 B1 | | 9/2001 | Kiryu |
| 6,296,814 B1 | | 10/2001 | Bonk et al. |
| 6,379,586 B1 | | 4/2002 | Zeng et al. |
| 6,383,469 B1 | | 5/2002 | Lamla et al. |
| 6,383,670 B1 | | 5/2002 | Edlund et al. |
| 6,402,989 B1 | | 6/2002 | Gaffney |
| 6,403,049 B1 | | 6/2002 | Van Keulen et al. |
| 6,447,940 B1 | | 9/2002 | Ueda |
| 6,458,334 B1 | | 10/2002 | Tamhankar et al. |
| 6,465,118 B1 | | 10/2002 | Dickman et al. |
| 6,488,838 B1 | | 12/2002 | Tonkovich et al. |
| 6,488,907 B1 | | 12/2002 | Barnes et al. |
| 6,492,050 B1 | | 12/2002 | Sammes |
| 6,521,204 B1 | | 2/2003 | Borup et al. |
| 6,565,817 B1 | | 5/2003 | Kiryu |
| 6,576,359 B2 | | 6/2003 | Fronk |
| 6,585,940 B2 | | 7/2003 | Abe et al. |
| 6,641,625 B1 | | 11/2003 | Clawson et al. |
| 6,641,795 B2 | | 11/2003 | Abe |
| 6,656,623 B2 | | 12/2003 | Holmes et al. |
| 6,667,123 B2 | | 12/2003 | Yu |
| 6,673,270 B1 | | 1/2004 | De Jong et al. |
| 6,692,707 B1 | | 2/2004 | Hirabayashi |
| 6,699,609 B2 | | 3/2004 | Kotani et al. |
| 6,702,960 B1 | | 3/2004 | Schaddenhorst et al. |
| 6,726,853 B2 | | 4/2004 | Okado et al. |
| 6,749,958 B2 | | 6/2004 | Pastula et al. |
| 6,770,106 B1 | | 8/2004 | Okamoto et al. |
| 6,783,742 B2 | | 8/2004 | Bentley et al. |
| 6,790,247 B2 | | 9/2004 | Childress et al. |
| 6,790,431 B2 | | 9/2004 | Wang et al. |
| 6,800,387 B2 | | 10/2004 | Shimada et al. |
| 6,833,208 B2 | | 12/2004 | Kotani et al. |
| 6,833,536 B2 | | 12/2004 | Shigeura |
| 6,869,456 B2 | | 3/2005 | Salemi et al. |
| 6,872,379 B2 | | 3/2005 | Zahringer et al. |
| 6,878,667 B2 | | 4/2005 | Gaffney et al. |
| 6,881,508 B2 | | 4/2005 | Penev |
| 6,887,436 B1 | | 5/2005 | Fisher et al. |
| 6,887,456 B2 | | 5/2005 | Xu et al. |
| 6,921,596 B2 | | 7/2005 | Kelly et al. |
| 6,932,950 B1 | | 8/2005 | Guetlhuber |
| 6,984,371 B2 | | 1/2006 | Zhao et al. |
| 6,998,187 B2 | | 2/2006 | Finnerty et al. |
| 7,001,867 B2 | | 2/2006 | Jin et al. |
| 7,037,349 B2 | | 5/2006 | Dauer et al. |
| 7,048,897 B1 | | 5/2006 | Koripella et al. |
| 7,070,633 B2 | | 7/2006 | Okada et al. |
| 7,070,752 B2 | | 7/2006 | Zeng et al. |
| 7,090,826 B2 | | 8/2006 | Jiang et al. |
| 7,101,531 B2 | | 9/2006 | Kamijo |
| 7,115,233 B2 | | 10/2006 | Okada et al. |
| 7,118,717 B2 | | 10/2006 | Shore |
| 7,132,184 B2 | | 11/2006 | Ogino et al. |
| 7,147,836 B2 | | 12/2006 | Ebert et al. |
| 7,147,946 B2 | | 12/2006 | Kawasumi et al. |
| 7,156,866 B1 | | 1/2007 | Riggs et al. |
| 7,189,371 B2 | | 3/2007 | Iwasaki |
| 7,192,458 B1 | | 3/2007 | Harness et al. |
| 7,232,352 B2 | | 6/2007 | Splaine |
| 7,247,258 B2 | | 7/2007 | Jung et al. |
| 7,285,247 B2 | | 10/2007 | Smaling et al. |
| 7,294,421 B2 | | 11/2007 | Noetzel et al. |
| 7,323,148 B2 | | 1/2008 | Shah et al. |
| 7,328,691 B2 | | 2/2008 | Hataura et al. |
| 7,335,432 B2 | | 2/2008 | Koripella |
| 7,344,572 B2 | | 3/2008 | Yamamoto |
| 7,344,687 B2 | | 3/2008 | Oi et al. |
| 7,364,812 B2 | | 4/2008 | Taylor et al. |
| 7,368,482 B2 | | 5/2008 | Basini et al. |
| 7,422,810 B2 | | 9/2008 | Venkataraman et al. |
| 7,490,580 B2 | | 2/2009 | Hanai et al. |
| 7,498,095 B2 | | 3/2009 | Finnerty et al. |
| 7,578,861 B2 | | 8/2009 | Kah et al. |
| 7,585,810 B2 | | 9/2009 | Chen et al. |
| 7,625,414 B2 | | 12/2009 | Nougier et al. |
| 7,632,320 B2 | | 12/2009 | Tonkovich et al. |
| 7,691,509 B2 | | 4/2010 | Han et al. |
| 7,704,618 B2 | | 4/2010 | Venkataraman et al. |
| 7,736,399 B2 | | 6/2010 | Ravenda et al. |
| 7,846,599 B2 | | 12/2010 | Ballantine et al. |
| 7,858,214 B2 | | 12/2010 | Kelly et al. |
| 7,888,278 B2 | | 2/2011 | Rapier et al. |
| 7,901,814 B2 | | 3/2011 | Venkataraman et al. |
| 7,976,787 B2 | | 7/2011 | England et al. |
| 7,985,506 B2 | | 7/2011 | Lee et al. |
| 7,985,509 B2 | | 7/2011 | Kim et al. |
| 7,998,456 B2 | | 8/2011 | Van Dijk et al. |
| 8,034,504 B2 | | 10/2011 | Tsunoda et al. |
| 8,062,800 B2 | | 11/2011 | Cho et al. |
| 8,142,941 B2 | | 3/2012 | Bitoh |
| 8,158,289 B2 | | 4/2012 | Cutright et al. |
| 8,173,310 B2 | | 5/2012 | Son |

(56) References Cited

U.S. PATENT DOCUMENTS

| | | |
|---|---|---|
| 8,241,600 B1 | 8/2012 | Berry et al. |
| 8,257,669 B2 | 9/2012 | Jankowski |
| 8,277,524 B2 | 10/2012 | Keegan et al. |
| 8,298,711 B2 | 10/2012 | Yanase et al. |
| 8,304,122 B2 | 11/2012 | Poshusta et al. |
| 8,318,363 B2 | 11/2012 | Lim |
| 8,323,365 B2 | 12/2012 | Drnevich et al. |
| 8,337,757 B2 | 12/2012 | Roychoudhury et al. |
| 8,354,083 B2 | 1/2013 | Amsden et al. |
| 8,486,162 B2 | 7/2013 | Kim et al. |
| 8,557,451 B2 | 10/2013 | Edlund et al. |
| 2002/0141917 A1* | 10/2002 | Komaki ............... B01J 8/0438 422/625 |
| 2003/0054215 A1 | 3/2003 | Doshi et al. |
| 2003/0064259 A1 | 4/2003 | Gittleman |
| 2003/0188486 A1 | 10/2003 | Tanaka et al. |
| 2003/0203263 A1* | 10/2003 | Brown ............... H01M 8/0612 429/434 |
| 2003/0211021 A1 | 11/2003 | Oi et al. |
| 2003/0211373 A1 | 11/2003 | Ueda et al. |
| 2003/0218991 A1 | 11/2003 | Besecker et al. |
| 2003/0234455 A1 | 12/2003 | Mieney et al. |
| 2003/0235726 A1 | 12/2003 | Kelly et al. |
| 2004/0009104 A1 | 1/2004 | Kaupert et al. |
| 2004/0076562 A1 | 4/2004 | Manzanec et al. |
| 2004/0144030 A1 | 7/2004 | Smaling |
| 2004/0180247 A1 | 9/2004 | Higashiyama et al. |
| 2004/0191591 A1 | 9/2004 | Yamamoto |
| 2005/0008907 A1 | 1/2005 | Isozaki et al. |
| 2005/0028445 A1 | 2/2005 | Roychoudhury et al. |
| 2005/0069485 A1 | 3/2005 | Jung et al. |
| 2005/0081444 A1* | 4/2005 | Anumakonda .......... B01J 8/067 48/214 A |
| 2005/0164046 A1 | 7/2005 | Fujihara et al. |
| 2005/0188615 A1 | 9/2005 | Sennoun et al. |
| 2005/0191533 A1 | 9/2005 | Kim et al. |
| 2005/0267606 A1 | 12/2005 | Barlett, Jr. et al. |
| 2006/0029539 A1* | 2/2006 | Dutta ............... B01J 8/009 423/651 |
| 2006/0051634 A1 | 3/2006 | DeVries |
| 2006/0067861 A1 | 3/2006 | Tonkovich et al. |
| 2006/0112553 A1* | 6/2006 | Badding ............ H01M 8/2435 29/890 |
| 2006/0133976 A1 | 6/2006 | Male et al. |
| 2006/0179717 A1 | 8/2006 | LaBarge |
| 2006/0246333 A1 | 11/2006 | Schaevitz et al. |
| 2007/0084118 A1 | 4/2007 | Kaeding et al. |
| 2007/0104641 A1 | 5/2007 | Ahmed et al. |
| 2007/0172402 A1* | 7/2007 | Palo ............... B01J 19/0093 422/198 |
| 2007/0183949 A1 | 8/2007 | Fischer |
| 2007/0289215 A1 | 12/2007 | Hemmings et al. |
| 2007/0292342 A1* | 12/2007 | Hemmings ............ C01B 3/382 423/651 |
| 2008/0138273 A1 | 6/2008 | Jiang |
| 2008/0148715 A1* | 6/2008 | Osumi ............... B01D 53/9409 60/295 |
| 2008/0152970 A1 | 6/2008 | Rush et al. |
| 2008/0169449 A1* | 7/2008 | Mundschau .......... B01D 69/141 252/373 |
| 2008/0187797 A1 | 8/2008 | Edlund |
| 2008/0295469 A1* | 12/2008 | Mizuno ............. B01D 46/2429 55/479 |
| 2009/0029205 A1 | 1/2009 | Venkataraman et al. |
| 2009/0104482 A1 | 4/2009 | Miyazaki |
| 2009/0118121 A1* | 5/2009 | Sarai ............... B01D 46/0024 502/439 |
| 2009/0208784 A1 | 8/2009 | Perry et al. |
| 2009/0291335 A1 | 11/2009 | Anzai |
| 2009/0326279 A1* | 12/2009 | Tonkovich .......... B01F 5/0475 568/487 |
| 2010/0015479 A1 | 1/2010 | Rusch et al. |
| 2010/0062292 A1 | 3/2010 | Lin et al. |
| 2010/0119894 A1 | 5/2010 | Ishida |
| 2010/0203404 A1 | 8/2010 | Miyazaki |
| 2010/0330446 A1 | 12/2010 | Lucka et al. |
| 2011/0039175 A1 | 2/2011 | Yokoyama et al. |
| 2011/0165483 A1 | 7/2011 | Yamamoto et al. |
| 2011/0189578 A1 | 8/2011 | Crumm et al. |
| 2011/0269032 A1 | 11/2011 | Fischer et al. |
| 2012/0062166 A1 | 3/2012 | Thornton et al. |
| 2012/0088167 A1 | 4/2012 | Reiners et al. |
| 2012/0164547 A1 | 6/2012 | Weingaertner et al. |
| 2012/0328969 A1 | 12/2012 | Dewald et al. |
| 2013/0028815 A1 | 1/2013 | Basini et al. |
| 2013/0032762 A1* | 2/2013 | Quintero ............ B01J 19/2475 252/373 |
| 2013/0056911 A1 | 3/2013 | Finnerty et al. |
| 2013/0059223 A1 | 3/2013 | Finnerty et al. |
| 2013/0230787 A1 | 9/2013 | Finnerty et al. |
| 2013/0323162 A1* | 12/2013 | De Groot ............ B01J 8/009 423/651 |
| 2014/0107233 A1* | 4/2014 | Banister ............ B01J 12/007 518/703 |
| 2014/0335463 A1 | 11/2014 | Friedrich et al. |
| 2014/0346402 A1* | 11/2014 | Tetzlaff ............ B01J 8/1872 252/373 |

FOREIGN PATENT DOCUMENTS

| | | |
|---|---|---|
| GB | 1314984 A | 4/1973 |
| WO | 9841394 A1 | 9/1998 |
| WO | 02099917 A2 | 12/2002 |
| WO | 2004/091771 A1 | 10/2004 |
| WO | 2006032644 41 | 3/2006 |
| WO | 2006032644 A1 | 3/2006 |
| WO | 2006034868 A1 | 4/2006 |
| WO | 2008031024 A1 | 3/2008 |
| WO | 2009116977 A2 | 9/2009 |
| WO | 2011019825 A2 | 2/2011 |

OTHER PUBLICATIONS

C. Finnerty, K. Kendall, G. A. Tompsett, Integrated Catalytic Burner/Mirco-SOFC Design and Applications Electrochemistry, 68 (2) (2000) 519-521.

K. Kendall, C. Finnerty, G.A. Tompsett, P. Windibank, and N. Coe, "Rapid Heating SOFC System for Hybrid Applications." Electrochemistry, vol. 68, No. 6, (2000) 403.

Finnerty C., Cunningham R.H., Ormerod R.M, "Development of a novel test system for in situ catalytic electrocatalytic and electrochemical studies of internal fuel reforming in solid oxide fuel cells." Catalysis letters, vol. 66, No. 4, (2000) 221-226(6).

C. Finnerty, N.J. Coe, R.H. Cunningham and R.M. Ormerod, "Steam Reforming and Partial Oxidation of Methane over nickel/zircornia and doped nickel/zirconia anodes in working solid oxide fuel cells." Catalysis Today, in press (1998).

C. Finnerty, R.H. Cunningham and R.M. Ormerod, "Development of more tolerant nickel/zirconia anodes for solid oxide fuel cells running on natural gas." Proc. 3rd Eur. Conf. on SOFCs, 1998, 217-226.

C. Finnerty, R.H. Cunningham and R.M. Ormerod, "Combined Electrochemical and Catalytic studies of anodes in working solid oxide fuel cells" Proc. 3rd Eur. Conf. on SOFCs, 1998, 227-236.

C. Finnerty, R.H. Cunningham and R.M. Ormerod, "Study of the Catalysis and Surface Chemistry occurring at nickel/zirconia anodes in solid oxide fuel cells running on natural gas." Radiation Effects and Defects in Solids [ISSN 1042-0150]. vol. 151 pp. 77-82.

C. Finnerty, R.H. Cunningham, K. Kendall and R.M. Ormerod, "A novel test system for in situ catalytic and electrochemical measurements on fuel processing anodes in working solid oxide fuel cells." J. Chem. Soc. Chem. Comm., (1998) 915.

R.H. Cunningham, C. Finnerty, K. Kendall and R.M. Ormerod, "An in situ catalytic and electrochemical study of working nickel/zirconia anodes in tubular Solid Oxide Fuel Cells." Proc. 5th Int. Symp. on SOFCs, The Electrochem. Soc., 1997, 965-972.

R.H. Cunningham, C. Finnerty and R.M. Ormerod, "Study of Surface Carbon formed on working anodes of Solid Oxide Fuel

(56) References Cited

OTHER PUBLICATIONS

Cells running on methane" Proc. 5th Int. Symp. on SOFCs, The Electrochem. Soc., 1997, 973-983.

Finnerty C, Cunningham RH, Ormerod RM, "Development of a novel solid oxide fuel cell system based on a tubular zirconia reactor," Radiation Effects and Defects in Solids [ISSN 1042-0150]. vol. 151 pp. 71-76.

Finnerty C, Alston T, Ormerod RM, Kendall K, "A Solid Oxide Fuel Cell Demonstration Kit, Operated on Butane/Propane Portable Fuel Cells" Jun. 1999. ISBN 3-905592-3-7, Edited by F N Buchl, European Fuel Cell Forum.

Finnerty C, Cunningham RH, Ormerod RM, "In situ catalytic, electrocatalytic and electrochemical studies of fuel processing anodes in solid oxide fuel cells running on natural gas." Proceedings of 12th International Conference on Solid-state Ionics, Halkidiki, Greece Jun. 1999. International Society for Solid-state Ionics.

Finnerty C, Cunningham RH, Ormerod RM, "Internal reforming over Nickel/Zirconia Anodes in SOFCs: Influence of anode formulation, pre-treatment and operating conditions." Solid Oxide Fuel Cells VI Oct. 1999. 1999, Edited by S.C Singhal and M. Doklya, Published by The Electrochemical Society, ISBN 1-56677-242-7.

Finnerty C, Ormerod RM, "Internal reforming and electrochemical performance studies of Doped Nickel/Zirconia anodes in SOFCs running on methane." Solid Oxide Fuel Cells VI, Oct. 1999. 1999, Edited by S.C Singhal and M. Dokiya, Published by The Electrochemical Society, ISBN 1-56677-242-7.

Caine Finnerty, Geoff. A. Tompsett, Kevin Kendall and R. Mark Ormerod, "SOFC system with integrated catalytic fuel processing." Journal of Power Sources, vol. 86, Issues 1-2, Mar. 2000, pp. 459-463.

Caine Finnerty, Neil J. Coe, Robert H. Cunningham and R. Mark Ormerod, "Carbon formation on and deactivation of nickel-based/zirconia anodes in solid oxide fuel cells running on methane." Catalysis Today, vol. 46, Issues 2-3, Nov. 16, 1998, pp. 137-145.

K. Kendall, C. Finnerty, G. Saunders and J. T. Chung, "Effects of dilution on methane entering an SOFC anode" Journal of Power Sources, vol. 106, Issues 1-2, Apr. 1, 2002, pp. 323-327.

G. A. Tompsett, C. Finnerty, K. Kendall, T. Alston and N. M. Sammes, "Novel applications for micro-SOFCs." Journal of Power Sources, vol. 86, Issues 1-2, Mar. 2000, pp. 376-382.

Caine Finnerty and R. Marl Ormerod, "Internal reforming over nickel/zirconia anodes in SOFCS operating on methane: influence of anode formulation, pre-treatment and operating conditions." Journal of Power Sources, vol. 86, Issue 1-2, Mar. 2000, pp. 390-394.

C. Finnerty, T. Alston, K. Kendall and R.M. Ormerod, "Develoment of a small portable SOFC system with integrated catalytic fuel processing." Sixth Grove Fuel Cell Symposium, Sep. 1999, 125.

C. Finnerty, K. Kendall, J. C. Austin, T. Alston, "Ceramic fuel cells to replace metal burners." Journal of Material science, 36, (2001) 1119-1124.

Ormerod RM, Finnerty CM, Cunningham RH, "In situ catalytic and electrocatalytic studies of internal fuel reforming in solid oxide fuel cells running on natural gas." Studies in Surface Science and Catalysis, Elsevier, [ISBN 0-444-50480-X]. 7 pp. 425-431.

P.K. Cheekatamarla, C.M. Finnerty et al., "Highly Efficient Next-Generation Tubular Solid Oxide Fuel Cells Powered by Readily Available Hydrocarbon Fuels", To be submitted to Nature, 2008.

P.K. Cheekatamarla, C. M. Finnerty, "Synthesis gas generation via partial oxidation reforming of liquid fuels." Accepted for publication, International Journal of Hydrogen Energy, 2008.

Y. Du, C. Finnerty, and J. Jiang, "Thermal Stability of Portable Microtubular SOFCs and Stacks." In press, Journal of the Electrochemical Society, 155(9), 1-XXXX, (2008).

Y. Du, C. Finnerty, and J. Jiang, "Thermal Stability of Portable Micro-Tubular Solid Oxide Fuel Cell and Stack" ECS Trans. 12, (1) 363 (2008).

P.K. Cheekatamarla, C.M. Finnerty, Jun Cai, "Internal reforming of hydrocarbon fuels in tubular solid oxide fuel cells." International Journal of Hydrogen Energy, vol. 33, Issue 7, Apr. 2008, pp. 1853-1858.

Praveen K. Cheelatamarla, C.M. Finnerty, "Reforming catalysts for hydrogen generation in fuel cell applications." Journal of Power Sources, vol. 160, Issue 1, Sep. 29, 2006, pp. 490-499.

P.K. Cheekatamarla, C.M. Finnerty, "Hydrogen Generation via partial oxidation reforming of liquid fuels." Prepr. Pap.-Am. hem. Soc., Div. Fuel Chem. 2007, 52 (2), 288.

P.K. Cheekatamarla, C.M. Finnerty, Jun Cai, "Internal reforming of hydrocarbon fuels in tubular solid oxide fuel cells." ECS Trans. 12, (1) 439 (2008).

P.K. Cheekatamarla, C. M. Finnerty, A. Stanley, C. Robinson, P. Dewald, Y. Lu, Y. Du, "Performance Characteristics of an Integrated Portable JP8 SOFC—Reformer System." ECS Transactions vol. 5, Mar. 2007.

C.M. Finnerty, Y. Du, P.K. Cheekatamarla, B.J. Emley, W. Zhu, J. Cai, R. Sharp, "Geometric Effects on Tubular Solid Oxide Fuel Cells." ECS Transactions—Solid Oxide Fuel Cells, vol. 7, Jun. 2007.

C. Finnerty, C. Robinson, S. Andrews, Y. Du, P. Cheekatamarla, P. Dewald, Y. Lu, T. Schwartz, "Portable Propane Micro-Tubular SOFC System Development." ECS Transactions—Solid Oxide Fuel Cells, vol. 7, Jun. 2007.

D. Bhattacharya, R. Rengaswamy and C. Finnerty, "Isothermal Models for Tubular Anode Supported Solid Oxide Fuel Cell", Chemical Engineering Science, 62(16), pp. 4250-4267, 2007.

D. Bhattacharya, R. Rengaswamy and C. Finnerty, "Dynamic Simulation and Analysis of a Solid Oxide Fuel Cell", in the proceedings of ESCAPE-17, Bucharest, 2007.

Debangsu Bhattacharya, Raghunathan Rengaswamy and Caine Finnerty, "Validation of a Phenomenological Steady-State Model for Solid Oxide Fuel Cell (SOFC)", presented at the Annual AIChE meeting, San Francisco, 2006.

Debangsu Bhattacharya, Raghunathan Rengaswamy and Caine Finnerty, "A Twodimensional Dynamic Model for Tubular Solid Oxide Fuel Cell", presented at the Annual AIChE meeting, San Francisco, 2006.

Debangsu Bhattacharya, Raghunathan Rengaswamy and Caine Finnerty, "Optimization Studies on Anode-Supported Tubular Solid Oxide Fuel Cells", presented at the Annual AIChE Meeting, Salt Lake City, 2007.

Debangsu Bhattacharya, Raghunathan Rengaswamy and Caine Finnerty, "Dynamics and Volterra-Model Based Control of a Tubular Solid Oxide Fuel Cell", presented at the Annual AIChE Meeting, Salt Lake City, 2007.

Debangsu Bhattacharya, Raghunathan Rengaswamy and Caine Finnerty, "Identification and Control of a Tubular Solid Oxide Fuel Cell (SOFC)", presented at the Annual AIChE meeting, Philadelphia, 2008.

Praveen K. Cheekatamarla, Caine M. Finnerty, Yanhai Du, Juan Jiang, Jian Dong, P.G, Dewald, C. R. Robinson, Advanced tubular solid oxide fuel cells with high efficiency for internal reforming of hydrocarbon fuels Original Research Article; Journal of Power Sources, vol. 188, Issue 2, Mar. 15, 2009, pp. 521-526.

Praveen K. Cheekatamarla, Caine M. Finnerty, Charles R. Robinson, Stanley M. Andrews, Jonathan A. Brodie, Y. Lu, Paul G. Dewald, "Design, integration and demonstration of a 50 W JP8/kerosene fueled portable SOFC power generator", Original Research Article Journal of Power Sources, vol. 193, Issue 2, Sep. 5, 2009, pp. 797-803.

Debangsu Bhattacharyya, Raghunathan Rengaswamy, Caine Finnerty, "Dynamic modeling and validation studies of a tubular solid oxide fuel cell." Original Research Article Chemical Engineering Science, vol. 64, Issue 9, May 1, 2009, pp. 2158-2172.

Zuo, Chendong et al. "Advanced Anode-supported Micro-tubular SOFC Development." ECS Transactions 17.1 (2009): 103-110.

Finnerty, Caine M. "The catalysis and electrical performance of nickel-based/zirconia fuel reforming anodes in solid oxide fuel cells running on methane." Diss. University of Keele, 1998.

(56) References Cited

OTHER PUBLICATIONS

Khaligh, Alireza, et al. "Digital control of an isolated active hybrid fuel cell/Li-ion battery power supply." IEEE Transactions on Vehicular technology 56.6 (2007): 3709-3721.
Lankin, Michael, Yanhai Du, and Caine Finnerty, "A review of the implications of silica in solid oxide fuel cells." Journal of Fuel Cell Science and Technology 8.5 (2011): 054001.

* cited by examiner

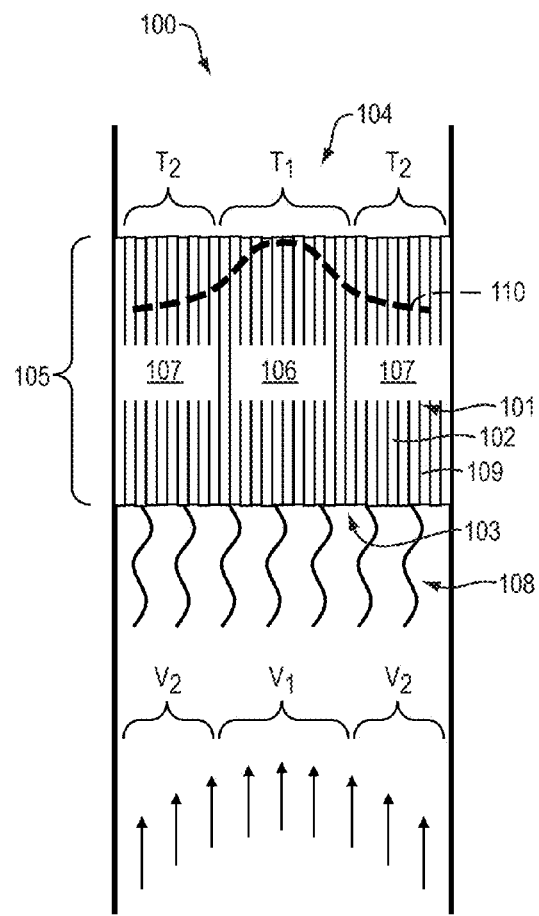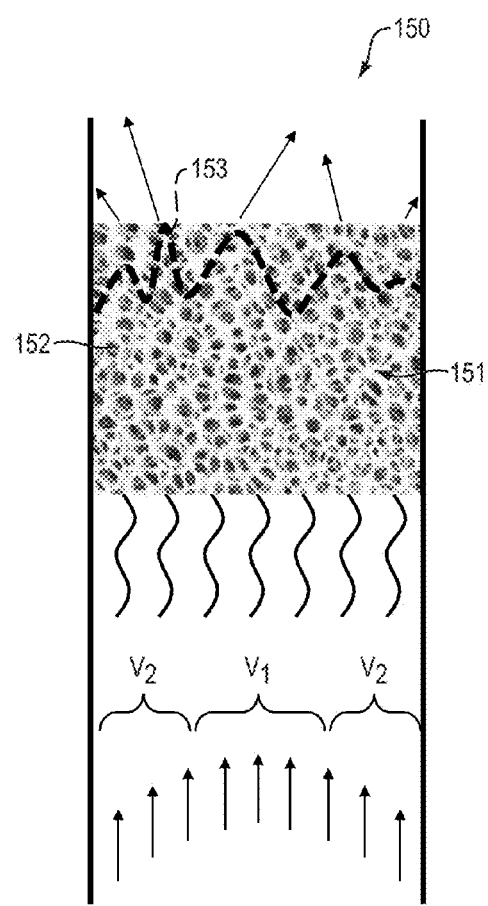
FIG. 1A
(PRIOR ART)
FIG. 1B
(PRIOR ART)

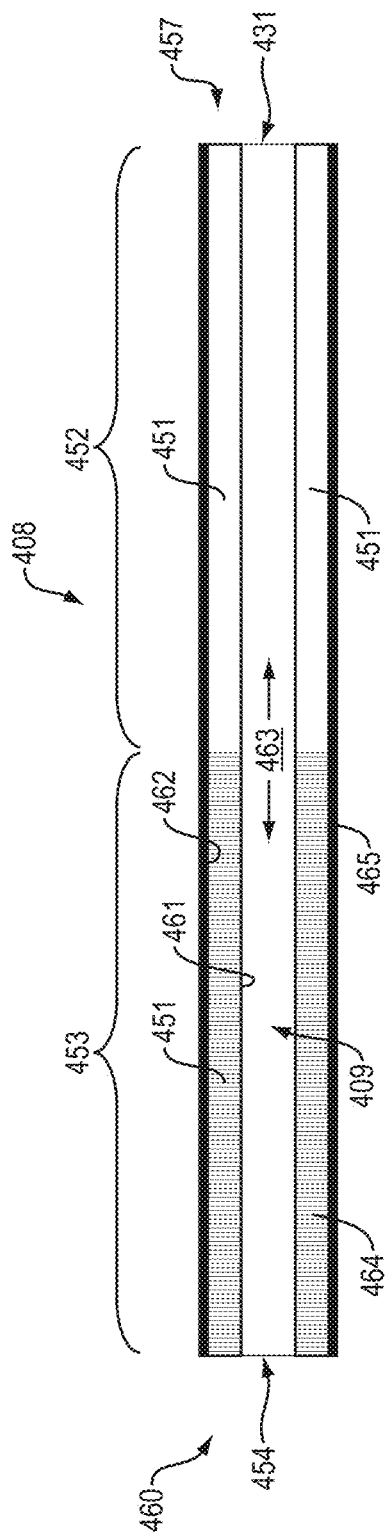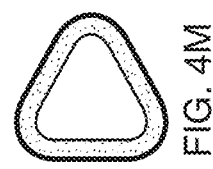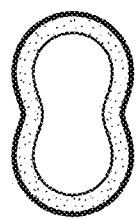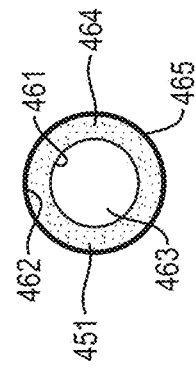

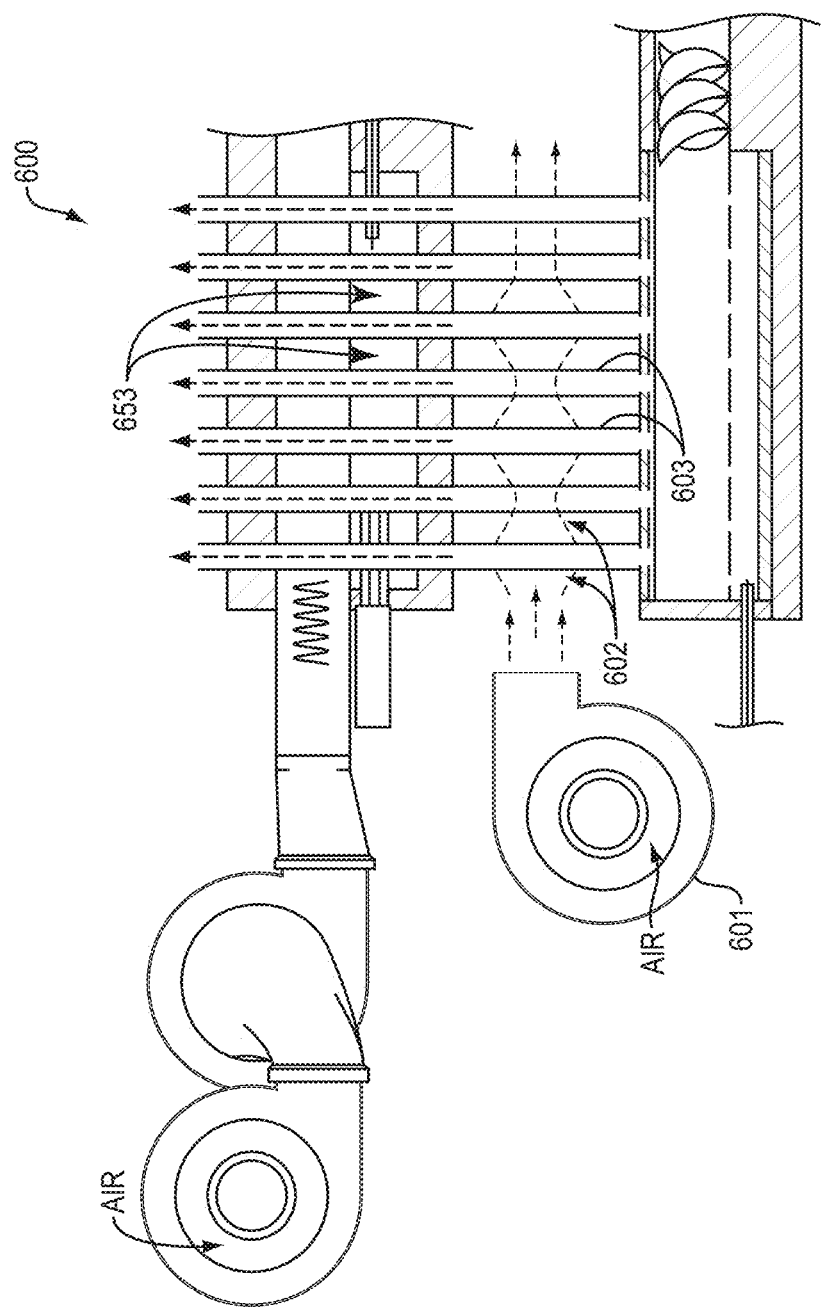

LIQUID FUEL CPOX REFORMER AND FUEL CELL SYSTEMS, AND METHODS OF PRODUCING ELECTRICITY

CROSS REFERENCE TO RELATED APPLICATIONS

This application claims priority to and the benefit of the filing date of U.S. Provisional Patent Application No. 61/900,529, filed on Nov. 6, 2013, the entire disclosure of which is incorporated by reference herein.

FIELD

The present teachings relate to integrated liquid fuel catalytic partial oxidation reformer and fuel cell systems, and to methods of catalytic partial oxidation reforming of liquid reformable fuels to produce hydrogen-rich reformates that can be converted to electricity within a fuel cell unit.

BACKGROUND

The conversion of a gaseous or liquid reformable fuel to a hydrogen-rich carbon monoxide-containing gas mixture, a product commonly referred to as "synthesis gas" or "syngas," can be carried out in accordance with any of such well known fuel reforming operations such as steam reforming, dry reforming, autothermal reforming, and catalytic partial oxidation (CPOX) reforming. Each of these fuel reforming operations has its distinctive chemistry and requirements and each is marked by its advantages and disadvantages relative to the others.

The development of improved fuel reformers, fuel reformer components, and reforming processes continues to be the focus of considerable research due to the potential of fuel cells, i.e., devices for the electrochemical conversion of electrochemically oxidizable fuels such hydrogen, mixtures of hydrogen and carbon monoxide, and the like, to electricity, to play a greatly expanded role for general applications including main power units (MPUs) and auxiliary power units (APUs). Fuel cells also can be used for specialized applications, for example, as on-board electrical generating devices for electric vehicles, backup power sources for residential-use devices, main power sources for leisure-use, outdoor and other power-consuming devices in out-of-grid locations, and lighter weight, higher power density, ambient temperature-independent replacements for portable battery packs.

Because large scale, economic production of hydrogen, intrastructure required for its distribution, and practical means for its storage (especially as a transportation fuel) widely are believed to be a long way off much current research and development has been directed to improving both fuel reformers as sources of electrochemically oxidizable fuels, notably mixtures of hydrogen and carbon monoxide, and fuel cell assemblies, commonly referred to as fuel cell "stacks," as convertors of such fuels to electricity, and the integration of fuel reformers and fuel cells into more compact, reliable and efficient devices for the production of electrical energy.

As is the case with fuel reformers, known and conventional fuel cells come in a variety of types and configurations including phosphoric acid fuel cells (PAFCs), alkaline fuel cells (AFCs), polymer electrolyte membrane (or proton exchange membrane) fuel cells (PEMFCs), and solid oxide fuel cells (SOFCs). Further, a number of variations exist within each of these types of fuel cells. For example, SOFCs can be classified as belonging to one of three main sub-types: tubular, planar, and monolithic, with many representatives of each sub-type known in the art. Similar to fuel reformers, each different type and sub-type of fuel cell has its advantages and disadvantages relative to the others.

CPOX reforming, or simply CPOX, has attracted particular attention as a way of supplying hydrogen-rich reformate to fuel cell stacks, for example, those having nominal power ratings of anywhere from 100 watts to 100 kilowatts, and all power ratings in between. Among the advantages of CPOX reforming is that the reaction is exothermic in contrast to steam reforming and dry reforming which are endothermic reactions that require an external source of heat.

Furthermore, CPOX reactions are generally faster than other reforming reactions which allows for the construction of relatively small reformers capable of fast start-up and rapid response to changes in load. CPOX reformers also tend to be simpler in design than reformers that require the handling of water and steam, for example, steam reformers and autothermal reformers, which require storage units for water, heating units for the production of steam, burner or combustion units for supplying heat to drive endothermic reforming reactions, and the like, and their associated fluid routing and operation-monitoring and control devices.

However, and as previously recognized (see, e.g., U.S. Pat. Nos. 6,790,431 and 7,578,861), the typically high levels of heat produced during CPOX reactions can have undesirable consequences including damage to the reformer and/or components thereof such as the CPOX catalyst, catalyst support, and other structural components. This is a major drawback of many current CPOX reformer designs and one in need of an effective solution.

One known type of CPOX reformer includes a catalyst support component, commonly referred to as a "catalyst monolith," "monolith catalyst support," "monolith substrate," or simply a "monolith," which has a CPOX catalyst or catalyst system deposited thereon.

Monoliths can be classified on the basis of two general configurations: a first configuration characterized by a metal or ceramic body of honeycomb-like, channeled, metallic gauze or spiral-wound corrugated sheet structure presenting an essentially linear gaseous flow path therethrough, and a second configuration characterized by a metal or ceramic foam body of reticulated, or open, pore structure presenting a tortuous gaseous flow path therethrough. Representative monoliths of one or the other general type are disclosed in, for example, U.S. Pat. Nos. 5,527,631; 6,402,989; 6,458,334; 6,692,707; 6,770,106; 6,887,456; 6,984,371; 7,090,826; 7,118,717; 7,232,352; 7,909,826; 7,976,787; 8,323,365; and, U.S. Patent Application Publication No. 2013/0028815.

As shown in FIG. 1A, monolith 100, which is of a common prior art type, viewed in longitudinal cross section includes a honeycomb-like ceramic body 101 made up of numerous channels 102 impregnated or wash-coated with CPOX catalyst, an inlet end 103 for admitting a gaseous CPOX reaction mixture, i.e., a mixture of a gaseous oxidizing agent, typically air, and reformable fuel. e.g., a gaseous fuel such as methane, natural gas, propane or butane or a vaporized liquid fuel such as gasoline, kerosene, jet fuel or diesel, an outlet end 104 for the discharge of hydrogen-rich, carbon monoxide-containing reformate product (syngas) and a CPOX reaction zone 105 which is essentially coextensive with the entire monolith.

CPOX reaction zone 105 can be considered as having an inner, or central, region 106 through which a corresponding inner, or central, portion of a gaseous CPOX reaction mixture stream inherently flows within a relatively high range of velocity $V_1$ surrounded by an outer, or peripheral, region 107 through which a corresponding outer, or peripheral, portion of the gaseous CPOX reaction mixture stream inherently flows within a relatively low range of velocity $V_2$.

Monoliths typically experience fairly high CPOX reaction temperatures, for example, on the order of from 600° C. to 1,100° C. In the case of honeycomb-like monolith 100, these high temperatures, coupled with the inherent differential in flow velocities $V_1$ and $V_2$ of the CPOX reaction mixture stream flowing within inner and outer regions 106 and 107, respectively, of CPOX reaction zone 105 tend to account for the observed operational drawbacks of monolith 100 and other essentially linear flow path monoliths where CPOX reforming is concerned.

At CPOX reaction temperatures of 600° C.-1,100° C., monolith 100 radiates a good deal of heat at its inlet end 103. Even with careful monitoring and control of the CPOX reaction conditions, it can be difficult to prevent or inhibit the phenomenon of "flashing," i.e., the premature combustion of CPOX gaseous reaction mixture stream within radiant heat zone 108 as the stream approaches inlet end 103. Heat of exotherm of the CPOX reaction occurring within initial CPOX reaction zone 109 proximate to inlet end 103 radiates outwardly therefrom into radiant heat zone 108. This radiant heat can be of sufficient intensity to raise the temperature of the advancing CPOX reaction mixture stream (indicated by the arrows) to its flash point. Flashing of the CPOX reaction mixture within radiant heat zone 108 causes undesirable thermal events, raising the temperature to a point where catalyst can be vaporized or deactivated and/or reformer structure can be damaged or rendered inoperative. These thermal events can also lead to cracking of fuel within this zone and, consequently, increased coke (carbon particle) formation resulting in deterioration of CPOX catalyst performance. Where the hydrogen-rich reformate effluent is utilized as fuel for a fuel cell stack, coke and unreformed higher hydrocarbon fragments contained therein will also deposit upon the anode surfaces of the fuel cells resulting in reduced conversion of product reformate to electricity.

As further shown in FIG. 1A, the aforementioned differential in flow velocities $V_1$ and $V_2$ of the CPOX reaction mixture stream within, respectively, inner and outer regions 106 and 107 of CPOX reaction zone 105 are also primarily responsible for the differential in CPOX reaction temperature ranges $T_1$ and $T_2$ in these regions. Thus, the higher velocity $V_1$ of the CPOX reaction mixture stream within inner region 106 results in a higher rate of CPOX reaction therein and an accompanying higher reaction temperature $T_1$ and, conversely, the lower velocity $V_2$ of the CPOX reaction mixture stream within outer region 107 results in a lower rate of CPOX reaction therein and an accompanying lower reaction temperature $T_2$. The temperature profile across inner and outer regions 106 and 107 can be represented by temperature curve 110. A sharp rise in CPOX reaction temperature $T_1$, if high enough, can result in damage to, and even total destruction of, monolith 100.

As shown in FIG. 1B, prior art-type foam monolith 150 viewed in longitudinal cross section includes a ceramic foam body 151 characterized by a reticulated, or open, network of interconnected pores and pore channels 152 supporting a CPOX catalyst or catalyst system deposited thereon by conventional or otherwise known procedures, e.g., impregnation or wash coating.

One drawback of foam monoliths of all types is their higher pressure drops due to their higher resistance to flow compared with linear-flow monoliths such as honeycomb-like monolith 100 of FIG. 1A. Higher pressure drops require higher operational pressures, and therefore higher energy consumption, to meet target flows. Another inherent drawback of foam monoliths lies in the nature of the flow paths of gaseous reactants and reaction products therein (as indicated by the arrows). The characteristic randomness of these flow paths results in very uneven temperature profiles within the monolith (e.g., as indicated by temperature curve 153), increasing the risk of thermal shock due to hot spots and/or reduced CPOX conversion rates due to cold spots.

Foam monoliths of all types are also susceptible to flashing much as in the case of the linear flow path monoliths discussed above. In addition, foam monoliths are prone to other drawbacks that are characteristic of their kind. Depending on the way in which known and conventional foam monoliths are manufactured, they can possess a relatively fragile pore network, especially within their central regions, or they can possess a more robust pore structure throughout. Both types of foam monolith are subject to disadvantages.

In the case of foam monoliths possessing a relatively fragile core region, thermal shock resulting from rapid thermal cycling of the CPOX reformer (typical of CPOX reformers that supply hydrogen-rich reformate to fuel cell assemblies) can over time degrade their structures to the point where the CPOX reaction proceeds in a very inefficient manner, if at all.

In the case of foam monoliths possessing a sturdier pore structure, such structure tends to magnify the randomness of the gas flow paths therethrough. While damage to the pore structure owing to hot spots can be negligible or nonexistent, the problem of scattered and fleeting cold spots that negatively affect the productivity of the CPOX reaction remains a drawback of this type of foam monolith.

It will also be noted that even when manufactured by a well-defined, closely-controlled process, foam monoliths will differ in their pore structures, and therefore in their gaseous flow properties, from other foam monoliths produced by the same process. As a result of unavoidable differences in their microstructures, individual foam monoliths produced by the same process of manufacture tend to exhibit idiosyncratic operational characteristics that can only be determined empirically. As a practical matter, a broader range of performance and reliability parameters or specifications will be assigned to reformers incorporating foam monoliths of the same manufacture in order to make allowance for the unpredictable variations in their performance.

In addition, integration of a CPOX reformer with a fuel cell should be efficient and effective to provide an integrated reformer-fuel cell system appropriate for the particular application for which electricity is needed.

Accordingly, the industry desires new designs of integrated CPOX reformer and fuel cell systems as well as and new methods of CPOX reforming integrated with fuel cell systems to produce electricity that can address certain of the disadvantages of the prior art.

SUMMARY

In light of the foregoing, the present teachings provide integrated liquid fuel CPOX reformer and fuel cell systems (also referred to herein as "reformer-fuel cell systems" and related permutations), and methods of CPOX reforming of liquid reformable fuels to produce a hydrogen-rich reformate and converting electrochemically the hydrogen-rich reformate into electricity, which systems and methods can address one or more of the deficiencies and/or disadvantages of the state-of-the-art. For example, the integrated reformer-fuel cell systems and methods of the present teachings can provide little or no opportunity or tendency for flashing or "run-away" thermal events to occur in the liquid fuel CPOX reformer section or in the CPOX reforming operation, no excessively high CPOX reaction temperatures in the liquid fuel CPOX reactor or CPOX reforming, and/or low back pressures throughout all of the gaseous stream-routing and gaseous flow components and passageways of the liquid fuel CPOX reformer section and/or the integrated reformer-fuel cell system as a whole.

In addition, the design of liquid fuel CPOX reformer and fuel cell sections of the present teachings can permit efficient and effective coupling into an integrated reformer-fuel cell system. For example, the lateral cross sections of outlets of CPOX reactor units can match the lateral cross sections of inlets of fuel cell units, thereby permitting direct coupling of the units. Such a system flexibly can be altered and/or adapted for a variety of applications and conditions including a compact footprint and/or design.

In one aspect, the present teachings relate to integrated liquid fuel CPOX reformer and fuel cell systems, where the integrated reformer-fuel cell systems include a liquid fuel CPOX reformer section and a fuel cell section.

The liquid fuel CPOX reformer section can include a liquid fuel CPOX reformer having an array of spaced-apart CPOX reactor units as described herein; a vaporizer in fluid communication with inlets of the CPOX reactor units; and an igniter in thermal communication with a CPOX catalyst of at least one CPOX reactor unit of the liquid fuel CPOX reformer, for example, a CPOX catalyst-containing wall section of at least one CPOX reactor unit.

A CPOX reactor unit of an integrated reformer-fuel cell system typically includes an elongate tube having a wall with an internal surface and an external surface. As such, a "liquid fuel CPOX reformer" can be considered a "liquid fuel multi-tubular CPOX reformer." with such expressions and permutations thereof being used interchangeably herein unless otherwise understood from the context. The wall of the CPOX reactor unit encloses an open gaseous flow passageway and defines an inlet at one end for receiving fluid flow and an outlet at an opposing end for discharge of fluid flow. A CPOX reactor unit can be in thermal communication with at least the adjacent CPOX reactor unit(s) in the array. The CPOX reactor unit can have at least a section of its wall, including the internal surface, include a CPOX catalyst. The CPOX catalyst-containing wall section typically is gas-permeable to allow gaseous CPOX reaction mixture to diffuse therein and hydrogen-rich product reformate to diffuse therefrom while remaining structurally stable under CPOX reaction conditions.

The liquid fuel CPOX reformer of an integrated reformer-fuel cell system can include a hydrogen barrier associated with, for example, attached or adhered to, the external surface of at least the CPOX catalyst-containing wall section. The hydrogen barrier also can be associated with a majority, substantially all, or the entire external surface of the wall of a CPOX reactor unit. In addition, the hydrogen barrier can be associated with the entire exposed external surface of the wall of a CPOX reactor unit. For example, a pressurized fluid such as a pressurized gas can be a hydrogen barrier, for example, associated with at least the external surfaces of the CPOX catalyst-containing wall section.

With respect to the array of spaced-apart CPOX reactor units and their thermal communication, the CPOX reactor units are generally spaced apart at a distance close enough for the heat from a CPOX reaction in one CPOX reactor unit to initiate a CPOX reaction in one or more adjacent CPOX reactor units. However, the CPOX reactor units are generally spaced apart at a distance far enough to permit control of the temperature of the CPOX reactor units, particularly at the outlets of the CPOX reactor units. That is, the CPOX reactor units are spaced apart so that heat loss can occur from a CPOX reactor unit to prevent damage to the CPOX reactor unit and/or to a fuel cell stack that can be in fluid and thermal communication with the outlet(s) of the CPOX reactor unit(s). With such positioning, an array of spaced-apart CPOX reactor units can provide an appropriate thermal balance among the array and can facilitate thermal uniformity throughout or across the array.

For example, the maximum distance between adjacent CPOX reactor units can be that distance beyond which a CPOX reaction fails to be initiated in an adjacent CPOX reactor unit by the heat from a CPOX reaction in a CPOX reactor unit. In other words, initiating a CPOX reaction in one (a single) CPOX reactor unit of an array can create the necessary heat to initiate a CPOX reaction in each of the CPOX reactor units of the array of CPOX reactor units. The maximum distance can be that distance beyond which, during a steady-state mode of operation, the temperature of an array of CPOX reactor units falls below a predetermined minimum array temperature, for example, about 600° C. or about 650° C.

The minimum distance between adjacent CPOX reactor units can be that distance below which the temperature at an outlet of a CPOX reactor unit is greater than a predetermined maximum temperature. The predetermined maximum temperature can be a temperature that is tolerable by an inlet of a fuel cell stack in thermal and fluid communication with an outlet of a CPOX reactor unit, for example, about 875° C. or 900° C.

The liquid fuel CPOX reformer of an integrated reformer-fuel cell system also can include a source of liquid reformable fuel in fluid communication with the vaporizer. The liquid fuel CPOX reformer of an integrated system can include a single igniter or can include more than one igniter, for example, two igniters, three igniters, or more, where additional igniters can be positioned in thermal communication with CPOX catalyst-containing wall sections of other CPOX reactor units.

The CPOX catalyst-containing wall section of a CPOX reactor unit can include a ceramic or can be a ceramic. The CPOX catalyst containing wall section can be a porous substrate, for example, a porous substrate including a ceramic or a porous ceramic. At least the section of the wall including a CPOX catalyst can be or can include a perovskite. For example, greater than about 20% or greater than about 50% by weight of such wall section can be a perovskite. A CPOX catalyst can be disposed within the wall and/or disposed on an internal surface of the wall. For example, a CPOX catalyst or CPOX catalyst system can be deposited on a wall and/or surface such as the internal surface of a wall, for example, by impregnation, wash coating, or an equivalent procedure. A CPOX catalyst also partially or completely can form the wall, i.e., the structure of the wall. In certain embodiments, the amount of CPOX catalyst within a catalyst-containing wall section of a CPOX reactor unit can increase along the length of the wall section, for example, in the direction from the inlet end to the outlet end of the CPOX reactor unit, and/or can decrease from the internal surface to the external surface of the wall. Such gradients of CPOX catalysts can be present in the CPOX reaction zone of a CPOX reactor unit.

Another feature of the present teachings includes an oxygen-containing gas conduit comprising a branch conduit that can split or divide the oxygen-containing gas from a source of oxygen-containing gas such that a primary fluid stream of oxygen-containing gas can be mixed with a vaporized liquid reformable fuel in, downstream of or coincident with the vaporizer, for example, where the vaporizer is a fuel spreader such as a sprayer or a wick, and a secondary fluid stream of oxygen-containing gas can be mixed with the resulting gaseous CPOX reaction mixture downstream of or coincident with the vaporizer. In such a way, the oxygen (O) to carbon (C) ratio ("O:C ratio") can be kept lower upstream of and/or through the vaporizer to mitigate against or prevent ignition of the reaction mixture as well as flashback. That is, the secondary stream of oxygen-containing gas can be added to the CPOX reaction mixture downstream of the vaporizer and upstream of the inlets to the CPOX reactor units to provide a CPOX reaction mixture having a higher O:C ratio for CPOX reaction in the CPOX reactor units.

The use of a conduit as described above having a branch conduit that can split or divide the flow of oxygen-containing gas can assist in the thermal management of the CPOX reformer and its associated components. The reduced volumetric flow of fluids through the vaporizer, for example, about 50% less, can require less heat to be supplied to the vaporizer for it to reach its operating temperature as there is less oxygen-containing gas to heat. During start-up and shut-down modes of operation, the volumes of the primary fluid and secondary fluid streams can be adjusted as appropriate.

Accordingly, a liquid fuel CPOX reformer can include a source of oxygen-containing gas, where the source of oxygen-containing gas is in fluid communication with the vaporizer and in fluid communication with a mixing zone downstream of the vaporizer. The liquid fuel CPOX reformer can include an oxygen-containing gas conduit including a branch conduit, where the oxygen-containing gas conduit can provide fluid communication between a source of oxygen-containing gas and the vaporizer and the branch conduit can provide fluid communication between the source of oxygen-containing gas and a mixing zone downstream of the vaporizer. The oxygen-containing gas conduit having a branch conduit can divide the delivery of an oxygen-containing gas from the source of oxygen-containing gas to the vaporizer and the mixing zone downstream of the vaporizer. In such cases, the CPOX reaction mixture formed in the vaporizer or coincident with and/or downstream of the vaporizer (e.g., where the vaporizer is located in the conduit and can be a fuel spreader) can have an O:C ratio that is less than the CPOX reaction mixture to be delivered to the inlets of the CPOX reactor units.

In a variation on this basic theme, rather than having a conduit including a branch conduit split the flow of oxygen-containing gas, the liquid fuel CPOX reformer can include a first source of oxygen-containing gas in fluid communication with the vaporizer and a second source of oxygen-containing gas in fluid communication with a mixing zone downstream of the vaporizer. In this configuration, two separate conduits, one for each source of oxygen-containing gas, can be used, where the independent conduits can merge in a mixing zone downstream of the vaporizer. The use of two different sources of oxygen-containing gas can achieve the same variations in the O:C ratio as described above or elsewhere herein.

Another feature of the present teachings includes a conduit comprising an oxygen-containing gas inlet and a gaseous CPOX reaction mixture outlet located downstream from an outlet of a vaporizer. The conduit can provide fluid communication between the oxygen-containing gas inlet and the gaseous CPOX reaction mixture outlet. The conduit can provide fluid communication among the oxygen-containing gas inlet, an outlet of the vaporizer and the gaseous CPOX reaction mixture outlet. The gaseous CPOX reaction mixture outlet can be in fluid communication with the inlets of the CPOX reactor units. A first source of heat, which can include a heater such as an electric heater, can be disposed in the conduit at a location downstream from the oxygen-containing gas inlet and upstream from the outlet of the vaporizer. A second source of heat, which can include heat of exotherm from the liquid fuel CPOX reformer and/or a fuel cell unit, for example, integrated with the liquid fuel CPOX reformer, can be in thermal communication with the conduit and at a location downstream from the first source of heat and upstream from or coincident with the outlet of the vaporizer. The outlet of the vaporizer can be in fluid communication with the conduit. For example, the outlet of the vaporizer can be in fluid communication with the conduit via another conduit or can be directly adjacent a port in the conduit. The vaporizer can be disposed in the conduit. The vaporizer can be or include a fuel spreader such as a sprayer or a wick.

In various embodiments, a third source of heat, which can include a heater such as an electric heater, can be disposed in the conduit at a location downstream from the first source of heat and upstream from the outlet of the vaporizer. In some embodiments, a liquid fuel CPOX reformer can include a thermally-regulating assembly, the thermally-regulating assembly including a heater and a cooler. The thermally-regulating assembly can be disposed in and/or can be in thermal communication with the conduit at a location downstream from the first source of heat and upstream from the outlet of the vaporizer.

Yet another feature of the presenting teachings is a manifold for distributing gaseous CPOX reaction mixture to the inlets of the CPOX reactor units, i.e., the manifold (or the manifold chamber) can be in fluid communication with the inlets of the CPOX reactor units. The manifold includes a manifold housing, where the manifold housing defines a manifold chamber. The manifold can include a gaseous CPOX reaction mixture distributor disposed within, and extending for at least a majority of the length of, the manifold chamber. The gaseous CPOX reaction mixture distributor can be in fluid communication with a conduit that outputs a gaseous CPOX reaction mixture. The gaseous CPOX reaction mixture distributor can include one or more outlets located opposite the inlets of the CPOX reactor units. The manifold can include a heater and/or passive heating elements in thermal communication with the manifold chamber. The manifold can include a cavity, where the manifold housing defines the cavity. A seal can be disposed within or adjacent to the cavity. The manifold housing typically includes a plurality of cavities, wherein the number and arrangement of the cavities coincide with the number and arrangement of the inlets of the CPOX reactor units. The seal can engage the inlet of the CPOX reactor unit thereby providing a gas-tight seal between the manifold housing and the inlet.

The fuel cell section of an integrated reformer-fuel cell system can include a fuel cell (or fuel cell unit) that has an anode, a cathode, and an electrolyte disposed therebetween. The anode of the fuel cell unit can be in fluid communication with an outlet of the CPOX reactor unit. The cathode of the fuel cell unit can be in fluid communication with (a source of) an oxygen-containing gas. The fuel cell section can include a current collector electrically coupled to the anode and the cathode of the fuel cell unit.

The fuel cell unit of an integrated reformer-fuel cell system can be a solid oxide fuel cell or a polymer electrolyte membrane or proton exchange membrane fuel cell. The fuel cell unit of an integrated reformer-fuel cell system can include a tubular solid oxide fuel cell, for example, a multi-tubular solid oxide fuel cell.

An anode of the fuel cell unit of an integrated reformer-fuel cell system can be in fluid communication with an outlet of a CPOX reactor unit via a conduit, for example, a conduit passing hydrogen-rich reformate therethrough. A cathode of the fuel cell unit of an integrated reformer-fuel cell system can be in fluid communication with (a source of) an oxygen-containing gas via another conduit, for example, an air conduit. In certain embodiments, an outlet of a CPOX reactor unit can be connected directly to an inlet of a fuel cell unit, where the inlet of the fuel cell unit is in fluid communication with an anode of the fuel cell unit.

The fuel cell section of an integrated system also can include an afterburner in fluid communication with an outlet of the fuel cell unit.

In another aspect, the present teachings provide methods of liquid fuel CPOX reforming and electrochemically convening the hydrogen-rich product reformate into electricity. Methods of the present teachings generally include introducing a gaseous CPOX reaction mixture including a vaporized liquid reformable fuel into inlets of CPOX reactor units of liquid fuel CPOX reformers of the present teachings; initiating catalytic partial oxidation of the gaseous CPOX reaction mixture to begin production of a hydrogen-rich reformate; maintaining catalytic partial oxidation of the gaseous CPOX reaction mixture; and converting within a fuel cell unit the hydrogen-rich reformate to electricity.

In various embodiments, introducing a gaseous CPOX reaction mixture includes introducing a gaseous CPOX reaction mixture including a vaporized liquid reformable fuel into inlets of CPOX reactor units, where the CPOX reactor units form an array of spaced-apart CPOX reactor units, each CPOX reactor unit comprising an elongate tube having a wall with an internal surface and an external surface, the wall enclosing an open gaseous flow passageway and defining an inlet and an outlet of the CPOX reactor unit. The CPOX reactor unit can be in thermal communication with at least the adjacent CPOX reactor unit(s) in the array. At least a section of the wall can include a CPOX catalyst. The CPOX catalyst-containing wall section can be gas-permeable to allow gaseous CPOX reaction mixture to diffuse therein and product (hydrogen-rich) reformate to diffuse therefrom. The CPOX catalyst-containing wall section can remain structurally stable under CPOX reaction conditions. The distance between adjacent CPOX reactor units in the array can be as described herein.

Initiating catalytic partial oxidation can include initiating a single igniter to begin the CPOX reaction within a CPOX reactor unit, which in turn can initiate the CPOX reaction in the other CPOX reactor units of the liquid fuel CPOX reformer. For example, initiating catalytic partial oxidation can include initiating a CPOX reaction in one CPOX reactor unit; transferring the heat from the CPOX reaction to an adjacent CPOX reactor unit to initiate a CPOX reaction therein; and repeating transferring the heat to initiate a CPOX reaction in each of the CPOX reactors of the array.

Initiating catalytic partial oxidation also can include initiating more than a single igniter, for example, two, three, four, five or more igniters, to begin the CPOX reaction(s) within the CPOX reactor units of the liquid fuel CPOX reformer.

In various embodiments, maintaining catalytic partial oxidation of the gaseous CPOX reaction mixture includes transferring heat among the CPOX reactor units within the array thereby to use less external heating than otherwise would be required for the same output of hydrogen-rich reformate. The heat transfer among the array of CPOX reactor units can maintain a predetermined minimum array temperature, for example, about 600° C. or 650° C. The predetermined minimum array temperature can be substantially uniform across the array of CPOX reactor units.

In certain embodiments, methods of liquid fuel CPOX reforming and converting within a fuel cell unit hydrogen-rich reformate to electricity can include using the heat of exotherm of the ongoing CPOX reaction(s) and/or heat from some other source to heat the oxygen-containing gas component and/or heat and/or vaporize the liquid reformable fuel of the gaseous CPOX reaction mixture about to undergo CPOX reforming. In particular embodiments, such methods can include using, for example, transferring, the heat of exotherm to a fuel cell unit.

In some embodiments, methods of liquid fuel CPOX reforming can include vaporizing a liquid reformable fuel, for example, at an ambient temperature or an elevated temperature such as upon contact with heated oxygen-containing gas. The methods can include mixing an oxygen-containing gas and a vaporized liquid reformable fuel to provide a gaseous CPOX reaction mixture. Mixing an oxygen-containing gas and a vaporized liquid reformable fuel can provide a gaseous CPOX reaction mixture having an oxygen (O):carbon (C) ratio. The methods can include mixing additional oxygen-containing gas with the initially-formed gaseous CPOX reaction mixture to increase the O:C ratio of the gaseous CPOX reaction mixture upstream of or prior to introducing the gaseous CPOX reaction mixture having an increased O:C ratio into the inlets of the CPOX reactor units.

Where a fluid stream of oxygen-containing gas is split upstream of or prior to a vaporizer, or is reduced in volume through the vaporizer (e.g., where two sources of oxygen-containing gas are used such as with two independent conduits), the methods can include mixing an oxygen-containing gas and a vaporized liquid reformable fuel upstream of, coincident with, in or through a vaporizer, where the amount of heat required to heat the vaporizer to its operating temperature is less than the amount of heat required in the absence of the step of mixing additional oxygen-containing gas with the gaseous CPOX reaction mixture where the method provides a gaseous CPOX reaction mixture having the increased O:C ratio to the inlets of the CPOX reactor units.

In certain embodiments, methods of liquid fuel CPOX reforming can include distributing a gaseous CPOX reaction mixture including a vaporized liquid reformable fuel of substantially uniform composition at a substantially uniform rate and/or at a substantially uniform temperature to the inlets of one or more of several CPOX reactor units.

In various embodiments of the present teachings, introducing a gaseous CPOX reaction mixture into an inlet of a CPOX reactor unit can include introducing an oxygen-containing gas into a conduit for routing fluids toward the inlet of a CPOX reformer unit; heating a stream of the oxygen-containing gas with a first source of heat including an electric heater disposed in the conduit to provide a stream of heated oxygen-containing gas; and introducing a liquid reformable fuel into the stream of heated oxygen-containing gas in, through, coincident with, or past a vaporizer to provide the gaseous CPOX reaction mixture.

The methods can include heating the stream of the oxygen-containing gas and/or the stream of heated oxygen-containing gas with a second source of heat, the second source of heat in thermal communication with the conduit and including heat of exotherm from the CPOX reactor units and/or a fuel cell external to the CPOX reactor units, for example, integrated with the CPOX reformer. The methods can include heating and/or cooling upstream of the vaporizer the stream of oxygen-containing gas and/or the stream of heated oxygen-containing gas, for example, to regulate the temperature of the stream of oxygen-containing gas and/or the stream of heated oxygen-containing gas. Heating a stream of heated oxygen-containing gas can be with a third source of heat including an electric heater disposed in the conduit downstream from the first source of heat.

The methods can include discontinuing heating the stream of oxygen-containing gas with the first source of heat; and reducing or discontinuing heating the stream of oxygen-containing gas and/or the stream of heated oxygen-containing gas with the third source of heat.

In various embodiments, methods of converting within a fuel cell unit the hydrogen-rich reformate to electricity can include contacting hydrogen-rich reformate with an anode of a fuel cell unit; and contacting an oxygen-containing gas such as air with a cathode of the fuel cell unit.

Further, in accordance with the present teachings, methods are provided for CPOX reforming of a liquid reformable fuel in a start-up mode and in a steady-state mode to produce hydrogen-rich reformate and electrochemically converting the reformate within a fuel cell to electricity, where the methods generally can include:

a) in a start-up mode:
(i) introducing a heated gaseous CPOX reaction mixture comprising oxygen-containing gas and vaporized liquid reformable fuel into the inlet of each of a plurality of spaced-apart CPOX reactor units, each reactor unit comprising an elongate tube having an inlet for gaseous CPOX reaction mixture, an outlet for hydrogen-rich reformate, a wall with internal and external surfaces, the wall enclosing an open gaseous flow passageway with at least a section of the wall having CPOX catalyst disposed therein and/or comprising its structure, such catalyst-containing wall section and open gaseous flow passageway enclosed thereby defining a gaseous phase CPOX reaction zone, the catalyst-containing wall section being gas-permeable to allow gaseous CPOX reaction mixture to diffuse therein and product hydrogen-rich reformate to diffuse therefrom while remaining stable under CPOX reaction conditions,
(ii) initiating CPOX reforming of the heated gaseous CPOX reaction mixture within the CPOX reaction zones of the CPOX reactor units thereby commencing the production of hydrogen-rich reformate;
(iii) conveying hydrogen-rich reformate produced in step (ii) to a fuel cell comprising at least one fuel cell unit such that reformate contacts the anode component of the fuel cell unit while at the same time conveying oxygen-containing gas to the fuel cell such that the gas contacts the cathode component of the fuel cell unit, the reformate undergoing conversion within the fuel cell unit to produce electricity; and,
b) in a steady-state mode:
(iv) introducing heated gaseous CPOX reaction mixture into the inlets of the CPOX reactor units,
(v) discontinuing CPOX initiating step (ii) prior to, during or following step (iv) while maintaining the CPOX reaction within the CPOX reaction zones of the CPOX reactor units thereby continuing the production of hydrogen-rich reformate, and
(vi) conveying hydrogen-rich reformate produced in step (v) to the anode component of the at least one fuel cell unit while at the same time conveying oxygen-containing gas to the cathode component of the at least one fuel cell unit, the reformate continuing to undergo conversion within the fuel cell unit to produce electricity.

In some embodiments, the methods of the present teachings can include, for example, in step (i) recited above, adjusting the molar ratio of oxygen to carbon of the gaseous CPOX reaction mixture to correspond to that of a fuel-lean CPOX reaction mixture. In certain embodiments, the methods of the present teachings can include, for example, in step (iv) recited above, adjusting the molar ratio of oxygen to carbon of the gaseous CPOX reaction mixture to correspond to that of a fuel-rich CPOX reaction mixture.

In particular embodiments, the methods can include flowing fluids such as a gas using a blower or a blower system, for example, a series of blower units. Each blower unit in the series can include a casing having an axial inlet and radial outlet, an impeller disposed within the casing for drawing an oxygen-containing gas at a first pressure in the inlet and expelling oxygen-containing gas at a higher pressure through the outlet, a motor for driving the impeller, and a duct containing the outlet of at least one blower unit in the series in the inlet of at least one other blower unit in the series. In certain embodiments, at least one blower unit in the series of blower units can provide from 60% to 90% of the target gas flow of the blower system. In such embodiments, at least one other blower unit in the series of blower units can provide the balance of target gas flow of the blower system.

In some embodiments, the methods can include, for example, in steps (iii) and (vi) recited above, contacting at least a portion of the anode component of the at least one tubular SOFC fuel cell unit with at least one of a reforming catalyst, a catalyst for the water gas shift reaction, and a catalyst that is catalytically-active for both reforming and the water gas shift reaction. As such, unreformed vaporized liquid fuel, cracked fuel, and/or carbon monoxide present in the reformate can undergo reforming and/or the water gas shift reaction in the presence of such catalyst(s) and can produce additional hydrogen for electrochemical conversion to electricity.

In various embodiments of the methods of the present teachings, a method of CPOX reforming of liquid reformable fuel to produce hydrogen-rich reformate and electrochemically converting the hydrogen-rich reformate within a fuel cell to electricity includes carrying out the CPOX reaction within a liquid fuel multi-tubular CPOX reformer as described herein and carrying out the electrochemical conversion in a fuel cell (section) as described herein and/or known the art. In other words, methods of the present teachings can use an integrated liquid fuel (multi-tubular) CPOX reformer and fuel cell system as described herein; however, other appropriately designed and constructed reformer and fuel cell sections are contemplated within the present teachings.

The foregoing as well as other features and advantages of the present teachings will be more fully understood from the following figures, description, detailed exemplary embodiments, and claims.

BRIEF DESCRIPTION OF THE DRAWINGS

It should be understood that the drawings described below are for illustration purposes only. The drawings are not necessarily to scale, with emphasis generally being placed upon illustrating the principles of the present teachings. The drawings are not intended to limit the scope of the present teachings in any way. Like numerals generally refer to like parts.

FIGS. 1A and 1B are longitudinal cross section views of two prior art types of catalyst monoliths, specifically, a honeycomb-like catalyst monolith and a foam catalyst monolith, respectively.

FIGS. 4J and 4K are enlarged longitudinal and lateral cross section views, respectively, of one of the tubular CPOX reactor units shown in FIG. 4I.

FIGS. 4L and 4M are lateral cross section views of two other embodiments of tubular CPOX reactor units of liquid fuel CPOX reformers of the present teachings.

FIGS. 6A and 6B illustrate embodiments of heat exchanger structures for controlling the temperature within the CPOX reaction zones of the CPOX reactor units of the reformer section of additional embodiments of integrated liquid fuel CPOX reformer-fuel cell systems of the present teachings.

DETAILED DESCRIPTION

Figure 2A:
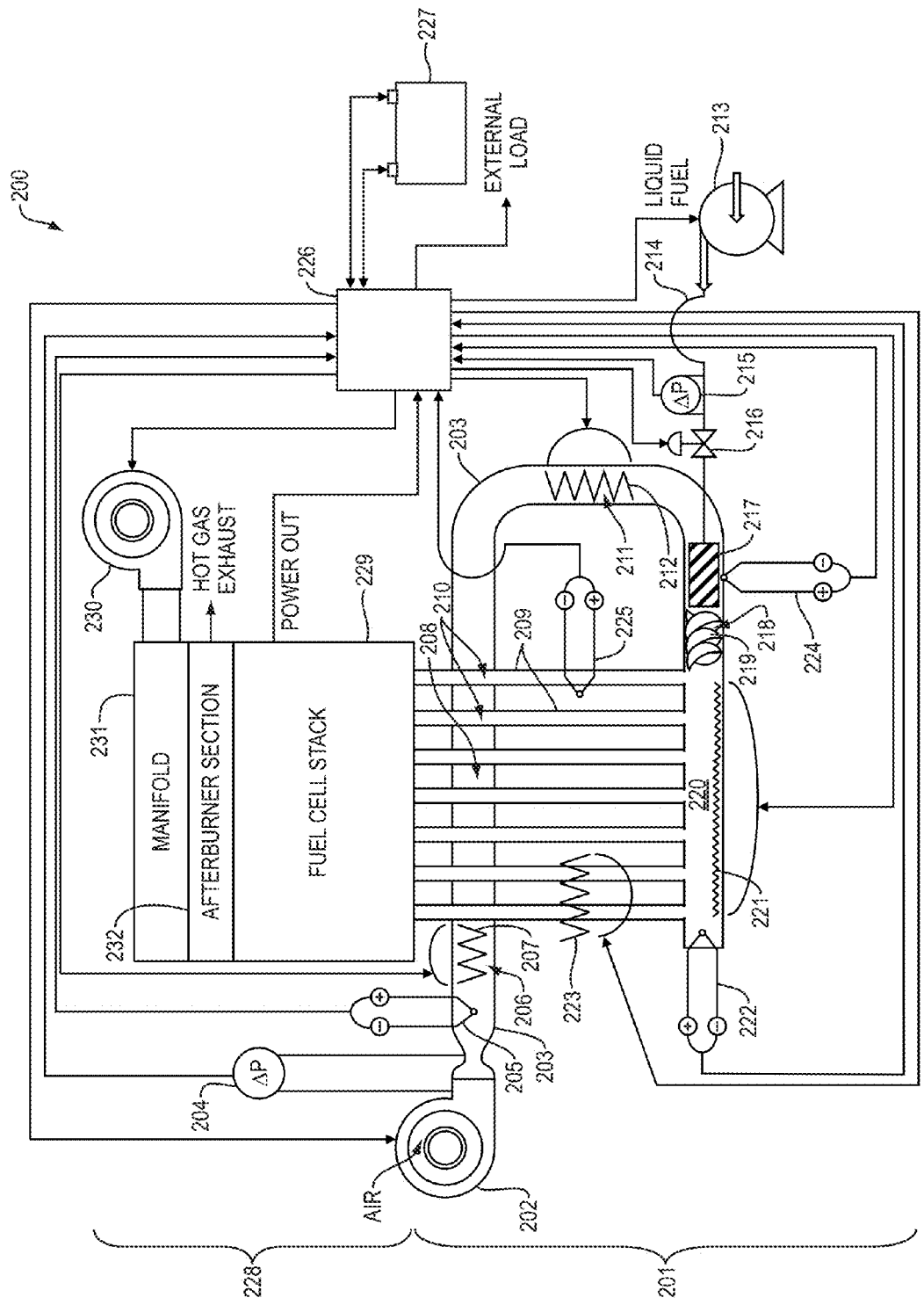
FIGS. 2A and 2B are schematic block diagrams of two embodiments of an integrated liquid fuel CPOX reformer-fuel cell system in accordance with the present teachings.

It now has been discovered that a liquid fuel CPOX reactor section can be integrated efficiently and effectively with a fuel cell section to provide an integrated liquid fuel CPOX reformer-fuel cell system. In particular, a feature of the design of the reformer section is a multi-tubular array of CPOX reactor units where the tubular CPOX reactor units can have a lateral cross section that can match the lateral cross section of inlets of a multi-tubular fuel cell section. Consequently, the outlets of the reformer units can be positioned in direct fluid communication with, for example, directly coupled to, the inlets of a multi-tubular fuel cell for an efficient and effective union to provide an integrated reformer-fuel cell system. Moreover, the compatibility of the design of such reformers and fuel cells can permit the interchangeability of reformers and fuel cells to address different applications, for example, different catalyst loadings for different liquid reformable fuels to power the integrated reformer-fuel cell system.

In addition, a reformer section can include an array of spaced-apart CPOX reactor units that can take advantage of the exothermic CPOX reaction to provide a more efficient reforming process. Unlike known and conventional CPOX reformers which employ catalyst monoliths that are susceptible to flashing, the formation of localized hot spots and cold spots, rapid coke-buildup, and/or excessively high-spiking CPOX reaction temperatures, an array of spaced-apart CPOX reactor units of the present teachings can mitigate or eliminate one or more of these drawbacks.

For example, with respect to the CPOX reformer section, the distribution of the total CPOX reforming or CPOX conversion load among an array of spaced-apart CPOX reactor units can simplify and facilitate the maintenance of effective thermal balance and control of the overall CPOX reforming. Such a design can permit more vaporized liquid reformable fuel to be processed for a given CPOX catalyst loading by lowering operating temperatures for a given energy input.

The improved thermal management of the liquid fuel CPOX reformers as described herein also can contribute to the stabilization of the temperature of the CPOX reaction taking place within each of the CPOX reactor units. Consequently, such improved thermal management can maintain suitably uniform CPOX conversion performance among the CPOX reactor units of a liquid fuel CPOX reformer of an integrated reformer-fuel cell system.

In addition, the design of the CPOX reformers of the present teachings can take advantage of the exothermic CPOX reaction and can permit an array of spaced-apart CPOX reactor units to be ignited with a minimum number of igniters, for example, a single igniter, whereby the initiation of the CPOX reaction in one of the CPOX reactor units can provide sufficient heat to adjacent CPOX reactor unit(s) to begin the CPOX reforming therein and eventually in each of the CPOX reactor units of the liquid fuel CPOX reformer. Although a single igniter can be advantageous in a liquid fuel CPOX reformer, the present teachings contemplate the use of more than a single or one igniter in the liquid fuel CPOX reformer as the specific size of the array and CPOX reactor units, placement of the CPOX reactor units and igniters, and other factors can contribute to an overall efficient initiation or start-up process for CPOX reforming. Nevertheless, an advantage of distributing the total CPOX conversion load among a plurality of CPOX reactor units in contrast to a single CPOX reactor of comparable fuel conversion capacity is the shorter start-up times than are typical for a single, larger reformer. Shorter start-up times for the reformer section of an integrated reformer-fuel cell system translate to shorter start-up times of the fuel cell section coupled thereto.

Moreover, the spaced-apart arrangement of the plurality of CPOX reactor units can simplify the design and manufacture of a related series or line of liquid fuel CPOX reformers, where individual liquid fuel CPOX reformers can differ in their fuel-reforming capacities. For example, a new, liquid fuel CPOX reformer design that desires increased fuel-reforming capacity readily can be constructed by adding additional liquid fuel CPOX reactor units of standardized specification to an existing design with a few, if any, other significant modifications. When integrated with a similarly-designed multi-tubular fuel cell unit, such a liquid fuel CPOX reformer and fuel cell unit can permit flexibility in the construction and modification of an integrated reformer-fuel cell system.

Furthermore, in various configurations and in operation of a liquid fuel CPOX reformer and/or an integrated reformer-fuel cell system in accordance with the present teachings, back pressures of not more than about 3 inches of water (0.0075 bar), for example, not more than about 2 inches of water, or not more than about 1 inch of water, are readily achievable.

It is to be understood that the present teachings herein are not limited to the particular procedures, materials, and modifications described and as such can vary. It is also to be understood that the terminology used is for purposes of describing particular embodiments only and is not intended to limit the scope of the present teachings, which will be limited only by the appended claims.

Throughout the application, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the focus and scope of the present teachings, whether explicit or implicit herein. For example, where reference is made to a particular structure, that structure can be used in various embodiments of apparatus of the present teachings and/or in methods of the present teachings.

The use of the terms "include," "includes," "including," "have," "has," "having," "contain," "contains," or "containing," including grammatical equivalents thereof, should be generally understood as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. For example, the methods described herein can be performed in any suitable order unless otherwise indicated herein or otherwise clearly contradicted by context. Moreover, two or more steps or actions can be conducted simultaneously.

At various places in the present specification, values are disclosed in groups or in ranges. It is specifically intended that the description include each and every individual subcombination of the members of such groups and ranges and any combination of the various endpoints of such groups or ranges. For example, an integer in the range of 0 to 40 specifically is intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 specifically is intended to individually disclose 1, 2, 3, 4, 5, 6, 7, 8, 9, 10, 11, 12, 13, 14, 15, 16, 17, 18, 19, and 20.

The use of any and all examples, or exemplary language provided herein, for example, "such as," is intended merely to better illuminate the present teachings and does not pose a limitation on the scope of the invention unless claimed. No language in the specification should be construed as indicating any non-claimed element as essential to the practice of the present teachings.

Terms and expressions indicating spatial orientation or altitude such as "upper," "lower," "top," "bottom," "horizontal," "vertical," and the like, unless their contextual usage indicates otherwise, are to be understood herein as having no structural, functional or operational significance and as merely reflecting the arbitrarily chosen orientation of the various views of liquid fuel CPOX reformers of the present teachings illustrated in certain of the accompanying figures.

The term "ceramic," in addition to its art-recognized meaning, shall be understood herein to include glasses, glass-ceramics, and cermets (i.e., ceramic-metal composites).

The expression "gas permeable," as it applies to a wall of a CPOX reactor unit herein, shall be understood to mean a wall structure that is permeable to gaseous CPOX reaction mixtures and gaseous product reformate including, without limitation, the vaporized liquid reformable fuel component of the gaseous CPOX reaction mixture and the hydrogen component of the product reformate.

The expression "liquid reformable fuel" shall be understood to include reformable carbon- and hydrogen-containing fuels that are a liquid at standard temperature and pressure (STP) conditions, for example, methanol, ethanol, naphtha, distillate, gasoline, kerosene, jet fuel, diesel, biodiesel, and the like, that when subjected to reforming undergo conversion to hydrogen-rich reformates. The expression "liquid reformable fuel" shall be further understood to include such fuels whether they are in the liquid state or in the gaseous state, i.e., a vapor.

The expression "gaseous reformable fuel" shall be understood to include reformable carbon- and hydrogen-containing fuels that are a gas at STP conditions, for example, methane, ethane, propane, butane, isobutane, ethylene, propylene, butylene, isobutylene, dimethyl ether, their mixtures, such as natural gas and liquefied natural gas (LNG), which are mainly methane, and petroleum gas and liquefied petroleum gas (LPG), which are mainly propane or butane but include all mixtures made up primarily of propane and butane, and the like, that when subjected to reforming undergo conversion to hydrogen-rich reformates. A gaseous reformable fuel also includes ammonia, which like other gaseous reformable fuels, can be stored as a liquid.

The expression "CPOX reaction" shall be understood to include the reaction(s) that occur during catalytic partial oxidation reforming or conversion of a reformable fuel to a hydrogen-rich reformate.

The expression "gaseous CPOX reaction mixture" refers to a mixture including a gaseous liquid reformable fuel (e.g., a vaporized liquid reformable fuel), a gaseous reformable fuel, or combinations thereof, and an oxygen-containing gas, for example, air. As used herein, a gaseous CPOX reaction mixture includes a vaporized liquid reformable fuel (or a gaseous liquid reformable fuel). A gaseous reformable fuel also includes ammonia, which like other gaseous reformable fuels, can be stored as a liquid.

The expression "open gaseous flow passageway" refers to a conduit or channel for the passage of gas therethrough where a solid, including a porous solid or material, is not present across the entire cross-sectional plane of the conduit or channel. i.e., a conduit or channel free of solids, including porous solids. For example, in the case of a CPOX reactor unit, CPOX catalyst including a porous catalyst such as a monolith cannot be present across the entire internal cross-sectional plane perpendicular to the longitudinal axis of a tubular CPOX reactor unit. Such a structure is distinct from passageways which are packed with a porous catalyst, for example, a monolith, as previously discussed. An open gaseous flow passageway also can be present in a CPOX reactor unit which can be defined as a tube which defines a hollow bore, or a cylindrical substrate defining a hollow bore therethrough along its longitudinal axis. In these exemplary descriptions, the hollow bore can be considered an open gaseous flow passageway. Although an open gaseous flow passageway usually can extend along a longitudinal axis of a CPOX reactor unit, a tortuous conduit or channel also is contemplated by the present teachings and can be capable of having an open gaseous flow passageway provided that the tortuous conduit or channel is free of solids across a cross-sectional plane of the CPOX reactor unit. It also should be understood that the cross-sectional dimension(s) of an open gaseous flow passageway can vary long its longitudinal axis or along the tortuous conduit or channel.

An important feature of a liquid fuel CPOX reformer of the present teachings is the array of spaced-apart CPOX reactor units. An array of CPOX reactor units can refer to an orderly arrangement or a regular placement of a CPOX reactor unit in relation to the other CPOX reactor unit(s). In other words, the CPOX reactor units typically are not randomly positioned or placed. Although straight line, square, and rectangular configurations are commonly used, other configurations such as hexagonal and octagonal are contemplated by the present teachings.

The arrangement or placement of the CPOX reactor units, for example, distance and location with respect to adjacent CPOX reactor units, can be determined by various factors including, among others, the positioning and configuration of the plurality of CPOX reactor units, the materials of construction of the CPOX reactor units such as its walls and CPOX catalyst, the liquid reformable fuel, the operating temperature of the CPOX reactor units, and the desired use and output of product hydrogen-rich reformate, for example, the materials of construction of a fuel cell unit or system to which the CPOX reformer is to be integrated, for example, to which it is connected or coupled. If the distance between or among (adjacent) CPOX reactor units is too great, then the CPOX reactors units will not be thermally connected or have insufficient thermal communication, for example, to initiate a CPOX reaction in an adjacent CPOX reactor unit and/or to maintain a heat transfer zone roughly encompassing the plurality of CPOX reactor units. Conversely, if the distance between or among (adjacent) CPOX reactor units is too small, the CPOX reactor units may be subjected to overheating and degradation, which can result in malfunction of the liquid fuel CPOX reformer, and/or damage to the integrated fuel cell unit or system.

More specifically, the maximum distance between adjacent CPOX reactor units can be that distance beyond which a CPOX reaction fails to be initiated within an adjacent CPOX reactor unit by the heat generated from an initial CPOX reaction (e.g., an initial CPOX reaction initiated by an igniter) in a first-ignited CPOX reactor unit or from a CPOX reaction in an operating CPOX reactor unit. The maximum distance can be that distance beyond which, during a steady-state mode of operation, the temperature of the array of spaced-apart CPOX reactor units fills below a predetermined minimum array temperature. Depending on various factors, including those discussed herein, the predetermined minimum array temperature of an array of spaced-apart CPOX reactor units during steady-state mode of operation can be about 550° C., about 575° C., about 600° C., about 625° C., about 650° C., about 675° C., about 700° C., about 725° C., about 750° C., about 775° C., about 800° C., about 825° C., or about 850° C.

The minimum distance between adjacent CPOX reactor units can be that distance below which the temperature at an outlet of a CPOX reactor unit is greater than a predetermined maximum temperature. The predetermined maximum temperature can be a temperature that is tolerable by an inlet of a fuel cell stack in thermal and fluid communication with an outlet of a CPOX reactor unit, for example, a temperature at which the seals of the inlets of the fuel cell stack do not degrade and remain functional. Depending on various factors, including those discussed herein, the predetermined maximum temperature of a CPOX reactor unit can be about 775° C., about 800° C., about 825° C., about 850° C., about 875° C., about 900° C., about 925° C., about 950° C., about 975° C., or about 1000° C.

Another feature of CPOX reformers of the present teachings is an igniter for initiating the CPOX reaction within the CPOX reactor units, for example, of an array of CPOX reactor units. In various embodiments, a single igniter can be used to initiate a CPOX reaction within each of the CPOX reactor units of a liquid fuel CPOX reformer. In other embodiments, more than a single or one igniter, for example, two igniters, three igniters, or more than three igniters, can be used to initiate or start the CPOX reaction within the CPOX reactor units. The number and placement of the igniter(s) can be determined by various parameters including, for example, the design, structure and placement of the CPOX reactor units, and the desired efficiency and rapidity of start-up of a liquid fuel CPOX reformer.

An igniter can include a radiant heat-producing element positioned in proximity to, but in physical isolation from, an internal surface of a CPOX reactor unit, which also can be disposed within a chamber. For example, an igniter can transmit radiant heat to an exposed internal surface and/or CPOX catalyst of at least one CPOX reactor unit in proximity thereto to initiate the CPOX reaction therein. Subsequently, radiant heat produced by the CPOX reaction occurring within the CPOX reaction zone of the at least one CPOX reactor unit in turn can initiate a CPOX reaction within at least one other CPOX reactor unit, typically also within the chamber, until in such manner the CPOX reaction has been initiated in all of the CPOX reactor units of the liquid fuel CPOX reformer.

In various embodiments of a liquid fuel CPOX reformer of the present teachings, a vaporizer, for example, to vaporize liquid reformable fuel, can be in fluid communication with the inlets of the CPOX reactor units. The vaporizer should be operated to avoid heating the liquid reformable fuel to a temperature at or above its flash point as well as to avoid causing thermochemical degradation, for example, pyrolysis, of the reformable fuel. In certain embodiments, a vaporizer can be a fuel spreader such as a sprayer or a wick. A vaporizer can be located in a conduit such as the main conduit, which is in fluid communication with the inlets of the CPOX reactor units. A vaporizer can be located outside such a conduit (e.g., the main conduit), for example, adjacent to and/or in fluid communication with the (main) conduit via a port or other inlet in the main conduit and/or via another conduit providing fluid communication between the vaporizer and the main conduit.

In some embodiments, a hydrogen barrier can be associated with, such as attached to, the external surface of at least the catalyst-containing wall section of a tubular CPOX reactor unit, which catalyst-containing wall section typically defines the CPOX reaction zone. The hydrogen barrier can be attached to the entire external surface of the wall of a CPOX reactor unit. The hydrogen barrier can prevent or inhibit the loss of hydrogen from the CPOX reactor unit. In the absence of such a barrier, hydrogen may diffuse through and beyond the catalyst-containing wall section of the CPOX reactor unit rather than exit the CPOX reactor unit through its outlet.

In particular embodiments, a liquid fuel CPOX reformer can include a source of liquid reformable fuel. The source of liquid reformable fuel can include a drum, barrel, tank or other container for storage and/or delivery of a liquid reformable fuel to the liquid fuel CPOX reformer, for example, to a vaporizer for converting the liquid reformable fuel into a vaporized or gaseous liquid reformable fuel.

Accordingly, in various embodiments, the liquid fuel CPOX reformer of an integrated reformer-fuel cell system can include an array of spaced-apart CPOX reactor units as described herein; an igniter in thermal communication with a CPOX catalyst of at least one CPOX reactor unit; a vaporizer in fluid communication with inlets of the CPOX reactor units; a source of liquid reformable fuel in fluid communication with the vaporizer; a fuel cell unit as described herein where an anode of the fuel cell unit is in fluid communication with an outlet of the CPOX reactor unit; and a current collector electrically coupled to the anode and a cathode of the fuel cell unit. The CPOX reactor units can include an elongate tube, for example, a cylinder defining a hollow bore, having a gas-permeable ceramic wall with an internal surface and an external surface, where at least a section of the gas-permeable ceramic wall comprises a CPOX catalyst. The gas-permeable ceramic wall can enclose an open gaseous flow passageway and defines an inlet and an outlet of the CPOX reactor unit. When in an array, a CPOX reactor unit usually is in thermal communication with at least the adjacent CPOX reactor unit(s) in the array.

In certain embodiments, an integrated liquid fuel multi-tubular CPOX reformer and fuel cell system has a liquid fuel CPOX reformer section including a plurality of spaced-apart CPOX reactor units, each reactor unit comprising an elongate tube having an inlet for gaseous CPOX reaction mixture, and an outlet for hydrogen-rich reformate, a wall with internal and external surfaces, the wall enclosing an open gaseous flow passageway with at least a portion of the wall having CPOX catalyst disposed therein, comprising its structure or a combination thereof, such catalyst-containing wall section and open gaseous flow passageway enclosed thereby defining a gaseous phase CPOX reaction zone, the catalyst-containing wall section being gas-permeable to allow gaseous CPOX reaction mixture to diffuse therein and product hydrogen-rich reformate to diffuse therefrom while remaining stable under CPOX reaction conditions.

In some embodiments, an integrated liquid fuel multi-tubular CPOX reformer and fuel cell system can include a liquid fuel CPOX reformer section that can be coupled to a tubular, planar or monolithic solid oxide fuel cell section.

In certain embodiments, an integrated liquid fuel multi-tubular CPOX reformer and fuel cell system can include a liquid fuel CPOX reformer section that can be coupled to a polymer electrolyte membrane fuel cell section through a carbon monoxide reducing device or section in which the level of the carbon monoxide component of the hydrogen-rich reformate produced in the liquid fuel CPOX reformer section can be reduced prior to introduction of the hydrogen-rich reformate into the polymer electrolyte membrane fuel cell section. Such carbon monoxide reducing devices also can be present for other types of fuel cells, for example, a solid oxide fuel cell (section).

In particular embodiments, an integrated liquid fuel multi-tubular CPOX reformer and fuel cell system can have the outlet of each tubular CPOX reactor unit of the liquid fuel CPOX reformer section directly connected to an inlet of a corresponding tubular solid oxide fuel cell unit. In various embodiments, an integrated liquid fuel multi-tubular CPOX reactor and a tubular solid oxide fuel cell system can include at least a portion of a tubular CPOX reactor unit disposed within an axial fuel flow passageway of a corresponding tubular solid oxide fuel cell unit. In some embodiments, the outlets of the CPOX reactor units are in fluid communication with a manifold or similar component that can combine the effluent stream from multiple CPOX reactor unit outlets and distribute such combined effluent to an equal, a greater, or a lesser number of inlets to a fuel cell section, for example, an anode of a fuel cell unit.

In some embodiments, an integrated liquid fuel multi-tubular CPOX reformer and fuel cell system can include at least a portion of the anode component of a solid oxide fuel cell unit in contact with at least one of a reforming catalyst, a catalyst for the water gas shift reaction, and a catalyst that is catalytically-active for both reforming and the water gas shift reaction.

In various embodiments, an integrated liquid fuel multi-tubular CPOX reactor and a tubular solid oxide fuel cell system can include at least a portion of a tubular CPOX reactor unit disposed within an axial fuel flow passageway of a corresponding tubular solid oxide fuel cell unit.

In particular embodiments, an integrated liquid fuel multi-tubular CPOX reformer and fuel cell system can have the walls of its tubular CPOX reactor units include at least two regions, a first, or upstream, region being substantially devoid of CPOX catalyst and enclosing an essentially CPOX reaction-free zone of relatively low operating temperature and a second, or downstream, region containing CPOX catalyst and enclosing a CPOX reaction zone of relatively high operating temperature.

In some embodiments, an integrated liquid fuel multi-tubular CPOX reformer and fuel cell system can include one or more conduits for routing gas toward the inlets of the CPOX reactor units. For example, one or more conduits can be present and can include an inlet for oxygen-containing gas, an inlet for liquid reformable fuel or vaporized liquid reformable fuel, a mixing zone in which oxygen-containing gas and vaporized liquid reformable fuel can combine to provide gaseous CPOX reaction mixture, and an outlet for gaseous CPOX reaction mixture. The conduit(s) can be generally U-shaped.

The system can include a first heater unit operable during a start-up mode of operation of the CPOX reformer section to heat oxygen-containing gas introduced into the conduit to an initial elevated temperature, and a second heater unit operable during start-up mode and steady-state modes of operation of the CPOX reformer section to heat oxygen-containing gas previously heated to an initial elevated temperature to a further elevated temperature.

In some embodiments, heat recovered from the exotherm of a CPOX reaction occurring within the liquid fuel CPOX reformer section and/or heat recovered from the fuel cell section can be utilized to heat oxygen-containing gas, heat liquid reformable fuel, and/or vaporize liquid reformable fuel prior to formation of a gaseous CPOX reaction mixture.

In certain embodiments of the present teachings, a conduit can be present and include an oxygen-containing gas inlet and a gaseous CPOX reaction mixture outlet located downstream from an outlet of a vaporizer. The conduit can provide fluid communication between the oxygen-containing gas inlet and the gaseous CPOX reaction mixture outlet. The conduit can provide fluid communication among the oxygen-containing gas inlet, an outlet of the vaporizer and the gaseous CPOX reaction mixture outlet. The gaseous CPOX reaction mixture outlet can be in fluid communication with the inlets of the CPOX reactor units. A first source of heat, which can include a heater such as an electric heater, can be disposed in the conduit at a location downstream from the oxygen-containing gas inlet and upstream from the outlet of the vaporizer. A second source of heat, which can include heat of exotherm from the liquid fuel CPOX reformer and/or a fuel cell unit or system external to the liquid fuel CPOX reformer, for example, integrated with the liquid fuel CPOX reformer, can be in thermal communication with the conduit and at a location downstream from the first source of heat and upstream from or coincident with the outlet of the vaporizer. The outlet of the vaporizer can be in fluid communication with the conduit. For example, the outlet of the vaporizer can be in fluid communication with the conduit via another conduit or can be directly adjacent a port in the conduit. The vaporizer can be disposed in the conduit. The vaporizer can be or include a fuel spreader such as a sprayer or a wick.

In various embodiments, a third source of heat, which can include a heater such as an electric heater, can be disposed in the conduit at a location downstream from the first source of heat and upstream from the outlet of the vaporizer. In some embodiments, a liquid fuel CPOX reformer can include a thermally-regulating assembly, where the thermally-regulating assembly includes a heater and a cooler. The heater and/or the cooler can be independently disposed in and/or be in thermal communication with the conduit at a location downstream from the first source of heat and upstream from the outlet of the vaporizer. In certain embodiments, the thermally-regulating assembly can be substituted for the third source of heat.

In particular embodiments, a controller in operable communication with a thermocouple located in the conduit at or downstream from an outlet of the vaporizer, a thermocouple located in the conduit upstream of the vaporizer, an oxygen-containing gas flow meter located in the conduit upstream of the vaporizer, a liquid reformable fuel flow meter located at or upstream of the vaporizer and in fluid communication with a source of liquid reformable fuel, a source of oxygen-containing gas, a source of liquid reformable fuel, the first source of heat, the second source of heat, when present, and the third source of heat and/or the thermally-regulating assembly, when present.

In operation, one or more heaters such as electric heaters in a conduit can heat a stream of oxygen-containing gas, for example, introduced into the conduit, which can direct fluids toward the inlets of the CPOX reactor units. The heated oxygen-containing gas can assist in heating a liquid reformable fuel and/or maintain a gaseous state of the vaporized liquid reformable fuel (or at least not cool the liquid reformable fuel and/or vaporized liquid reformable fuel) when mixed to form a gaseous CPOX reaction mixture. As the CPOX reactor units start-up and begin to generate heat, the heat of exotherm of the CPOX reactions can be used to heat the oxygen-containing gas. Consequently, the use of the one or more electric heaters can be discontinued.

In certain cases, a heater and a cooler of a thermally-regulating assembly can be independently present in the conduit and/or in thermal communication with the conduit. The thermally-regulating assembly including a heater and a cooler can be positioned at a location downstream from the first source of heat and upstream from the liquid reformable fuel inlet, usually sufficiently upstream of the vaporizer to be able to adjust the temperature of the stream of (heated) oxygen-containing gas and in particular, the stream of (heated) oxygen-containing gas heated by the exotherm of the CPOX reactions, before it reaches the vaporizer to prevent a thermal run away situation.

For example, the heater can be an electric heater such as an electrical resistance heater located in the conduit. The heater can be located exterior to the conduit but in thermal communication with it. The cooler can be a fluid (e.g., liquid) heat exchanger in thermal communication with the conduit, for example, the exterior surface of the conduit, such that cooling fluids at an appropriate temperature can be circulated through the fluid heat exchanger to lower the temperature of the stream of heated oxygen-containing gas (or in some cases where a CPOX reaction is conducted with gaseous reformable fuel upstream in the conduit, the stream of CPOX reaction mixture). That is, the thermally-regulating assembly can control and adjust the temperature of the stream of (heated) oxygen-containing gas (or CPOX reaction mixture) to raise or to lower its temperature, as appropriate for the operating system.

To assist in the thermal monitoring and regulation of the oxygen-containing gas, a controller such as a microprocessor can be used, where the controller monitors the flow rates of the liquid reformable fuel and/or the oxygen-containing gas and the temperatures of the vaporizer and the pre-heating sections (e.g., where the first, second and third sources of heat and/or thermally-regulating assembly can be located, when present) of the conduit(s) leading to the vaporizer. In such a fashion, the vaporization of the liquid reformable fuel and/or the creation of a gaseous CPOX reaction mixture can be controlled, for example, via a closed loop system including the controller and appropriate sensor and valve assemblies that are in operable communication as appropriate.

The electric heaters can be electrical resistance heaters. The vaporizer can include a liquid fuel line, where the liquid fuel line provides fluid communication between the vaporizer and a source of liquid fuel. The terminal section of the liquid fuel line located in the conduit can be a fuel spreader, for example, a sprayer or a wick. The liquid fuel line can include a heat transfer section. The heat transfer section of the liquid fuel line can be in thermal communication with and in proximity to at least one of the first source of heat, the second source of heat, and the third source of heat or thermally-regulating assembly, when present.

In various embodiments, a liquid fuel CPOX reformer of an integrated reformer-fuel cell system also is capable of alternately or concurrently processing gaseous reformable fuel to hydrogen-rich reformate. For example, a gaseous reformable fuel can be first used to initiate a CPOX reaction and heat up the other components of the system. The CPOX reaction can be in the CPOX reactor units. However, the CPOX reaction can be in the (main) conduit downstream from the inlet for the source of oxygen-containing gas and the inlet for the source of gaseous reformable fuel. For example, the conduit can include an inlet for gaseous reformable fuel, and a CPOX catalyst-containing section downstream from the gaseous reformable fuel inlet and the oxygen-containing gas inlet and upstream from the outlet of the vaporizer. In such a design and operation, a CPOX reaction early in the reformer system can facilitate a quick and efficient thermal start-up of the reformer and its various components.

In either case and possibly both, after the reformer has initiated CPOX reaction in the CPOX reactor units, the heat of exotherm from the CPOX reaction in the conduit and/or CPOX reactor units can be used to heat liquid reformable fuel and assist in vaporizing the liquid reformable fuel so that when in steady-state operation, only liquid reformable fuel can be used (i.e., the use of gaseous reformable fuel can be discontinued or reduced). The use of gaseous reformable fuel initially to start-up the CPOX reformer followed by the use of liquid reformable fuel in addition to or by itself can provide an efficient and quick start-up of the CPOX reformer compared to start-up with only liquid reformable fuel, which would require more heat input for the system to achieve its operational temperature because of the need to heat and vaporize the liquid reformable fuel.

In certain embodiments, a liquid fuel CPOX reformer of an integrated reformer-fuel cell system can have a split routing system for directing the flow of the oxygen-containing gas component of the gaseous CPOX reaction mixture, where one portion of the oxygen-containing gas can be combined with the reformable fuel in order to provide a relatively fuel-rich stream which can be resistant to flashing and another portion of the oxygen-containing gas can be combined downstream with the fuel-rich stream in order to provide a gaseous CPOX reaction mixture that can be within a preset molar ratio of oxygen to carbon for a desired CPOX reforming reaction. For example, the split routing system can include an oxygen-containing gas conduit including a branch conduit, where the oxygen-containing gas conduit can provide fluid communication between a source of oxygen-containing gas and the vaporizer and the branch conduit can provide fluid communication between the source of oxygen-containing gas and a mixing zone downstream of the vaporizer. The oxygen-containing gas conduit and the branch conduit can split or divide the delivery of an oxygen-containing gas from the source of oxygen-containing gas to the vaporizer and the mixing zone downstream of the vaporizer.

In particular embodiments, a liquid fuel CPOX reformer section can include a vaporizer for vaporizing liquid reformable fuel, where the vaporizer is in fluid communication with inlets of the CPOX reactor units. The vaporizer can be operated to eliminate or reduce the risk of heating the fuel to a temperature at or above its flash point and/or causing appreciable pyrolysis of fuel.

In some embodiments, an integrated system of the present teachings can vaporize a liquid reformable fuel at an ambient temperature or an elevated temperature, for example, upon contact with a heated oxygen-containing gas.

In various embodiments, a liquid fuel CPOX reformer section of an integrated reformer-fuel cell system can include a manifold or plenum, which is in fluid communication with inlets of CPOX reactor units. A manifold can be configured to provide a more uniform distribution of a gaseous CPOX reaction mixture, for example, at a substantially uniform composition, at a substantially uniform temperature, and/or at a substantially uniform rate, to inlets of CPOX reactor units.

In certain embodiments, a manifold can have a housing or enclosure that defines a manifold chamber. A manifold or manifold chamber can include a gas distributor, for example, a gas distributor within the manifold chamber. In particular embodiments, the gas distributor can be considered to be a gaseous fuel CPOX reaction mixture distributor. The housing or enclosure can be fabricated from a relatively low cost, readily moldable thermoplastic or thermosetting resin. In particular embodiments, the manifold can include "cold seal" connections between its outlets and inlets of the CPOX reactor units.

More specifically, a manifold can be in fluid communication with the inlet of at least one CPOX reactor unit, where the manifold includes a manifold housing. The manifold housing can define a manifold chamber. The manifold can include one or more additional components such as a gaseous CPOX reaction mixture distributor, a heater, and a cavity including a seal.

The gaseous CPOX reaction mixture distributor can be disposed within, and extending for at least a majority of the length of, the manifold chamber, where is in fluid communication with a gaseous reactants conduit, and the gaseous CPOX reaction mixture distributor includes one or more outlets located opposite the inlet of the CPOX reactor unit. That is, a gaseous CPOX reaction mixture distributor can include a housing defining a chamber, for example, a closed-ended hollow tube or other structure, typically having a length greater than its width and depth. The housing can define a one or more outlets providing fluid communication between the interior of the housing or chamber and the exterior of the housing. The one or more outlets can be along one side of the gaseous CPOX reaction mixture distributor or form a line or longitudinal array along its longitudinal axis, for example, in the case of a tubular gaseous CPOX reaction mixture distributor. When positioned in the manifold chamber, the one or more outlets of the gaseous CPOX reaction mixture distributor usually are located opposite the inlets of the CPOX reactor units. In such a design, the CPOX reaction mixture is initially introduced into the manifold chamber in a direction away from the inlets of the CPOX reactors units, for example, downward towards the bottom of the manifold chamber and then will flow towards the inlets of the CPOX reactor units, for example, flowing upwards to the inlets.

A heater can be in thermal communication with the manifold chamber. The heater can be an electrical resistance heater. The heater can be disposed within the manifold chamber. In addition, the heater can include a passive heating element such as at least one thermally conductive element in thermal communication with the manifold and a CPOX reaction zone of CPOX reactor unit thereby to transfer heat of exotherm from the CPOX reaction zone and/or CPOX reactor unit to the manifold.

The manifold housing can define one or more cavities. A seal can be disposed within or adjacent to the cavity, where the seal can engage the inlet of the CPOX reactor unit and can provide a gas-tight seal between the manifold housing and the inlet. Where more than one CPOX reactor unit is present, the manifold housing can include the same number of cavities as CPOX reactor units such that each CPOX reactor unit can be in fluid communication with the manifold chamber and each cavity can include a seal securing a respective CPOX reactor unit. The cavities of the manifold housing can be sized and arranged in the same configuration as the inlets of the CPOX reactor units to provide a match for each cavity to an inlet. The seal can be a gasket. The manifold housing can be fabricated from or include a material that remains thermally and mechanically stable at the temperature of operation of the CPOX reactor units.

In various embodiments, an igniter for initiating the CPOX reaction within an array of tubular CPOX reactor units, for example, during a start-up mode of operation of a liquid fuel CPOX reformer, is in thermal communication with a CPOX catalyst, for example, in a CPOX reaction zone. The igniter can initiate a CPOX reaction in at least one CPOX reactor unit proximate thereto with heat of exotherm within the at least one CPOX reactor unit in turn initiating the CPOX reaction within one or more other CPOX reactor units within the array.

In various embodiments, an integrated reformer-fuel cell system of the present teachings can include a blower system, which can include an interconnected series of individual centrifugal blower units. A blower system for the liquid fuel CPOX reformer section can introduce a flow of an oxygen-containing gas into the CPOX reformer. A blower system for the fuel cell section can introduce an oxygen-containing gas into the fuel cell section, for example, to a cathode of the fuel cell unit. A blower system of the integrated reformer-fuel cell system also can drive gas flow within the CPOX reformer and/or the fuel cell sections, for example, for heat transfer, which can include heating and/or cooling of structure(s) and thermal zone(s).

In some embodiments, the integrated reformer-fuel cell system can include a control system that can be adapted to control the operations of the integrated reformer-fuel cell system, i.e., the liquid fuel CPOX reformer and fuel cell sections, in the start-up, steady-state, and/or shut-down modes of the integrated reformer-fuel cell system.

A liquid fuel CPOX reformer of the present teachings can include a conduit for routing gas toward the inlets of the CPOX reactor units. The conduit can include an inlet for oxygen-containing gas, an inlet for liquid reformable fuel, vaporized liquid reformable fuel, gaseous reformable fuel and combinations thereof, a mixing zone in which oxygen-containing gas and vaporized liquid reformable fuel combine to provide a gaseous CPOX reaction mixture, and an outlet for gaseous CPOX reaction mixture.

A liquid fuel CPOX reformer of the present teachings can include at least one source of heat. For example, a liquid fuel CPOX reformer can include a first heater unit operable during a start-up mode of operation of the liquid fuel CPOX reformer to heat oxygen-containing gas introduced into a conduit to an initial elevated temperature. A liquid fuel CPOX reformer also can include a second heater unit operable during start-up mode and steady-state modes of operation of the liquid fuel CPOX reformer to heat oxygen-containing gas previously heated to an initial elevated temperature to a further elevated temperature.

A liquid fuel CPOX reformer of the present teachings can include a thermally linked heat transfer zone operable during a steady-state mode of operation of the liquid fuel CPOX reformer to heat oxygen-containing gas to an initial elevated temperature prior to or following introduction of the oxygen-containing gas into a conduit.

For example, in some embodiments, a first source of heat and a first heat transfer zone (or a first heating zone) thermally linked thereto operable during a steady-state mode of operation of the reformer to heat oxygen-containing gas to an initial elevated temperature following introduction of the oxygen-containing gas into the conduit, the first source of heat and first heat transfer zone thermally linked thereto comprising CPOX reaction zones of CPOX reactor units in thermal communication with a CPOX heat transfer zone disposed within the conduit proximate to or coincident with the first heater unit and associated first heating zone and upstream from the second heater and associated second heating zone, heat of exotherm from the CPOX reaction occurring within the CPOX reaction zones being transferred to oxygen-containing gas passing through the CPOX heat transfer zone.

In addition, certain embodiments can include a second source of heat and a second heat transfer zone (or a second heating zone) thermally linked thereto operable during a steady-state mode of operation of the reformer to heat oxygen-containing gas to an initial elevated temperature prior to introduction of the oxygen-containing gas into the conduit, the second source of heat and second heat transfer zone thermally linked thereto comprising a heat-producing source other than the reformer and heat transfer zone in thermal communication therewith, such heat-producing source and heat transfer zone being disposed externally to the conduit, heat recovered from the heat-producing source being transferred to oxygen-containing gas passing through the heat transfer zone prior to introduction of the oxygen-containing gas into the conduit.

A liquid fuel CPOX reformer of the present teachings can include a mixer, for example, to mix oxygen-containing gas and vaporized liquid reformable fuel. The mixer can be a static mixer or a dynamic mixer, for example, a fluid mixing device such as described in co-pending, co-owned U.S. patent application Ser. No. 14/335,463, entitled, "Mixing Reformable Fuels and an Oxygen-Containing Gas and/or Steam," which is incorporated by reference herein for all purposes including its teachings relating to a fluid mixing device and methods of operating the same to provide a CPOX reaction mixture applicable to the present teachings.

A liquid fuel CPOX reformer of the present teachings can include a CPOX reformate processing unit or device, for example, for reducing the carbon monoxide content of the product reformate. A CPOX reformate processing unit or device can include a water gas shift converter, a preferential oxidation reactor, and/or a hydrogen-selective membrane for separating reformate into a hydrogen stream and a carbon monoxide-containing stream.

A liquid fuel CPOX reformer of the present teachings can include thermal insulation for reducing heat loss from the tubular CPOX reactor units and other heat radiating components of the reformer.

A liquid fuel CPOX reformer of the present teachings can include a gaseous stream driver for driving gaseous flow within and through the reformer. A gaseous stream driver can be a blower or a blower system. A liquid fuel CPOX reformer of the present teachings can include a fuel pump. Examples of a pump such as a fuel pump include a metering pump, a rotary pump, an impeller pump, a diaphragm pump, a peristaltic pump, a positive displacement pump, a gear pump, a piezoelectric pump, an electrokinetic pump, an electroosmotic pump, and a capillary pump.

A liquid fuel CPOX reformer of the present teachings can include one or more sensor assemblies for monitoring and controlling one or more reformer operations. Examples of sensor assemblies include flow meters, thermocouples, thermistors, and resistance temperature detectors. A liquid fuel CPOX reformer of the present teachings also can include a control system for automating the operations of the reformer in its start-up, steady-state, and/or shut-down modes. The control system can include a plurality of sensor assemblies in communication with a controller.

A liquid fuel CPOX reformer of the present teachings can include heat transfer means in thermal communication with the CPOX reactor units. The heat transfer means can transfer heat from the CPOX reactor units during a steady-state mode of operation of the liquid fuel CPOX reformer, for example, to maintain the temperature within the CPOX reaction zone of the CPOX reactor units within a preset range. Heat transfer means can include a blower, for example, to direct a coolant stream against exposed exterior surfaces of the CPOX reactor units and/or against a heat-radiative member of a heat conducting assembly in thermal communication with exposed surfaces of CPOX reactor units. A liquid fuel CPOX reformer of the present teachings also can include a blower for other purposes. For example, a blower can introduce oxygen-containing gas into a conduit and/or drive gaseous flow within a CPOX reactor unit.

A blower can include a series of blower units. A blower or blower unit in a series can include a casing having an axial inlet and a radial outlet, an impeller disposed within the casing for drawing in a gas, for example, an oxygen-containing gas such as air, in the axial inlet and expelling the gas through the radial outlet; and a motor for driving the impeller. In certain embodiments, the blower can draw in a gas at a first pressure and expel the gas at a second, for example, higher, pressure. A blower also can include a duct to contain the outlet of at least one blower unit in the series with the inlet of at least one other blower unit in the series. For example, a series of blowers can include the blower systems as described in co-owned U.S. Patent Application Publication No. 2012/0328969, entitled, "Centrifugal Blower System and Fuel Cell Incorporating Same," which is incorporated by reference herein for all purposes including its teachings relating to a blower system and methods of operating the same as applicable to the present teachings.

A liquid fuel CPOX reformer of the present teachings can include a source of electrical current for powering electrical energy-consuming components of the liquid fuel CPOX reformer section and/or the fuel cell section, for example, auxiliary CPOX reformer components, for example, during a start-up mode of operation of an integrated system. The source of electrical current can include a rechargeable battery and battery recharger.

Figure 4A:
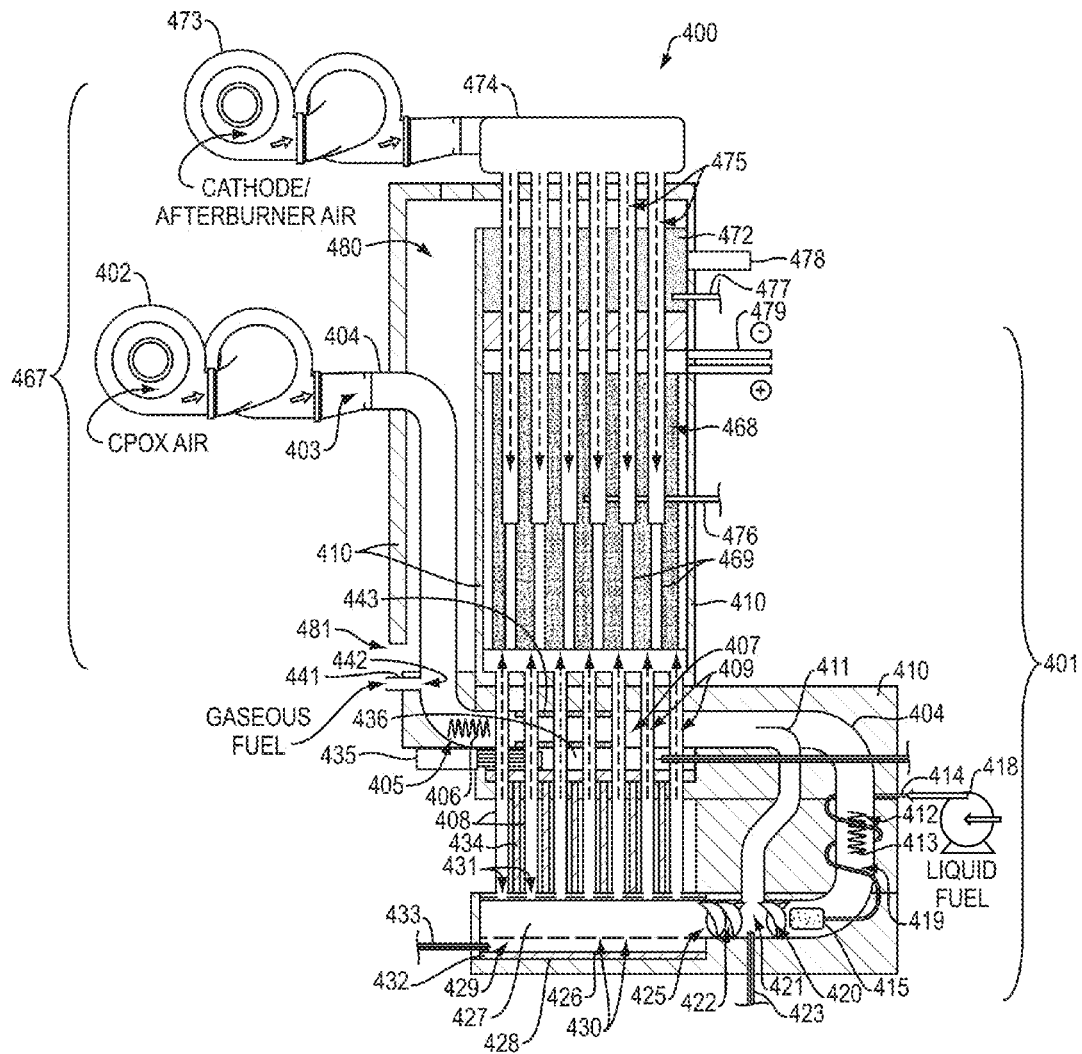
FIG. 4A is a longitudinal cross section view of an embodiment of an integrated liquid fuel CPOX reformer-fuel cell system in accordance with the present teachings, where the fuel cell section includes a tubular solid oxide fuel cell stack.
Figure 4B:
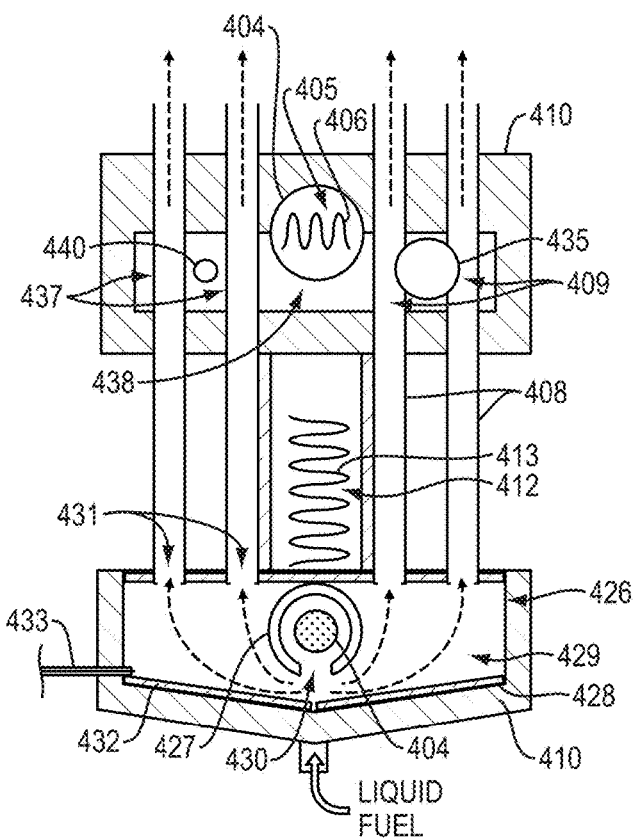
FIG. 4B is a lateral (perpendicular to the longitudinal axis) cross section view of the liquid fuel CPOX reformer section of the integrated liquid fuel CPOX reformer-fuel cell system illustrated in FIG. 4A.
Figure 4C:
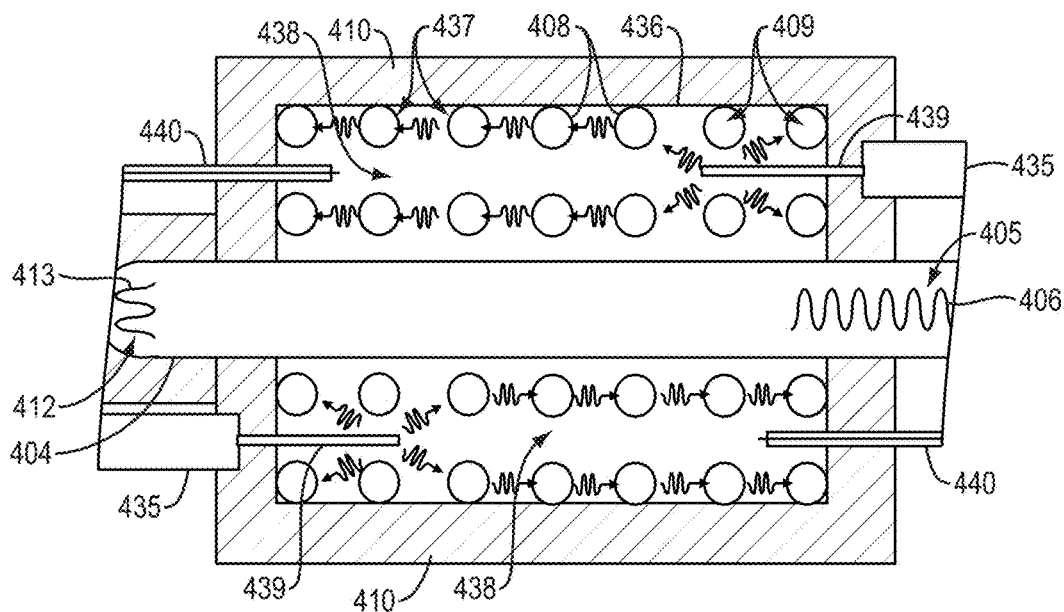
FIG. 4C is a plan cross section view of a portion of the liquid fuel CPOX reformer section of the integrated liquid fuel CPOX reformer-fuel cell system illustrated in FIG. 4A.
Figure 4D:
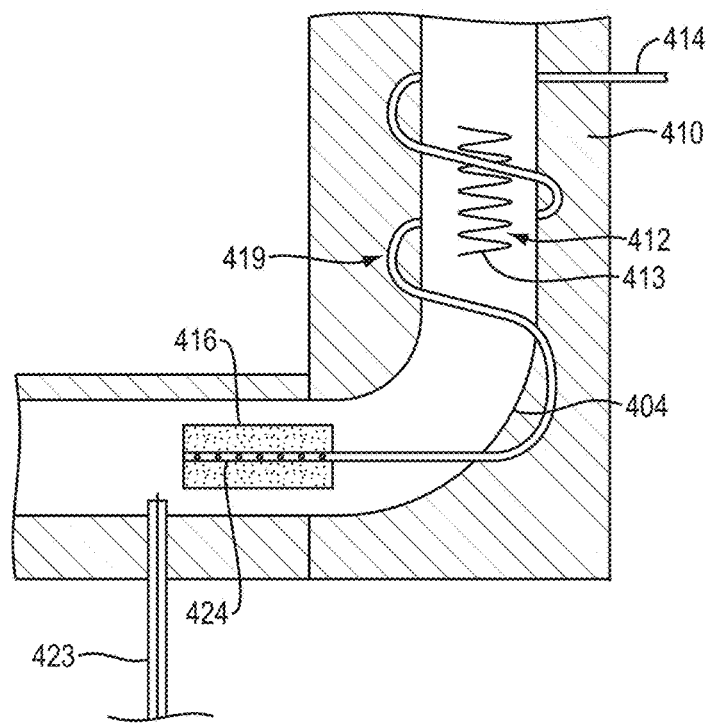
FIG. 4D is an enlarged longitudinal cross section view of the liquid fuel vaporizer system of the liquid fuel CPOX reformer section of the integrated liquid fuel CPOX reformer-fuel cell system illustrated in FIG. 4A.
Figure 4E:
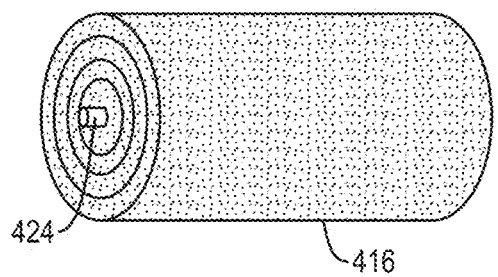
FIGS. 4E and 4F are, respectively, enlarged perspective and longitudinal cross section views of an embodiment of a fuel spreader component of a liquid fuel vaporizer system of the liquid fuel CPOX reformer section of the integrated liquid fuel CPOX reformer-fuel cell system illustrated in FIGS. 4A and 4D.
Figure 4F:
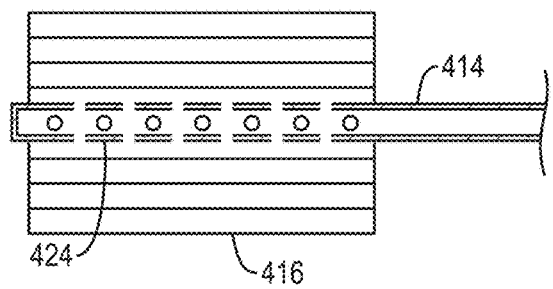
Figure 4G:
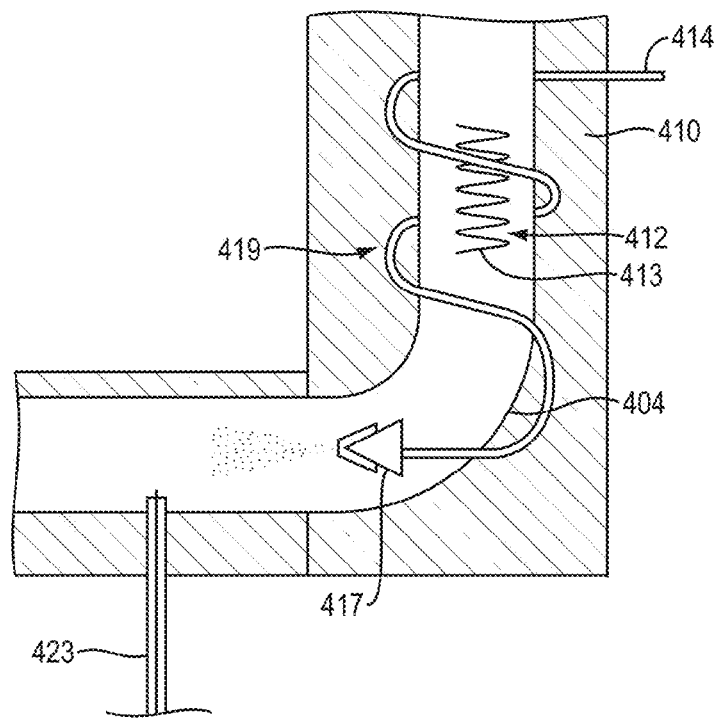
FIG. 4G is an enlarged longitudinal cross section view of another embodiment of a liquid fuel vaporizer system for a reformer section of an integrated liquid fuel CPOX reformer-fuel cell system in accordance with the present teachings.
Figure 4H:
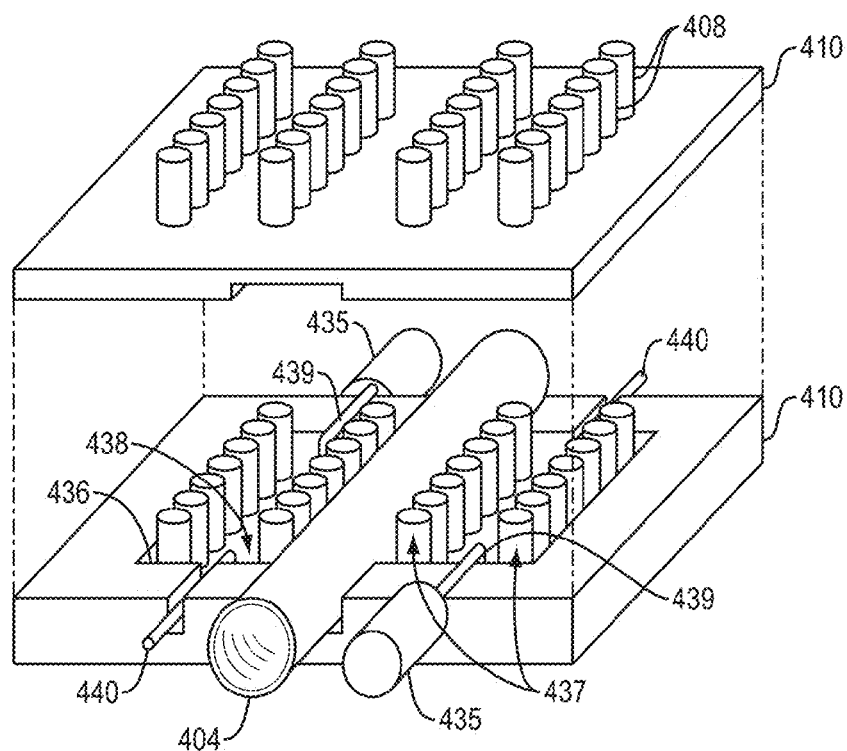
FIG. 4H is an enlarged perspective view of the igniter component of the reformer section of the integrated liquid fuel CPOX reformer-fuel cell system illustrated in FIGS. 4A-4C.

These and other embodiments of reformer sections described herein advantageously can be coupled to a tubular SOFC stack. In some embodiments of an integrated reformer-fuel cell system, at least one of a reforming catalyst, a water gas shift (WGS) reaction catalyst and a catalyst that is active for both purposes can be disposed within and/or associated with (e.g., impregnated in) a section of a tubular SOFC unit that makes contact with hydrogen-rich reformate. The presence of such catalyst(s) can catalyze the reforming of unconsumed reformable fuel present in the reformate and/or can catalyze the water gas shift reaction whereby carbon monoxide present in the reformate is converted to additional hydrogen for electrochemical conversion to electricity. One such tubular SOFC unit is illustrated in FIGS. 4N and 4O.

In addition to at least one fuel cell unit and a current collector, a fuel cell section of an integrated reformer-fuel cell system of the present teachings can include certain of the following optional components: at least one of a reforming catalyst, a catalyst for the water gas shift reaction, and a catalyst that is catalytically-active for both reforming and the water gas shift reaction, where such catalyst or combinations thereof can be in contact with at least a portion of the anode component of a fuel cell unit; thermal insulation for reducing heat loss from the fuel cell section; a gaseous stream driver for introducing oxygen-containing gas to a fuel cell such that the gas contacts the cathode component of at least one fuel cell unit; an afterburner for the combustion of combustible components of the tail gas; a heat exchange assembly for recovering heat from the fuel cell section and/or afterburner component thereof and utilizing the recovered heat to heat oxygen-containing gas and/or liquid reformable fuel prior to or following introduction of the gas/fuel into the reformer section and/or to vaporize liquid reformable fuel at ambient or elevated temperature prior to or following introduction of the fuel into the reformer section; one or more sensor assemblies for monitoring and controlling one or more fuel cell operations; and a control system for automating the operations of the fuel cell section in its start-up, steady-state and shut-down modes.

The fuel cell section of the integrated reformer-fuel cell system of the invention can be selected from among any of the known and conventional fuel cells, for example, those fuel cell types previously mentioned. A preferred type of fuel cell section is a tubular solid oxide fuel cell (SOFC) many variants of which are described in the non-patent and patent literature. Advantages of this type of fuel call include high efficiency, long-term stability, fuel flexibility and low emissions, advantages that dovetail neatly with the aforenoted advantages of a reformer section according to the present teachings.

The configuration of a multi-tubular SOFC stack readily can be coupled to an appropriately configured multi-tubular CPOX reformer section of an integrated reformer-fuel cell system described herein. Thus, for example, the outlets of the tubular CPOX reactor units of the reformer section can be aligned with, and directly connected to, the inlets of corresponding tubular SOFC units such that hydrogen-rich reformate can pass directly from the former into the latter thereby maintaining low back pressure throughout the integrated reformer-fuel cell system. Moreover, in such embodiments, it can be both practical and economical to manufacture a tubular CPOX reactor unit and a corresponding tubular SOFC unit as a single seamlessly integrated continuous structure, for example, employing the processes described in copending, commonly assigned U.S. Patent Application Publication No. 2013/0056911, by Finnerty et al., or copending, commonly assigned U.S. Patent Application Publication No. 2013/0059223, by Finnerty et al., the entire contents of which are incorporated by reference herein for all purposes.

Accordingly, in various embodiments, an integrated liquid fuel CPOX reformer and fuel cell system is provided which can include:

a) a liquid fuel CPOX reformer section utilizing a liquid reformable fuel to produce a hydrogen-rich reformate, the reformer section comprising:

a plurality of spaced-apart CPOX reactor units, each reactor unit comprising an elongate tube having an inlet for gaseous CPOX reaction mixture, an outlet for hydrogen-rich reformate, a wall with internal and external surfaces, the wall enclosing an open gaseous flow passageway with at least a section of the wall having CPOX catalyst disposed therein and/or comprising its structure, such catalyst-containing wall section and open gaseous flow passageway enclosed thereby defining a gaseous phase CPOX reaction zone, the catalyst-containing wall section being gas-permeable to allow gaseous CPOX reaction mixture to diffuse therein and product hydrogen-rich reformate to diffuse therefrom while remaining stable under CPOX reaction conditions, and a vaporizer for vaporizing liquid reformable fuel; and, b) a fuel cell section for electrochemically converting hydrogen-rich reformate produced in reformer section (a) to electricity, the fuel cell section comprising:

at least one fuel cell unit, the fuel cell unit comprising an anode component, a cathode component and an electrolyte component disposed therebetween, an inlet and passageway for hydrogen-rich reformate produced in reformer section (a) configured to convey the reformate to the anode component of the fuel cell unit, an inlet and passageway for oxygen-containing gas configured to convey such gas to the cathode component of the fuel cell unit, and an outlet for tail gas, and at least one current collector electrically coupled to the anode and cathode components of the at least one fuel cell unit.

In another aspect, methods of producing electricity are provided. The present teachings provide methods of liquid fuel CPOX reforming and electrochemically converting the hydrogen-rich product reformate into electricity. Methods of the present teachings generally include introducing a gaseous CPOX reaction mixture including a vaporized liquid reformable fuel into inlets of CPOX reactor units of liquid fuel CPOX reformers of the present teachings; initiating catalytic partial oxidation of the gaseous CPOX reaction mixture to begin production of a hydrogen-rich reformate; maintaining catalytic partial oxidation of the gaseous CPOX reaction mixture; and converting within a fuel cell unit the hydrogen-rich reformate to electricity.

In some embodiments, a method of CPOX reforming of liquid reformable fuel to produce hydrogen-rich reformate and electrochemically converting the reformate within a fuel cell to electricity includes attaching a hydrogen barrier to an external surface of a catalyst-containing wall section of a tubular reactor unit. The hydrogen barrier can prevent or inhibit the loss of hydrogen from the reactor unit than in the absence of the barrier would result from the diffusion of hydrogen through and beyond the catalyst-containing wall section.

In certain embodiments, a method of CPOX reforming of liquid reformable fuel to produce hydrogen-rich reformate and electrochemically converting the reformate within a fuel cell to electricity includes using heat recovered from the exotherm of CPOX and/or heat recovered from one or more external heat sources, for example, the fuel cell (section), during its operation to heat oxygen-containing gas, heat liquid reformable fuel, and/or vaporize liquid reformable fuel prior to the formation of gaseous CPOX reaction mixture.

In various embodiments, a method of CPOX reforming of liquid reformable fuel to produce hydrogen-rich reformate and electrochemically converting the reformate within a fuel cell to electricity includes vaporizing liquid reformable fuel, for example, at an ambient temperature or an elevated temperature such as upon contact with heated oxygen-containing gas thereby forming a gaseous CPOX reaction mixture.

In some embodiments, a method of CPOX reforming of liquid reformable fuel to produce hydrogen-rich reformate and electrochemically converting the reformate within a fuel cell to produce electricity includes distributing a gaseous CPOX reaction mixture of substantially uniform composition at a substantially uniform rate and/or at a substantially uniform temperature to each of several tubular CPOX reactor units.

In particular embodiments, a method of CPOX reforming of liquid reformable fuel to produce hydrogen-rich reformate and electrochemically converting the reformate within a fuel cell to electricity includes initiating CPOX within a tubular CPOX reactor unit, for example, using a source of radiant heat disposed externally to the CPOX reactor unit, the radiant heat being conducted through the wall of the reactor unit to initiate CPOX within its CPOX reaction zone.

In certain embodiments, a method of CPOX reforming of liquid reformable fuel to provide hydrogen-rich reformate and electrochemically converting the reformate within a tubular SOFC unit to electricity includes causing unreformed vaporized liquid reformable fuel, cracked fuel, and/or carbon monoxide present in the reformate to undergo reforming and/or the water gas shift reaction within at least a portion of a SOFC unit thereby producing additional hydrogen for electrochemical conversion therein to electricity.

In various embodiments of the present teachings, the methods of CPOX reforming of liquid reformable fuel to produce hydrogen-rich reformate and electrochemically converting the reformate within a fuel cell to electricity generally can include:

a) in a start-up mode:
(i) introducing oxygen-containing gas into a conduit for routing gas toward the inlet of each of a plurality of CPOX reactor units, the conduit comprising an inlet for oxygen-containing gas, an inlet for liquid reformable fuel and an outlet for heated gaseous CPOX reaction mixture in gaseous flow communication with the inlets of the CPOX reactor units, each CPOX reactor unit comprising an elongate tube having an inlet for gaseous CPOX reaction mixture, an outlet for hydrogen-rich reformate, a wall with internal and external surfaces, the wall enclosing an open gaseous flow passageway with at least a section of the wall having CPOX catalyst disposed therein and/or comprising its structure, such catalyst-containing wall section and open gaseous flow passageway enclosed thereby defining a gaseous phase CPOX reaction zone, the catalyst-containing wall section being gas-permeable to allow gaseous CPOX reaction mixture to diffuse therein and product hydrogen-rich reformate to diffuse therefrom while remaining structurally stable under CPOX reaction conditions,
(ii) heating the oxygen-containing gas,
(iii) introducing liquid reformable fuel into the conduit,
(iv) vaporizing the liquid reformable fuel introduced into the conduit, the vaporized fuel combining with heated oxygen containing gas from step (ii) to provide heated gaseous CPOX reaction mixture,
(v) introducing heated gaseous CPOX reaction mixture from step (iv) into the inlets of the CPOX reactor units, and
(vi) initiating CPOX of the gaseous CPOX reaction mixture within the CPOX reaction zones of the CPOX reactor units thereby commencing the production of hydrogen-rich reformate, and
(vii) conveying hydrogen-rich reformate produced in step (vi) to a fuel cell comprising at least one fuel cell unit such that reformate contacts the anode component of the fuel cell unit while at the same time conveying oxygen-containing gas to the fuel cell such that the gas contacts the cathode component of the fuel cell unit, the reformate undergoing conversion within the fuel cell unit to produce electricity; and, b) in a steady-state mode:
(viii) introducing oxygen-containing gas into the conduit, the oxygen-containing gas having been heated prior to or following its introduction into the conduit,
(ix) introducing liquid reformable fuel into the conduit,
(x) vaporizing the liquid reformable fuel, the vaporized fuel combining with heated oxygen-containing gas from step (viii) to provide heated gaseous CPOX reaction mixture,
(xi) introducing heated gaseous CPOX reaction mixture from step (x) into the inlets of the (POX reactor units,
(xii) discontinuing initiating step (vi) prior to, during or following step (xi) while maintaining the CPOX reaction within the CPOX reaction zones of the CPOX reactor units thereby continuing the production of hydrogen-rich reformate, and
(xiii) conveying hydrogen-rich reformate produced in step (xii) to the anode component of the at least one fuel cell unit and at the same time conveying oxygen-containing gas to the cathode component of the at least one fuel cell unit, the reformate continuing to undergo conversion within the fuel cell unit to produce electricity.

In some embodiments, the methods can include, for example, in step (viii), heating oxygen-containing gas to ambient temperature prior to its introduction into a conduit using heat from an external heat-producing source. In particular embodiments, the methods can include heating further the oxygen-containing gas from a first elevated temperature to a second elevated temperature, for example, using heat of exotherm recovered from CPOX occurring within the CPOX reaction zone of the CPOX reactor units. In certain embodiments, the methods can include, for example, in one or both of steps (iv) and (x) recited above, vaporizing liquid reformable fuel using heat of the heated oxygen-containing gas, for example, from one or both of steps (ii) and (viii), respectively. In particular embodiments, the methods can include heating liquid reformable fuel prior to its introduction into a conduit.

In various embodiments, the methods can include making the heated gaseous CPOX mixture, for example, from one or both of steps (iv) and (ix), more uniform in composition prior to its introduction into the inlets of the CPOX reactor units, for example, in one or both of steps (v) and (x), respectively. In certain embodiments, the methods can include distributing the heated gaseous CPOX reaction mixture of more uniform composition to the inlets of the CPOX reactor units and/or distributing the heated gaseous CPOX reaction mixture to the inlets of the CPOX reactor units at a more uniform temperature, for example, in one or both of steps (v) and (x), respectively.

In particular embodiments, the methods can include distributing a heated gaseous CPOX reaction mixture to the inlets of CPOX reactor units such that the difference in flow rate of the CPOX reaction mixture within any two CPOX reactor units is not greater than about 20% and/or the difference in the temperature of CPOX reaction mixture entering the inlets of any two CPOX reactor units in not greater than about 10%.

In some embodiments, the methods can include, for example, in step (vi), initiating CPOX of the gaseous CPOX reaction mixture within the CPOX reaction zones of the CPOX reactor units by operation of an igniter, where radiant heat output from the igniter being transmitted to an exposed section of at least one CPOX reactor unit in proximity thereto to initiate the CPOX reaction therein. The radiant heat produced by the CPOX reaction occurring within the CPOX reaction zone of the at least one CPOX reactor unit in turn can initiate the CPOX reaction within at least one other CPOX reactor unit within the chamber until in such manner the CPOX reaction has been initiated in all of the CPOX reactor units within the chamber.

In various embodiments, the methods can include, for example, in step (v), adjusting the molar ratio of oxygen to carbon of the gaseous CPOX reaction mixture to correspond to that of a fuel-lean CPOX reaction mixture. In particular embodiments, the methods can include, for example, in step (xi), adjusting the molar ratio of oxygen to carbon of the gaseous CPOX reaction mixture to correspond to that of a fuel-rich CPOX reaction mixture.

In certain embodiments, the methods can include routing or diverting a portion of the oxygen-containing gas introduced into the conduit to bypass vaporization sections, for example, in one or both of vaporizing steps (iv) and (x), and to merge with heated gaseous CPOX reaction mixture from these steps. In some embodiments, the methods can include, prior to the merger of the oxygen-containing gas with the gaseous CPOX reaction mixture, making or adjusting the gaseous CPOX reaction mixture to be more uniform in composition. In particular embodiments, following the merger of the oxygen-containing gas with the gaseous CPOX reaction mixture, the methods can include making or adjusting the merged gas to be more uniform in composition.

In some embodiments, the methods can include subjecting a gaseous CPOX reaction mixture comprising an oxygen-containing gas and a gaseous fuel to CPOX within a conduit to produce hydrogen-rich reformate.

In various embodiments, the methods can include, in a shut-down mode, reducing the fuel flow rate, for example, in step (xi), while maintaining a substantially constant molar ratio of oxygen to carbon. In certain embodiments, the methods can include increasing the molar ratio of oxygen to carbon when the temperature within the CPOX reaction zones of CPOX reactor units approaches or falls below a level that would result in coke formation. Such an increase in the molar ratio can prevent or inhibit coke formation as the CPOX catalyst deactivates.

In various methods of the present teachings, introducing a gaseous CPOX reaction mixture into an inlet of a CPOX reactor unit can include introducing an oxygen-containing gas into a conduit for routing fluids toward the inlet of a CPOX reformer unit; heating a stream of the oxygen-containing gas with a first source of heat comprising an electric heater disposed in the conduit to provide a stream of heated oxygen-containing gas; and introducing a liquid reformable fuel into the stream of heated oxygen-containing gas in, through, at or past a vaporizer to provide the gaseous CPOX reaction mixture. The methods can include heating the stream of the oxygen-containing gas and/or the stream of heated oxygen-containing gas with a second source of heat, where the second source of heat is in thermal communication with the conduit and comprises heat of exotherm from the CPOX reactor units and/or a fuel cell unit or system external to the CPOX reactor units, for example, integrated with the liquid fuel CPOX reformer. The electric heaters can be electrical resistance heaters.

In some embodiments, the methods can include heating and/or cooling upstream of the vaporizer the stream of oxygen-containing gas and/or the stream of heated oxygen-containing gas. In various embodiments, for example, where a thermally-regulating assembly is used, the temperature of the stream of oxygen-containing gas and/or the stream of heated oxygen-containing gas heated by the second source of heat (e.g., exotherm of CPOX reaction or of a fuel cell unit or system external to the CPOX reformer but integrated with it) can be thermally controlled and cooled or lowered in temperature, if necessary, to prevent a runaway thermal situation where the heat of exotherm becomes too hot for the operating system.

In particular embodiments, the methods include heating a stream of heated oxygen-containing gas with a third source of heat including an electric heater, where the third source of heat is disposed in the conduit downstream from the first source of heat. In certain embodiments, the methods can include discontinuing heating the stream of oxygen-containing gas with the first source of heat. The methods can include reducing or discontinuing heating the stream of oxygen-containing gas and/or the stream of heated oxygen-containing gas with the third source of heat.

In particular embodiments, the methods include monitoring at least one of the flow rate of the stream of heated oxygen-containing gas, the flow rate of liquid reformable fuel, the temperature of the vaporizer, the temperature of the stream of heated oxygen-containing gas and the temperature of the liquid reformable fuel; and controlling the vaporization of the liquid reformable fuel in response to the results of the monitoring.

The methods can include adjusting the heat supplied by one or more of the first source of heat, the second source of heat, the third source of heat, and adjusting the heat and/or coldness supplied by the thermally-regulating assembly. The methods can include heating the liquid reformable fuel using the second source of heat and/or the third source of heat, when present, prior to introducing the liquid reformable fuel into the vaporizer. In particular embodiments, the liquid reformable fuel introduced into the stream of heated oxygen-containing gas vaporizes on contact with the heated oxygen-containing gas. The methods can include monitoring one or more of the flow rate of the stream of heated oxygen-containing gas, the flow rate of liquid reformable fuel, the temperature of the vaporizer, the temperature of the stream of heated oxygen-containing gas and the temperature of the liquid reformable fuel. Based on the feedback from the monitoring, the methods can include controlling the vaporization of the liquid reformable fuel in response. For example, controlling the vaporization can include adjusting the heat supplied by the second source of heat and/or the third source of heat and/or the heat and/or coldness supplied by the thermally-regulating assembly.

Liquid fuel CPOX reformers, fuel cells, and integrated reformer-fuel cell systems, and methods of CPOX reforming and producing electricity according to the present teachings generally are described above and elsewhere herein. The following description with reference to the figures embellishes upon certain of these features and others of liquid fuel CPOX reformers, fuel cells and integrated reformer-fuel cell systems, and CPOX reforming and electricity producing processes of the present teachings and should be understood to discuss various and specific embodiments without limiting the essence of the invention and that can be applicable to the discussion above.

Referring now to the drawings, FIG. 2A illustrates one embodiment of an integrated liquid fuel CPOX reformer-fuel cell system in accordance with the present teachings where an oxygen-containing gas component of a CPOX reaction mixture is heated by the heat of exotherm resulting from CPOX reforming during a steady-state mode of operation of the liquid fuel CPOX reformer section of the integrated system.

As shown in FIG. 2A, integrated liquid fuel CPOX reformer-fuel cell system 200 includes liquid fuel CPOX reformer section 201 coupled to fuel cell section 228. Reformer section 201 includes centrifugal blower 202 for introducing oxygen-containing gas, exemplified here and in the other embodiments of the present teachings by air, into conduit 203, and for driving this and other gaseous streams (inclusive of vaporized fuel-air mixture(s) and hydrogen-rich reformates) through the various passageways, including open gaseous flow passageways, of the reformer section and fuel cell section. Conduit 203 can include flow meter 204 and thermocouple 205. These and similar devices can be placed at various locations within a liquid fuel CPOX reformer section and fuel cell section in order to measure, monitor and control the operation of an integrated reformer-fuel cell system as more fully explained in connection with the control system illustrated in FIG. 3A.

In a start-up mode of operation of exemplary integrated liquid fuel CPOX reformer-fuel cell system 200, air at ambient temperature, introduced by blower 202 into conduit 203, passes through first heating zone 206, where the air is initially heated by first heater 207, for example, of the electrical resistance type, to within a preset, or targeted, first range of elevated temperature at a given rate of flow. The initially heated air then passes through heat transfer zone 208 which in the steady-state mode of operation of integrated liquid fuel CPOX reformer-fuel cell system 200 is heated by heat of exotherm recovered from the CPOX reaction occurring within CPOX reaction zones 210 of tubular CPOX reactor units 209. Once such steady-state operation of integrated reformer-fuel cell system 200 is achieved, i.e., upon the CPOX reaction within CPOX reactor units 209 becoming self-sustaining, the thermal output of first heater 207 can be reduced or its operation discontinued since the incoming air will have already been heated by passage through heat transfer zone 208 to within, or approaching, its first range of elevated temperature.

Continuing further downstream within conduit 203, the air which has initially been heated, either by passage through first heating zone 206 during a start-up mode of operation or by passage through heat transfer zone 208 during a steady-state mode of operation, passes through second heating zone 211 where it is further heated by second heater 212, which can also be of the electrical resistance type, to within a second range of elevated temperature. A heater can operate to top-off the temperature of the previously heated air thereby satisfying several operational requirements of liquid fuel CPOX reformer, namely, assisting in the regulation and fine-tuning of the thermal requirements of the reformer on a rapid response and as-needed basis, providing sufficient heat for the subsequent vaporization of liquid reformable fuel introduced further downstream into conduit 203 and providing heated gaseous CPOX reaction mixture.

Liquid reformable fuel, exemplified here and in the other embodiments of the present teachings by diesel, is continuously introduced via pump 213 through fuel line 214 equipped with optional flow meter 215 and optional flow control valve 216 and into conduit 203 where the fuel is vaporized by vaporizer system 217 utilizing heat from the heated air flowing from second heating zone 211. The vaporized. i.e., gaseous, fuel combines with the stream of heated air in mixing zone 218 of conduit 203. A mixer, for example, a static mixer such as in-line mixer 219, and/or vortex-creating helical grooves formed within the internal surface of conduit 203, or an externally powered mixer (not shown), are disposed within mixing zone 218 of conduit 203 in order to provide a more uniform fuel-air gaseous CPOX reaction mixture than would otherwise be the case.

The heated vaporized fuel-air mixture (heated gaseous CPOX reaction mixture) enters manifold, or plenum, 220 which functions to distribute the reaction mixture more evenly and, for example, at a more uniform temperature, into tubular CPOX reactor units 209. While the conduit and the manifold will ordinarily be surrounded by thermal insulation (e.g., insulation 410 of integrated reformer-fuel cell system 400 illustrated in FIG. 4A), the CPOX reaction mixture can still undergo a drop in temperature due to heat loss through the walls of the manifold, which typically has a greater volume, and hence a greater wall surface area, than that of a comparable length of the conduit. Another factor that can cause a drop in the temperature of the CPOX reaction mixture within a manifold is the reduction in pressure and velocity which the mixture undergoes as it exits the conduit and enters the larger space of the manifold.

Reductions in the temperature of a CPOX reaction mixture due to either of these factors, particularly those occurring in regions of the reaction mixture that are proximate to or in contact with walls, corners and/or other recesses of the manifold, can induce localized condensation of vaporized fuel. To minimize the possibility of such condensation, a manifold can be provided with means for maintaining the temperature of the gaseous CPOX reaction mixture above the condensation threshold of its vaporized fuel component. For example, as shown in FIG. 2A, heater 221, of the electrical resistance type, and thermocouple or thermistor probe 222 for purposes of temperature control, are disposed within manifold 220 in order to accomplish this objective. As an alternative to a heater or in addition thereto, a reformer section can be provided with thermally conductive structure(s), (e.g., thermally conductive elements 434 of the CPOX reformer section illustrated in FIG. 4A) for transferring heat of exotherm recovered from the CPOX reaction occurring within CPOX reaction zones of tubular CPOX reactor units to such locations within a manifold where the potential for condensation of fuel vapor can be greatest, for example, wall surfaces in the vicinity of the fuel-air outlets and/or other sites such as corners and other recesses of the manifold that could cause localized condensation of vaporized fuel.

Figure 4I:
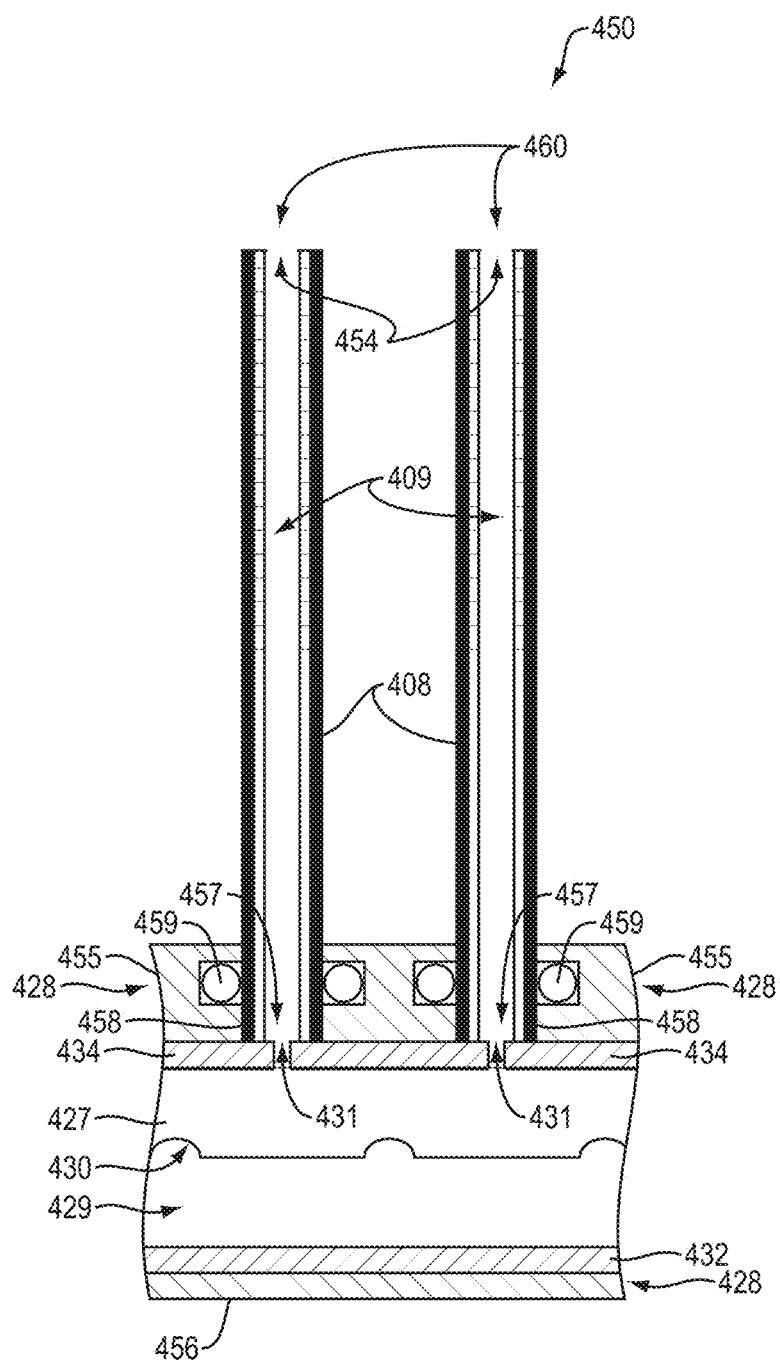
FIG. 4I is an enlarged longitudinal cross section view of a portion of the manifold and associated tubular CPOX reactor units of the reformer section of the integrated liquid fuel CPOX reformer-fuel cell system illustrated in FIGS. 4A-4C.
Figure 4N:
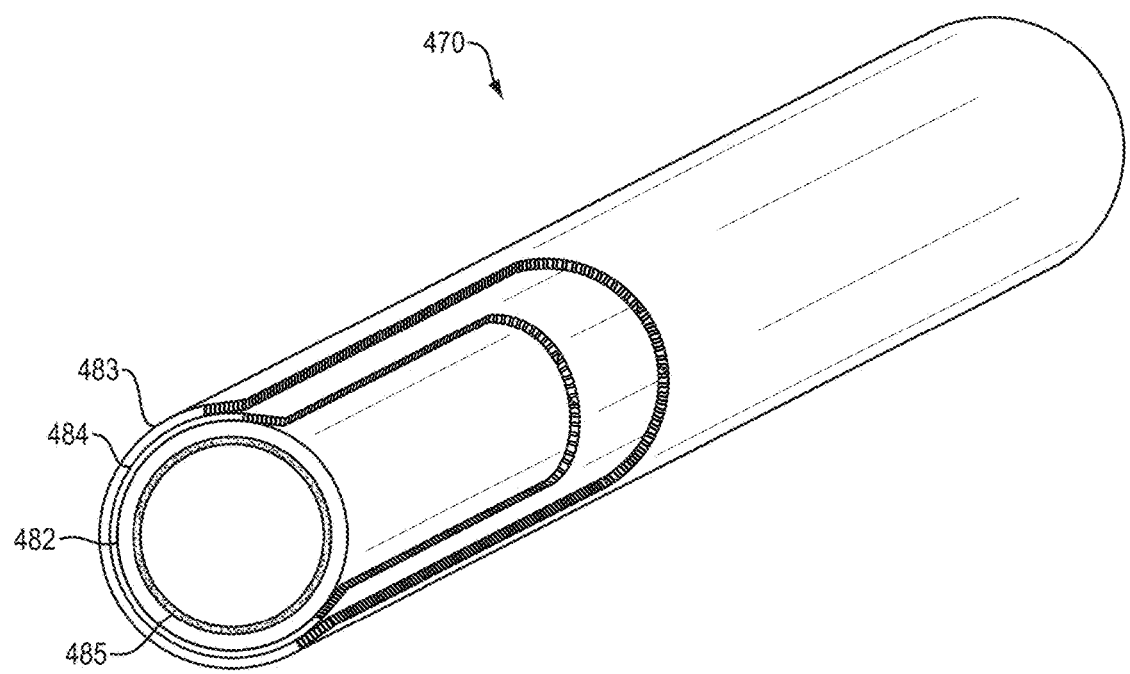
FIG. 4N is an isometric view of a generally cylindrical solid oxide fuel cell unit with portions partially cut away to illustrate better its anode, electrolyte and cathode components.
Figure 4O:
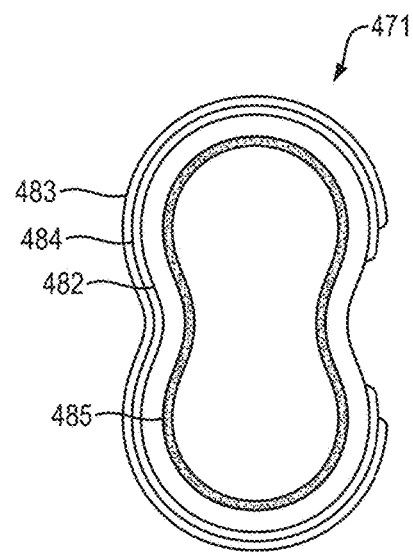
FIG. 4O is a lateral cross section view of an embodiment of a tubular SOFC unit, which cross section corresponds to the lateral cross section of the tubular CPOX reactor unit shown in FIG. 4L.

From manifold 220, the heated CPOX reaction mixture is introduced into tubular CPOX reactor units 209, a detailed description of one embodiment of which is presented herein in connection with tubular CPOX reactor units 408 of manifold portion 450 illustrated in FIG. 4I. In a start-up mode of operation of CPOX reformer section 201, igniter 223 initiates the CPOX reaction of the gaseous CPOX reaction mixture within CPOX reaction zones 214) of tubular CPOX reactor units 209 thereby commencing the production of hydrogen-rich reformate. Once steady-state CPOX reaction temperatures have been achieved (e.g., 250° C. to 1,100° C.), the reaction becomes self-sustaining and operation of the igniter can be discontinued. Thermocouples 224 and 225 are provided to monitor the temperatures of, respectively, the vaporization operation occurring within conduit 203 and the CPOX reaction occurring within CPOX reactor units 209, the temperature measurements being relayed as monitored parameters to reformer control system 226.

Reformer section 201 can also include a source of electrical current, for example, rechargeable lithium-ion battery system 227, to provide power, for example, during start-up mode of operation of integrated reformer-fuel cell system 200 for its electrically driven components such as blower 202, flow meters 204 and 215, heaters 207, 212 and 221, liquid fuel pump 213, flow control valve 216, igniter 223, and thermocouples 205, 222, 224 and 225 and, if desired, to store surplus electricity, for example, produced by fuel cell section 228 during steady-state operation, for later use.

Figure 5A:
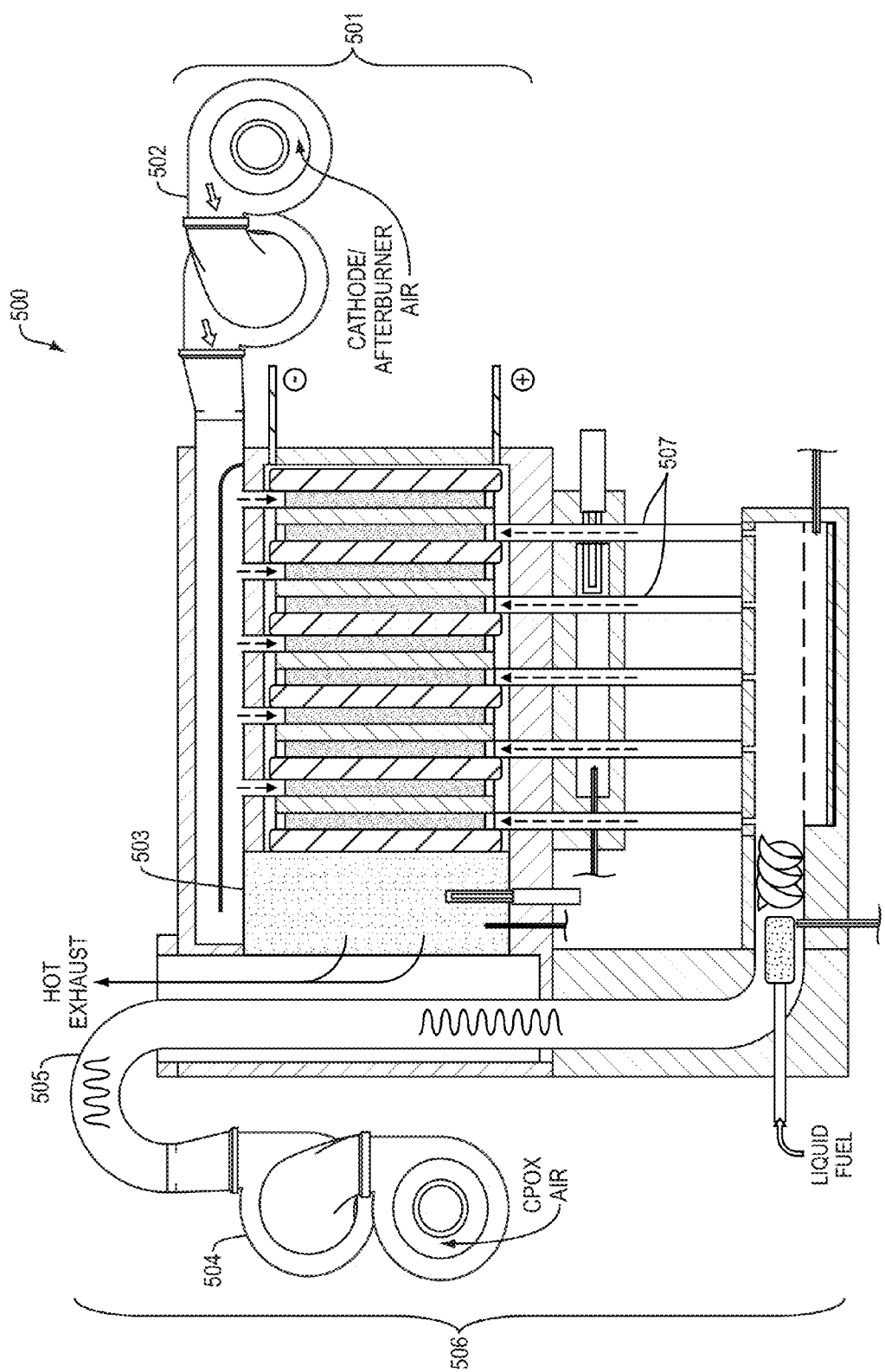
FIG. 5A is a longitudinal cross section view of another embodiment of an integrated reformer-fuel cell system in accordance with the present teachings, where the fuel cell section includes a planar fuel cell.
Figure 5B:
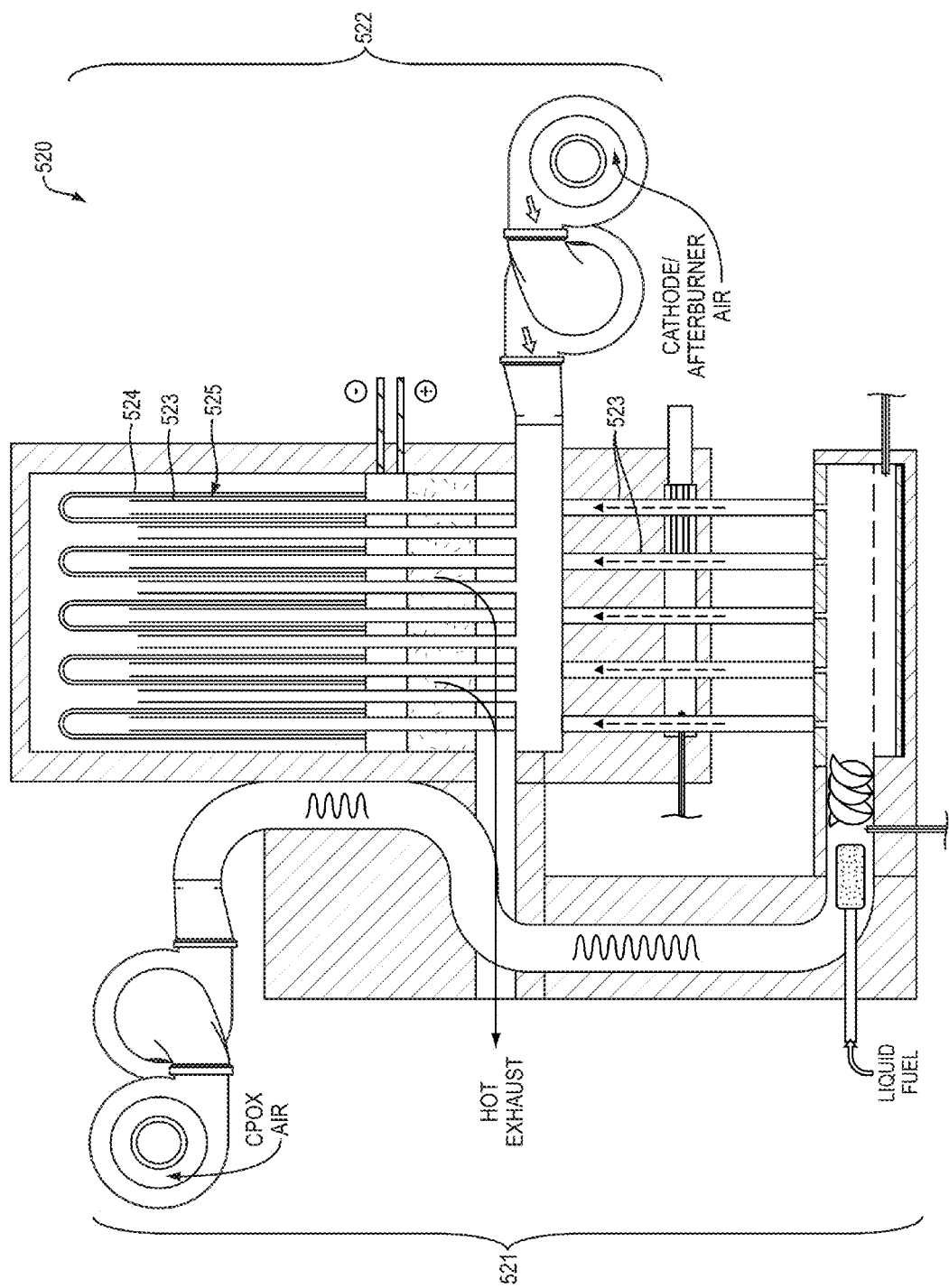
FIG. 5B is a longitudinal cross section view of another embodiment of an integrated reformer-fuel cell system in accordance with the present teachings, where the reformer section and tubular SOFC section are arranged in an especially compact configuration.
Figure 5C:
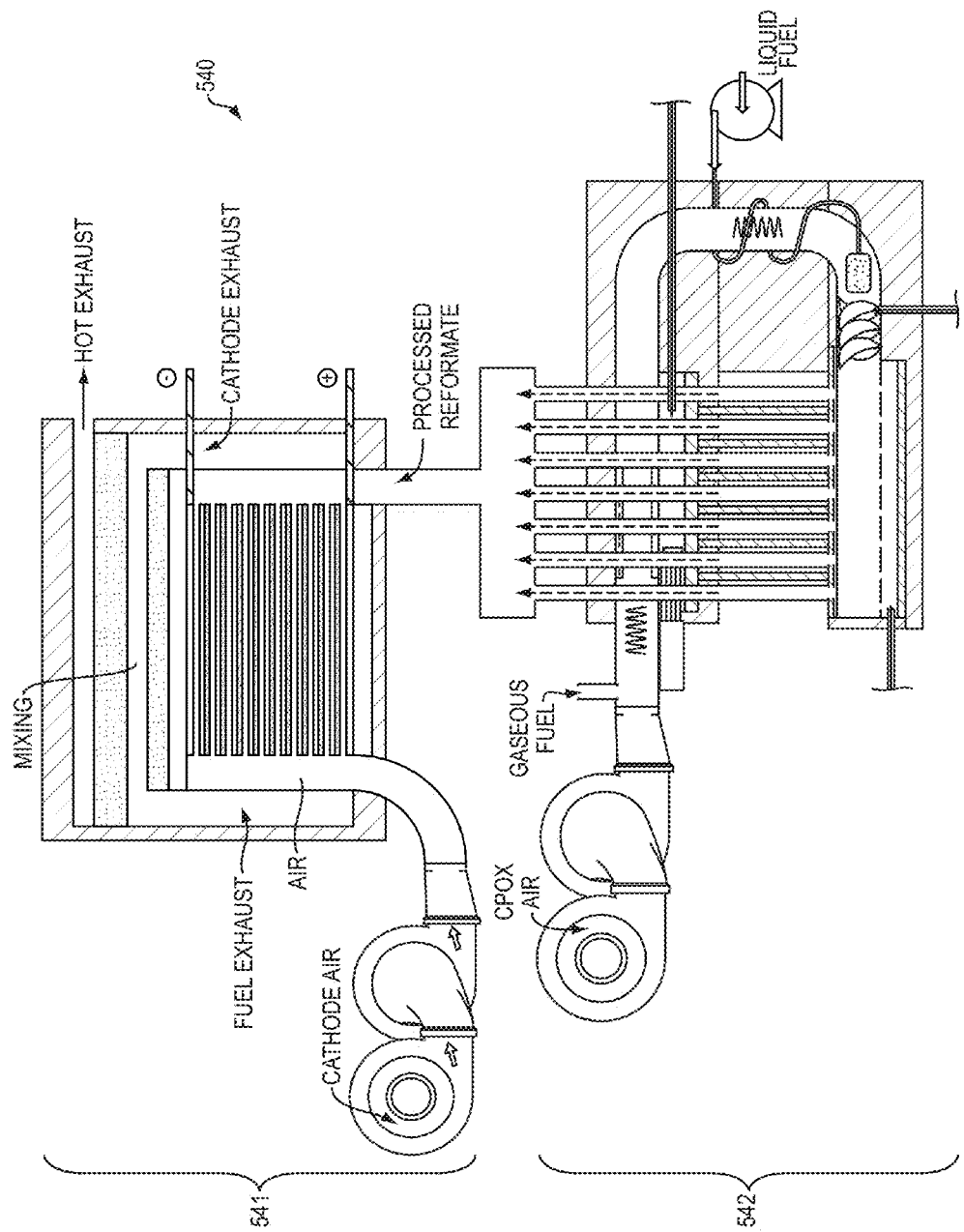
FIG. 5C is a longitudinal cross section view of another embodiment of an integrated reformer-fuel cell system in accordance with the present teachings, where the fuel cell section includes a monolithic fuel cell.
Figure 5D:
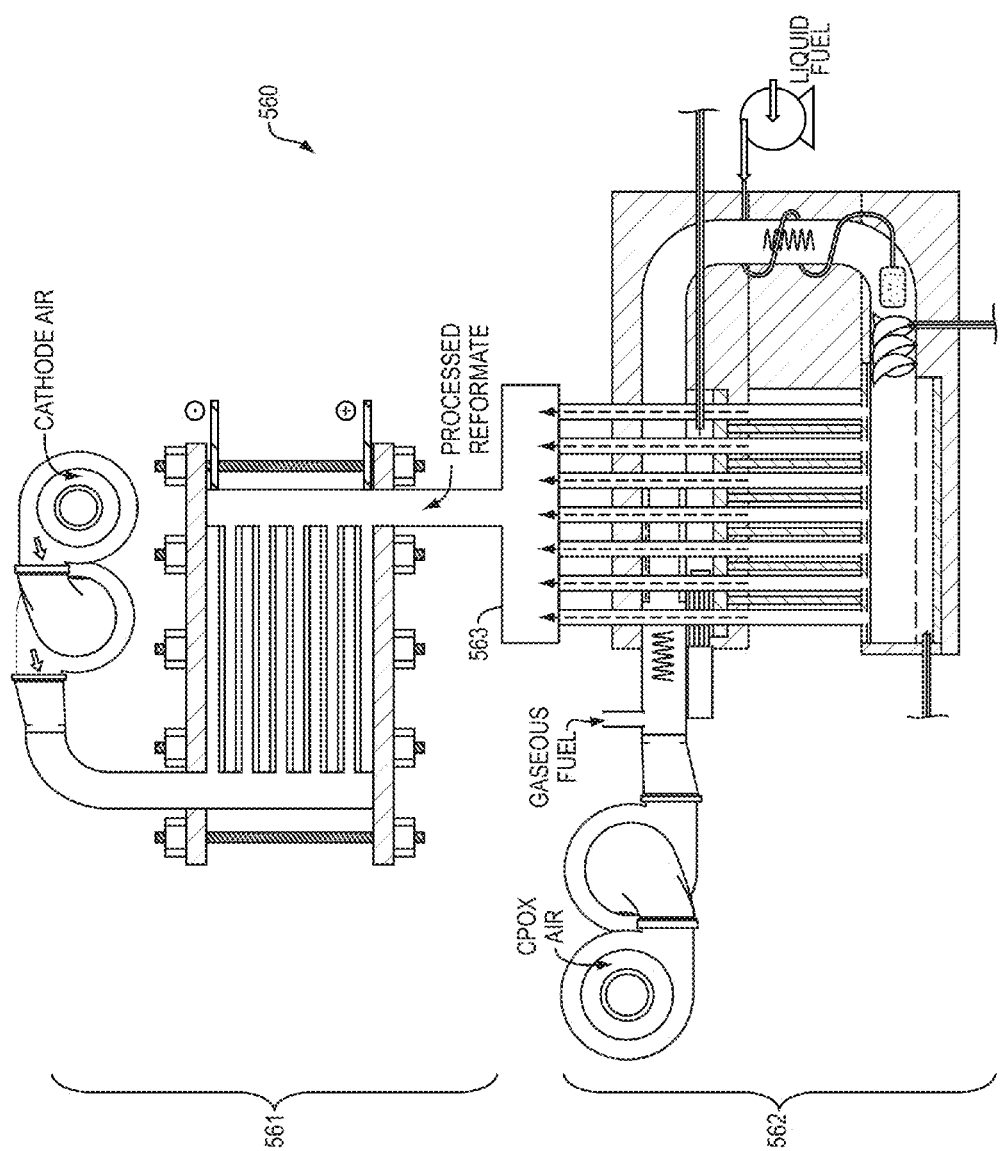
FIG. 5D is a longitudinal cross section view of another embodiment of an integrated reformer-fuel cell system in accordance with the present teachings, where the fuel cell section includes a polymer electrolyte membrane fuel cell.

If desired, product effluent or hydrogen-rich reformate from a liquid CPOX reformer section can be introduced into one or more conventional or otherwise known carbon monoxide removal devices for the reduction of its carbon monoxide (CO) content, for example, where the product effluent is to be introduced as fuel to a fuel cell section or fuel cell stack utilizing a catalyst that is particularly susceptible to poisoning by CO, for example, PEM fuel cell section 561 of integrated reformer-fuel cell system 560 illustrated in FIG. 5D. Thus, for example, the product effluent can be introduced into a water gas shift (WGS) converter wherein CO is converted to carbon dioxide ($CO_2$) while at the same time producing additional hydrogen, or the product effluent can be introduced into a reactor wherein CO is made to undergo preferential oxidation (PROX) to $CO_2$. CO reduction can also be carried out employing a combination of these processes, for example, WGS followed by PROX and vice versa.

It is also within the scope of the present teachings to reduce the level of CO in the product reformate by passage of the product reformate through a known or conventional clean-up unit or device equipped with a hydrogen-selective membrane providing separation of the product reformate into a hydrogen stream and a CO-containing by-product stream. Units/devices of this kind can also be combined with one or more other CO-reduction units such as the aforementioned WGS converter and/or PROX reactor.

As further shown in FIG. 2A, hydrogen-rich reformate driven by blower 202 passes from CPOX reactor units 209 of reformer section 201 into fuel cell stack 229 of fuel cell section 228 where the hydrogen and oxygen-containing gas introduced by blower 230 into manifold 231 and thereafter into fuel cell stack 229 undergo electrochemical conversion to electricity. Combustible gas(es), for example, hydrocarbon(s), unconsumed hydrogen, and the like, contained in the spent gas(es) resulting from such electrochemical conversion can be made to undergo combustion in afterburner 232. Heat resulting from combustion taking place in an afterburner can be recovered, if desired, and utilized for the operation of a reform section, for example, to preheat oxygen-containing gas and/or fuel during a steady-state mode of operation of the integrated reformer-fuel cell system such as in the embodiments illustrated in FIGS. 4A and 5A-5C.

Figure 2B:
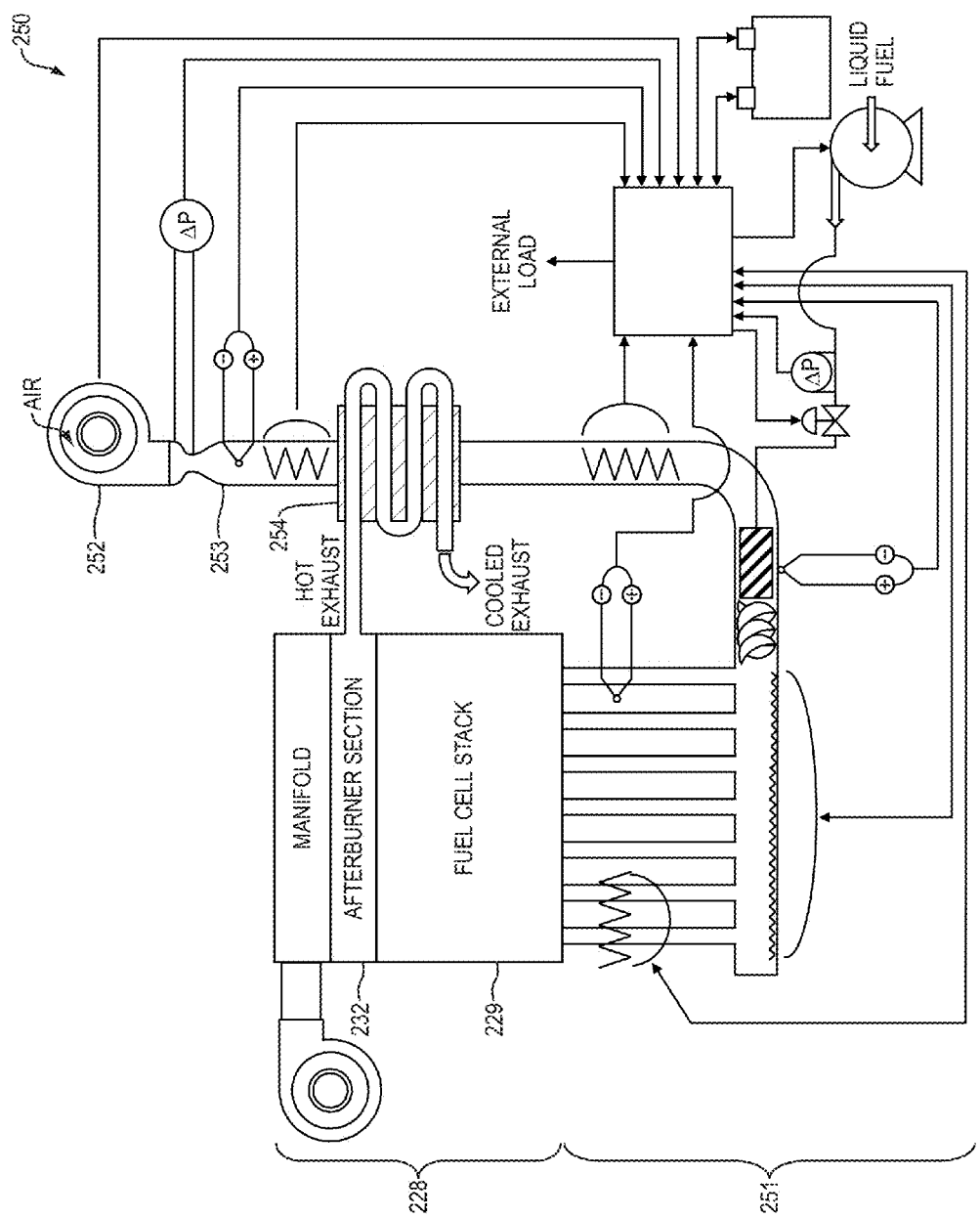

In contrast to liquid fuel CPOX reformer section 200 of FIG. 2A, in which air is heated within heat transfer zone 208 of conduit 203 by heat of exotherm recovered from CPOX reactor units 2409 during a steady-state mode of operation, in liquid fuel CPOX reformer section 251 of exemplary integrated reformer-fuel cell system 250 illustrated in FIG. 2B, air introduced via centrifugal blower 252 into conduit 253 is heated by passage through heat exchanger 254 which is supplied with waste heat (hot combustion gas exhaust) recovered from afterburner 232 of fuel cell stack 229. In all other respects, the components of integrated reformer-fuel cell system 250 and their functions are essentially the same as those of integrated reformer-fuel cell system 200 of FIG. 2A.

Figure 3A:
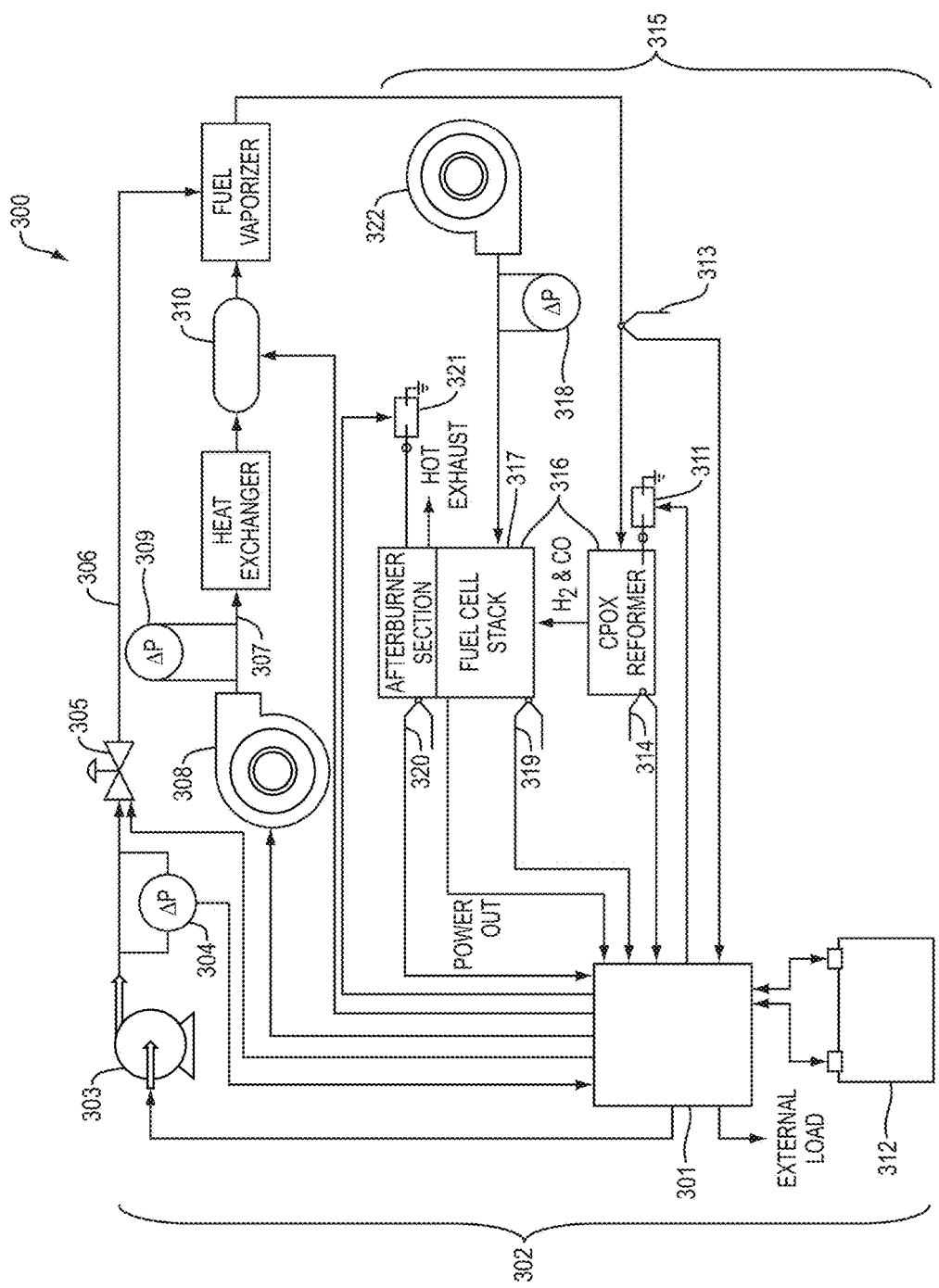
FIG. 3A is a schematic block diagram of an exemplary control system for managing the operations of the integrated liquid fuel CPOX reformer-fuel cell system of FIGS. 2A and 2B.

Control system 300 illustrated in FIG. 3A can control the operations of an integrated liquid fuel CPOX reformer-fuel cell system in accordance with the present teachings. As shown in FIG. 3A, control system 300 includes controller 301 to manage liquid fuel CPOX reformer 302 in its start-up, steady-state, and shut-down modes of operation. The controller can be software operating on a processor. However, it is within the scope of the present teachings to employ a controller that is implemented with one or more digital or analog circuits, or combinations thereof.

Control system 300 further includes a plurality of sensor assemblies, for example, fuel pressure meter 304, air pressure meter 309, mixing zone thermocouple 313 and CPOX reaction zone thermocouple 314, cathode air pressure meter 318, fuel cell stack thermocouple 319, afterburner thermocouple 320, and the like, in communication with controller 301 and adapted to monitor selected operating parameters of reformer section 302 and fuel cell section 315.

In response to input signals from the sensor assemblies, user commands from a user-input device and/or programmed subroutines and command sequences, a controller can manage the operations of a liquid fuel CPOX reformer-fuel cell system. More specifically, as shown, controller 301 communicates with a control signal-receiving portion of the desired section or component of a integrated reformer-fuel cell system 316 by sending command signals thereto directing a particular action. Thus, for example, in response to flow rate input signals from pressure meters 304, 309 and 318, and temperature input signals from thermocouples 313, 314, 319 and 320, controller 301 can send control signals to fuel pump 303 and/or fuel flow control valve 305, for example, to control the flow of fuel through fuel line 306 to conduit 307, to centrifugal blower 308 to control the flow of air into conduit 307 and drive the flow of heated gaseous CPOX reaction mixture within and through reformer section 302 and fuel cell section 315, to heater 310 to control its thermal output, to reformer igniter 311, and/or to afterburner igniter 321 to control their on-off states, to cathode air blower 322 to control the flow of cathode air to fuel cell stack 317, and to battery/battery recharger system 312 to manage its functions.

The sensor assemblies, control signal-receiving devices and communication pathways herein can be of any suitable construction and of those known in the art. The sensor assemblies can include any suitable sensor devices for the operating parameters being monitored. For example, fuel flow rates can be monitored with any suitable flow meter, pressures can be monitored with any suitable pressure-sensing or pressure-regulating device, and the like. The sensor assemblies can also, but do not necessarily, include a transducer in communication with the controller. The communication pathways will ordinarily be wired electrical signals but any other suitable form of communication pathway can also be employed.

In FIG. 3A, communication pathways are schematically illustrated as single- or double-headed arrows. An arrow terminating at controller 301 schematically represents an input signal such as the value of a measured flow rate or measured temperature. An arrow extending from controller 301 schematically represents a control signal sent to direct a responsive action from the component at which the arrow terminates. Dual-headed pathways schematically represent that controller 301 not only sends command signals to corresponding components of integrated reformer-fuel cell system 316 to provide a determined responsive action, but also receives operating inputs from reformer section 302, fuel cell section 315, and mechanical units such as fuel pump 303, fuel control valve 305, blowers 308 and 322, and measurement inputs from sensor assemblies such as pressure meters 304, 309 and 318, and thermocouples 313, 314, 319 and 321.

Figure 3B:
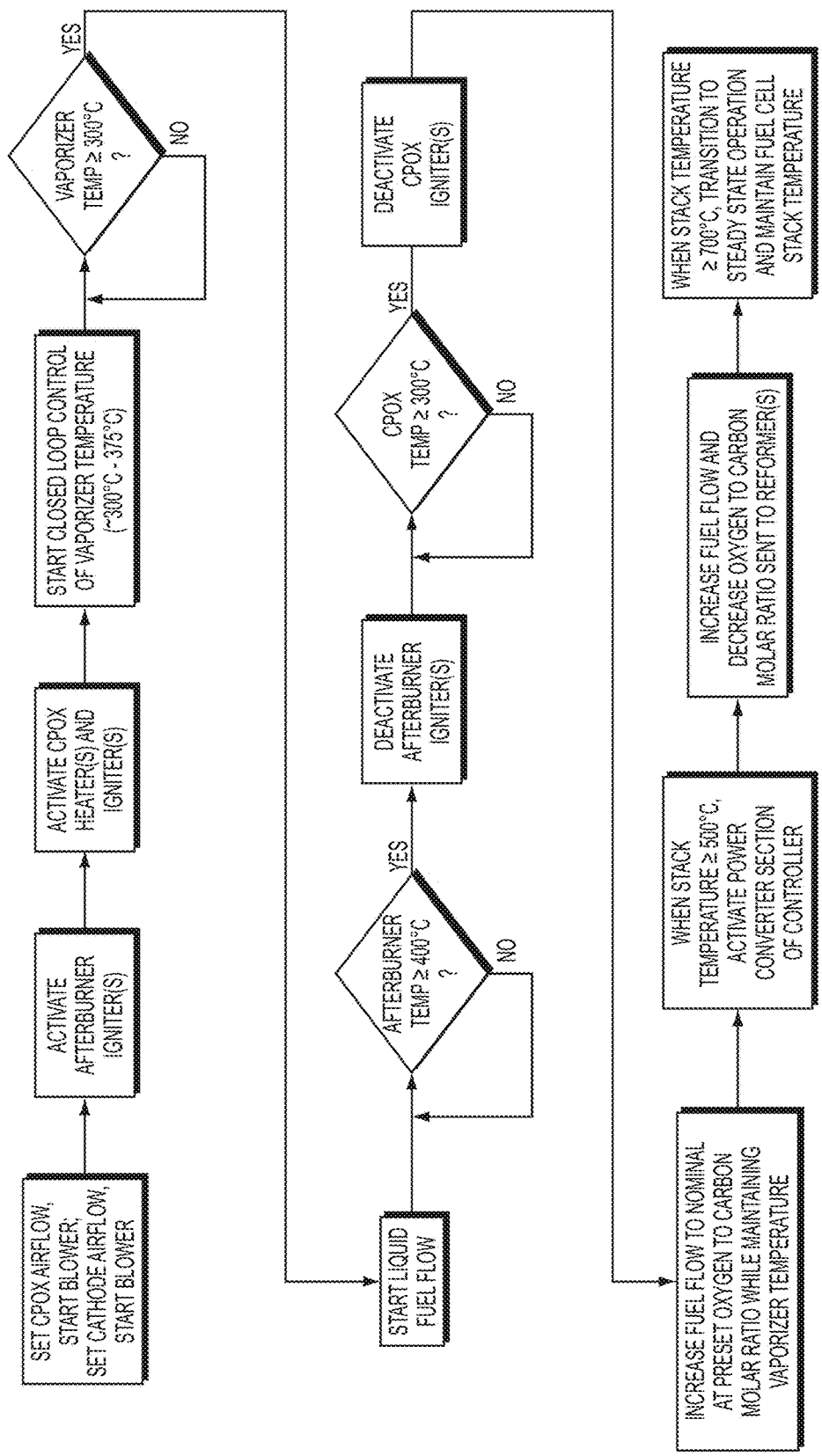
FIG. 3B is a flowchart of an exemplary control routine executed by a controller such as the control system illustrated in FIG. 3A.

FIG. 3B presents a flow chart of an exemplary control routine that can be executed by a controller of a control system to automate the operations of a liquid fuel CPOX reformer-fuel cell system, for example, integrated reformer-fuel cell system 316. The flow chart can be executed by a controller at a fixed interval, for example, every 10 milliseconds or so. The control logic illustrated in FIG. 3B performs several functions including the management of gaseous flows, heating, fuel vaporization and CPOX reaction temperatures in start-up and steady-state modes of operation and management of the procedure for the shutdown mode of reformer operation.

Figure 4P:
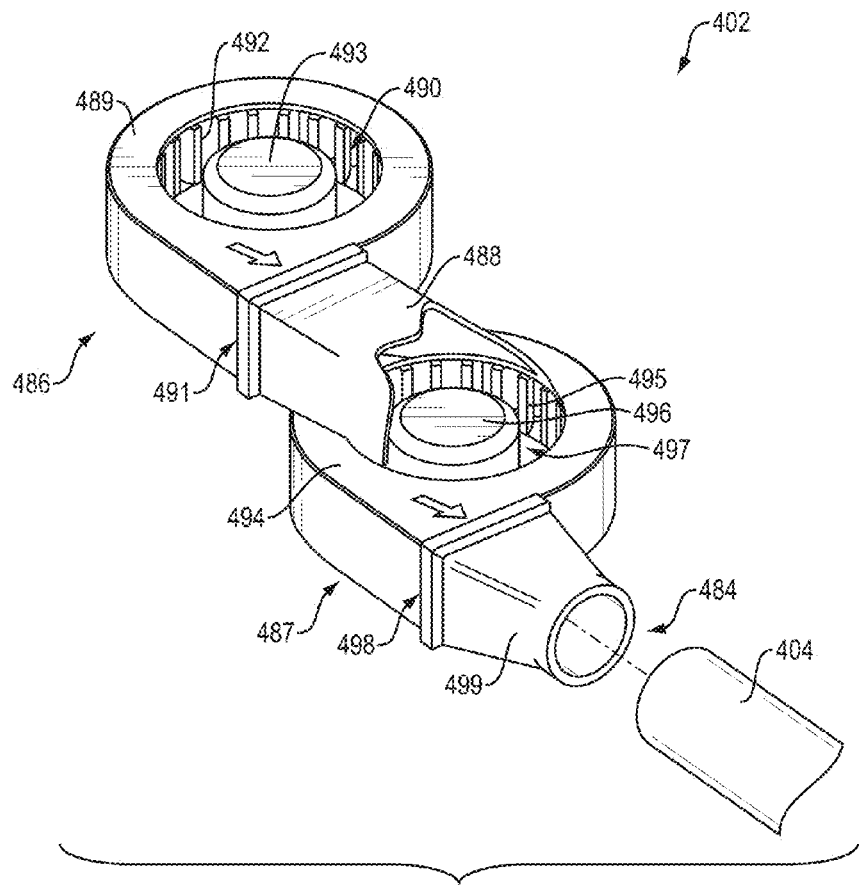
FIGS. 4P and 4Q illustrate, respectively, perspective and plan views of the blower system components of the integrated liquid fuel CPOX reformers-fuel cell systems illustrated in FIGS. 4A, 5A-D and 6A.
Figure 4Q:
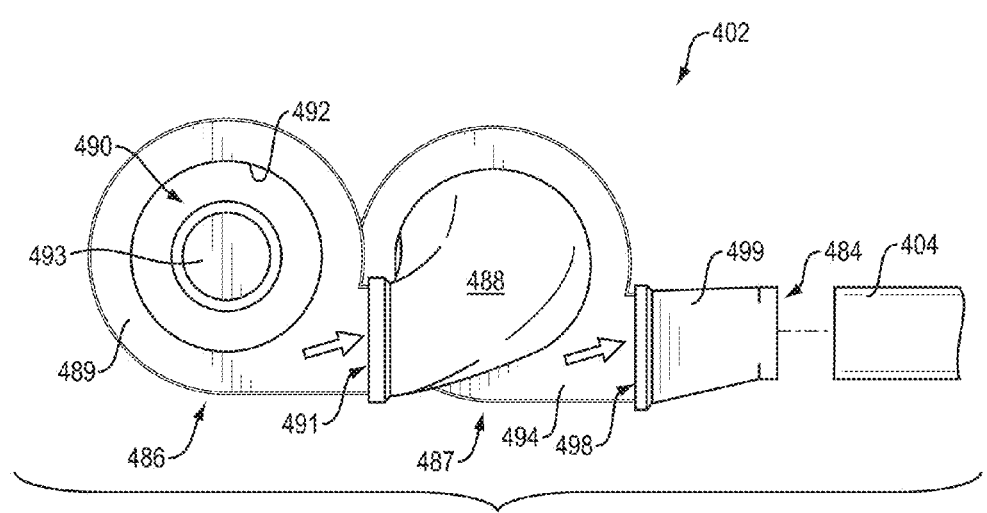

As shown in the various views of exemplary integrated liquid fuel CPOX reformer-fuel cell system 400 and components thereof illustrated in FIGS. 4A-4Q, which are representative of further embodiments of the present teachings, air as an oxygen-containing gas for providing the oxygen component of the gaseous CPOX reaction mixture is introduced into liquid fuel CPOX reformer section 401 at ambient temperature and at a preset mass flow rate via centrifugal blower system 402, shown in greater detail in FIGS. 4P and 4Q, through inlet 403 of main conduit 404, which includes a generally U-shaped conduit section favoring compact design. The ambient temperature air is initially heated in the start-up mode operation of integrated reformer-fuel cell system 400 to within a preset range of elevated temperature by passage through first heating zone 405 supplied with heat from first heater unit 406. First heater unit 406 and second heater unit 413, downstream therefrom, can be of a conventional or otherwise known electrical resistance type rated, for example, at from 10 to 80 watts, or even greater depending upon the designed range of fuel processing capacity of the reformer. Such heaters are capable of raising the temperature of ambient air introduced into a conduit to a desired level for a relatively wide range of CPOX reformer configurations and operating capacities. During the steady-state mode of operation of integrated reformer-fuel cell system 400, and in particular, its reformer section 401, first heater unit 406 can be shut off, the air introduced into main conduit 404 then being initially heated within heat transfer zone 407 by heat of exotherm recovered from CPOX reaction zones 409 of elongate tubular gas-permeable CPOX reactor units 408, the structural and compositional details of which are described in greater detail in FIGS. 4I-4M. In this manner, the temperature of the air introduced into a conduit can be increased from ambient to within some preset elevated range of temperature with the particular temperature being influenced by a variety of design, i.e., structural and operational factors as those skilled in the art will readily recognize.

Thermal insulation 410, for example, of the microporous or alumina-based refractory type, surrounds most of main conduit 404 and those portions of CPOX reactor units 408 corresponding to their CPOX reaction zones 409 in order to reduce thermal losses from these components. Such insulation also surrounds much or substantially all of the heat-radiating surfaces of fuel cell section 467 to reduce thermal losses from its fuel cell stack 468 and afterburner 470 components.

As the heated air stream flows downstream within main conduit 404 (which in the depicted configuration also can be referred to herein as an oxygen-containing gas conduit), it can be split, or divided, into two streams with one stream (e.g., a primary (fluid) stream) continuing to course through main conduit 404 and the other stream (e.g., a secondary (fluid) stream) being diverted into branch conduit 411 from which it exits to re-enter main conduit 404 at merger zone 421 and merge with vaporized fuel-air mixing passing from first mixing zone 420 (having a first static mixer and/or a helically-grooved internal wall surface disposed therein). The merged gases then enter second mixing zone 422 downstream of the vaporizer (likewise having a second static mixture and/or a helically-grooved internal wall surface disposed therein) to provide a gaseous CPOX reaction mixture of fairly uniform composition for introduction through outlet 425 into gas distributor 427 of manifold 426, the structure and operation of which are more fully described herein.

In some embodiments, rather than a single conduit that includes branching, two individual or independent conduits can be used to achieve the same purpose where each conduit has a source of oxygen-containing gas in fluid communication with the respective conduit. That is, a primary fluid stream from a first source of oxygen-containing gas can pass through a first (main) conduit and to the vaporizer, usually at a reduced volumetric flow rate to maintain a higher fuel:air ratio up to and through the vaporizer. A secondary fluid stream from a second source of oxygen-containing gas can pass through a second conduit and merge with the primary fluid stream and vaporized liquid reformable fuel mixture in the first conduit downstream of the vaporizer but upstream of the inlets of the CPOX reactor units and/or a manifold thereby to delivery the desired O:C ratio of gaseous CPOX reaction mixture to the CPOX reactor units.

Figure 4R:
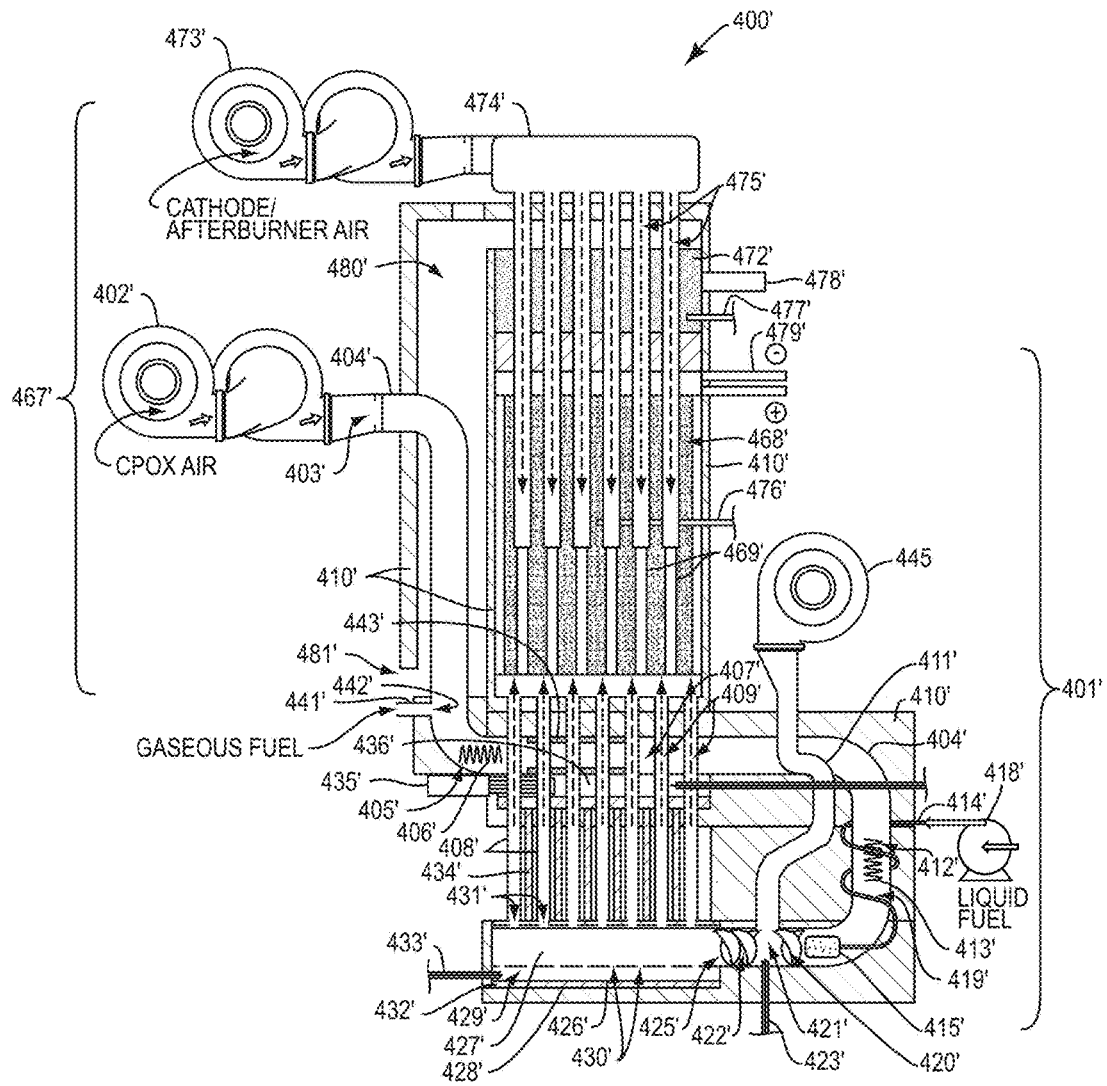
FIG. 4R is a longitudinal cross section view of an embodiment of an integrated liquid fuel CPOX reformer-fuel cell system in accordance with the present teachings similar to FIG. 4A.

FIG. 4R is a longitudinal cross section view of such an embodiment of an integrated liquid fuel CPOX reformer-fuel cell system in accordance with the present teachings similar to FIG. 4A but where two sources of oxygen-containing gas 402', 445 are present, each in fluid communication with merger zone 421' via conduit 404' and conduit 411'. Like reference numerals generally refer to like parts in FIGS. 4A and 4R and will not be repeated here.

In either case, by splitting the total amount of air for the desired CPOX reaction into two streams, the amount of vaporized liquid fuel component contained in the fuel-air mixture that starts to form as just-vaporized fuel and heated air begin to combine can be kept high in proportion to the air component thus eliminating or reducing the possibility that some region(s) of this non-uniform initial fuel-air mixture will contain a concentration of air that is sufficiently high to support ignition and consequent coke formation. Once the initial fuel-air mixture passes through the first static mixer disposed within a first mixing zone thereby attaining a degree of compositional uniformity that makes the presence of ignition-inducing regions of relatively high air concentration much less likely, the somewhat more uniform fuel-air mixture then can merge with the second heated air stream (or secondary (fluid) stream) exiting a branch conduit at a merger zone thereby satisfying the preset O to C molar ratio of the desired CPOX reaction mixture. This fuel-air mixture then can flow through the second static mixer disposed within a mixing zone to provide a more compositionally uniform gaseous CPOX reaction mixture just prior to the mixture entering a gas distributor of a manifold.

To raise the temperature of the air that had been initially heated by passage through first heating zone 405 and/or heat transfer zone 407, as the initially heated air continues to flow downstream in main conduit 404, the initially heated air is routed through second heating zone 412 supplied with heat from second heater unit 413. Because the second heater unit need only increase the temperature of the initially heated air by a relatively small extent, it can function as an incremental heater capable of making the typically small adjustments in air temperature that are conducive to precise and rapid thermal management of the reformer both with regard to the functioning of its fuel vaporization system, described herein, and its tubular CPOX reactor units.

A liquid reformable fuel such as any of those mentioned above, and exemplified in this and the other embodiments of the present teachings by diesel fuel, is introduced via fuel line 414 terminating within main conduit 404 in liquid fuel spreader device 415, for example, wick 416 shown in FIGS.

4D, 4E and 4F, or spray device 417 shown in FIG. 4G. The liquid fuel spreader (device) such as a sprayer or a wick can be the vaporizer, for example, located in the main conduit, or located external to the main conduit but in fluid communication with it.

Any conventional or otherwise known pump device 418 for passing fluid through the passageways and conduits of an integrated reformer-fuel cell system, for example, introducing liquid fuel through fuel line 414 into main conduit 404, can be used. For example, a metering pump, rotary pump, impeller pump, diaphragm pump, peristaltic pump, positive displacement pump such as a gerotor, gear pump, piezoelectric pump, electrokinetic pump, electroosmotic pump, capillary pump, and the like, can be utilized for this purpose. As indicated above, the pressurized liquid fuel can be spread within a conduit by a wick or as a fine spray or otherwise in droplet form by any of such conventional or otherwise known spray devices as fuel injectors, pressurized nozzles, atomizers (including those of the ultrasonic type), nebulizers, and the like. A second heater unit and a fuel spreader device can function in unison to vaporize the liquid fuel introduced into the conduit and together constitute the principal components of the fuel vaporizer system of a reformer section. In some embodiments, a pump or equivalent device can deliver the fuel on an intermittent or pulsed flow basis. In certain embodiments, a pump or equivalent device can deliver the fuel as a substantially continuous flow. In particular embodiments, a pump or equivalent device can make rapid adjustments in fuel flow rate in response to changing CPOX reformer operating requirements.

Although a reformer section can use any source of heat for driving vaporization of the liquid fuel during the start-up mode of operation, for example, a heater of the electrical resistance type (as in the case of heaters 406 and 413), especially where vaporization of the fuel is made to take place outside main conduit 404, the embodiment of liquid CPOX reformer illustrated in FIGS. 4A, 4D and 4G employs heater 413 to not only incrementally to raise the temperature of the initially heated ambient temperature air but to heat the liquid fuel prior to its introduction into main conduit 404 and to provide sufficient heat for vaporizing the fuel once it enters the conduit. This optional provision for heating liquid fuel prior to its introduction into conduit can make it possible to vaporize a given amount of liquid reformable fuel faster, or a greater amount of liquid fuel within a given time period, than the same vaporizer system operating upon reformable fuel which is at ambient temperature at the time it enters the conduit.

To provide for the heating of the liquid fuel before it enters main conduit 404 and as shown in the vaporizer system, or assembly, illustrated in FIGS. 4A, 4D and 4G, fuel line 414 traverses the wall of main conduit 404 with section 419 of the fuel line being extended in length to prolong the residence time of fuel flowing therein where the fuel line passes through, or is proximate to, second heating zone 412 of main conduit 404. An extended fuel line section can assume a variety of configurations for this purpose, for example, a coiled or helical winding (as shown) or a series of lengthwise folds, disposed on or proximate to the exterior surface of a conduit corresponding to a second heating zone or any similar such configuration disposed within the interior of the conduit at or near the second heating zone. Regardless of its exact configuration and/or disposition, extended fuel line section 419 must be in effective heat transfer proximity to second heating zone 412 so as to receive an amount of heat sufficient to raise the temperature of the fuel therein to within some preset range of temperature. Thus, a portion of the thermal output of heater 413 within second heating zone 412 of main conduit 404, in addition to further heating air flowing within this zone, will transfer to fuel, for example, diesel fuel, flowing within the distal section 419 of fuel line 414, which distal section of fuel line 414 can be lengthened or extended as shown by reference numeral 419, thereby raising its temperature to within the preset range. Whichever range of temperatures is chosen for the fuel within the fuel line, it should not exceed the boiling point of the fuel (from 150° C. to 350° C. in the case of diesel) if vapor lock and consequent shut-down of an integrated CPOX reformer-fuel cell system is to be avoided.

Liquid fuel spreader 415 is disposed within main conduit 404 downstream from second heating zone 412 and associated heater 413 and upstream from first mixing zone 420. Thermocouple 423 is disposed within main conduit 404 downstream from the vaporizer in order to monitor the temperature of the vaporized fuel-air mixture (e.g., CPOX reaction mixture) beginning to form therein and provide a control input for a control system such as control system 300 of FIG. 3A.

As illustrated in FIGS. 4D, 4E and 4F, in one embodiment of a vaporizer system described herein, the terminal section of fuel line 414 within main conduit 404 ends in a perforated or multi-slotted liquid fuel outlet 424 which can be in approximate alignment with the center of the cross section of the conduit so that the heated air stream from second heating zone 412 tends to contact evenly liquid fuel spread out upon the surface of wick 416. The body of a wick, which can be fit over a liquid fuel outlet, can be fabricated from any suitable heat-resistant material. Examples of such heat-resistant materials include metal, ceramic, high temperature polymer, and the like, and combinations thereof, such as a spirally wound sheet of interwoven metal or carbon fibers (for imparting structural strength) and ceramic fibers (for wicking action). A wicking or capillary action can draw up heated diesel fuel discharged through the fuel outlet. The heated diesel drawn up to and upon the surface of a wick thereupon can vaporize on contact with heated air flowing downstream from a second heating zone and begin to combine with the heated air to form initially a non-uniform gaseous fuel-air mixture, i.e., a non-uniform gaseous CPOX reaction mixture. This initial fuel-air mixture following passage through the first static mixture within first mixing zone 420 then merges with the remaining complement of heated air flowing from branch conduit 411 into merger zone 421 and from there the merged streams flow into the second static mixer within second mixing zone 422 from which there exits a more compositionally uniform gaseous CPOX reaction mixture.

As illustrated in FIG. 4G, in another embodiment of liquid fuel vaporizer system herein, fuel line 414 terminates in liquid fuel spray device 417, which ejects a fine spray of heated diesel fuel into main conduit 404 in the same direction of flow as the heated air stream. As in the case of fuel-wicking component 416 of the vaporizer system illustrated in FIGS. 4D, 4E and 4F, the spray droplets of heated diesel discharged into main conduit 404 from spray device 417 vaporize upon contact with the heated air stream flowing downstream from second heating zone 412. In both vaporizer system embodiments, described herein, the vaporized diesel begins to mix with the heated air to provide the heated fuel-air stream for ultimate introduction into CPOX reactor units.

In the liquid fuel vaporizer systems described herein, there is no or little opportunity for the diesel to come into direct contact with a heated surface, for example, that of an electrical resistance heater element, that would pose a risk of raising the temperature of the diesel fuel to or above its flash point, to cause spattering of the fuel rather than its vaporization and/or cause pyrolysis of the fuel resulting in coke formation. Thus, in the vaporizer systems illustrated in FIGS. 4D, 4E, 4F and 4G, the temperature of the diesel fuel can be readily and reliably maintained at a level below its flash point and without significant incidences of spattering or coking.

Referring to FIG. 4A, following its passage through the second static mixer disposed within second mixing zone 422, gaseous CPOX reaction mixture exits main conduit 404 through outlet 425 and enters gas distributor 427 of manifold 426, which is configured to provide a more uniform distribution of the reaction mixture to, and within, tubular CPOX reactor units 408. Such an arrangement or other arrangement within the present teachings can provide a distribution of gaseous CPOX reaction mixture where the difference in flow rate of the gaseous CPOX reaction mixture within any two CPOX reactor units is not greater than about 20 percent, for example, not greater than about 10 percent, or not greater than about 5 percent.

Returning to FIG. 4A, manifold 426 (an enlarged longitudinal cross section view of a portion of which is illustrated in FIG. 4I together with associated tubular CPOX reactor units 408) includes manifold housing, or enclosure, 428 defining manifold chamber 429 within which heated gaseous CPOX reaction mixture (gas) distributor 427 is connected to outlet 425 of main conduit 404. Heated gaseous CPOX reaction mixture exiting main conduit 404 through outlet 425 enters gas distributor 427 thereafter passing outwardly through apertures (e.g., holes or slots) 430 located at the bottom or lower part of the gas distributor, the gas then flowing around the exterior surface of the distributor to its top or upper part and from there into inlets 431 of tubular CPOX reactor units 408. The path of the gaseous CPOX reaction mixture as it passes through orifices 430 and into inlets 431 is shown in FIG. 4B.

To eliminate or lessen the possibility that the temperature within some region(s) and/or surface(s) of manifold chamber 429 will fall to or below the condensation temperature of the vaporized liquid reformable fuel of the gaseous CPOX reaction mixture present therein, electrical resistance heater 432 and thermocouple 433 can be disposed within manifold chamber 429, for example, on one or more of its internal surfaces or embedded within one or more of its walls, to provide an active heater system for maintaining the temperature within the chamber above the fuel condensation temperature. In addition to an active heater system, for example, as described above, or as an alternative thereto, a passive heat transfer system comprising thermally conductive elements 434, for example, fabricated from a good conductor of heat such as copper, thermally linking CPOX reaction zones 409 of tubular CPOX reactor units 408 with manifold chamber 429 can be arranged within reformer section 401 to convey heat of exotherm from CPOX reaction zones 409 to regions and/or surfaces within manifold chamber 429 so as to maintain the temperature of the vaporized fuel therein above its condensation temperature.

In addition to their function of preventing or minimizing the occurrence of fuel condensation, such active and/or passive heating systems can serve to make the temperature of the gaseous CPOX reaction mixture more uniform as it is introduced into inlets of CPOX reactor units with consequent benefits for both reformer operation and control. Thus, for example, one or both manifold heating systems can be operated to provide a gaseous CPOX reaction mixture of consistently uniform temperature throughout a manifold chamber such that there will be not more than about a 10% difference, for example, not more than about a 5% difference, in the temperature of gaseous CPOX reaction mixture entering any two tubular CPOX reactor units.

Some specific factors that can bear upon the optimization of the design of a manifold for accomplishing its function of promoting a more uniform distribution of gaseous CPOX reaction mixture to CPOX reactor units include the configuration of its housing, the volume of its chamber, and the dimensions of the gas distributor including the number, design and placement of its orifices. Such factors in turn depend on such reformer design and operational factors as the target flow rates of gaseous CPOX reaction mixture within a conduit, the number and arrangement of CPOX reactor units, the shape and dimensions of inlets of CPOX reactor units, and similar considerations. A manifold of optimal fuel-air distribution performance for a particular liquid fuel CPOX reformer in accordance with the present teachings can be readily constructed by those skilled in the art employing routine testing methods.

Where a CPOX reaction zone of a CPOX reactor unit is substantially coextensive with the length of the reactor unit, a manifold housing can be fabricated from a material that remains thermally and mechanically stable at the high temperatures that are typical of CPOX reforming. In these embodiments, various kinds of refractory materials, including refractory composites such as carbon fiber- and/or glass fiber-reinforced ceramics, are suitable for fabricating the manifold housing. Suitable materials of construction include dense ceramics such as various known types of alumina, recrystallized alumina, alumino-silicates, boron nitride, glass-ceramics, magnesium oxide, zirconium phosphate, and the like, metals such as nickel-chromium-based super alloys, Hastelloy super alloys, and the like. However, these and other refractory materials tend to be relatively high in cost and can also be challenging to work with, especially in the case of manufacturing articles with relatively complex configurations.

As shown in an enlarged, exemplary longitudinal cross section view of CPOX reactor unit 408 illustrated in FIG. 4J, gas-permeable wall 451 of CPOX reactor units 408 can be divided along its length into a first, or upstream, region 452, starting at its fuel-air mixture inlet 431, that is substantially devoid of CPOX catalyst, and a second, or downstream, region 453, starting at the end of first region 452 and ending at or proximate to product reformate effluent outlet 454 of the reactor unit, that contains a catalytically effective amount of CPOX catalyst 464. During steady-state operation of integrated reformer-fuel cell system 400 of FIG. 4A, this embodiment of a CPOX reactor unit largely confines hot CPOX reaction zones to their second regions 453 leaving its essentially CPOX catalyst-free first region 452 to remain at a considerably lower temperature, for example, in the region of from ambient to up about 350° C., particularly at the juncture of fuel-air mixture inlets 431 of CPOX reactor units 408 and manifold housing 428.

The lower temperature of a CPOX catalyst-free wall section zone, which temperature is lower than the melting temperature of many thermoplastic resins and below the thermal degradation temperature of many thermoset resins, makes it practical and advantageous to utilize any of several families of thermoplastic and thermoset resins for the manufacture of a manifold housing. Specific types of thermoplastic and thermoset resins that can be used for the fabrication of a manifold housing include polyetherimide (PEI), polyaryletherketones (PAEKs) such as polyether ether ketone (PEEK), phenol-formaldehyde resins, and the like. These and other thermally stable resins, in addition to their relatively low material cost, have the added advantage of being readily formable into complex shapes employing low cost manufacturing procedures such as extrusion molding, vacuum molding, injection molding, reaction injection molding, rotational molding, and the like, and are therefore well suited for making manifold housings having relatively complex geometries.

Returning to FIG. 4A, from manifold 426, heated gaseous CPOX reaction mixture enters inlets 431 of CPOX reactor units 408 and into CPOX reaction zones 409 where the reaction mixture undergoes a gaseous phase CPOX reaction to produce a hydrogen-rich, carbon monoxide-containing reformate. In the start-up mode, one or more igniter(s) 435 initiates CPOX. After CPOX becomes self-sustaining, for example, when the temperature of the reaction zone reaches from about 250° C. to about 1100° C., the igniter(s) can be shut off as external ignition no longer is required to maintain the now self-sustaining CPOX reaction.

FIGS. 4A-4C and 411 illustrate an embodiment of the present teachings where two igniters 435 (one for each array) are used to initiate a CPOX reaction within CPOX reaction zones 409 of CPOX reactor units 408 in a chamber during the start-up mode of operation of reformer 401. As shown, CPOX reactor units 408 are arranged in two separate 2×7 arrays with each array being disposed within a chamber 436 flanking main conduit 404. The perimeter of an array marks the boundary between open space 438 of chamber 436 and thermal insulation 410. Exterior surfaces 437 of the walls of CPOX reactor units 408 corresponding to at least a portion of their CPOX reaction zones 409 are exposed within open space 438. If a hydrogen barrier is present, the hydrogen barrier can be the exposed, exterior surface of a CPOX reactor unit. Igniters 435 of the electrical resistance type, for example, rated at from 10 to 80 watts or greater, are disposed at opposite ends of chamber 436 where then radiant heat-producing elements 439 are positioned in proximity to, but in physical isolation from, exterior surfaces 437 of CPOX reactor units 408. Thermocouples 440 are disposed at the ends of chamber 436 opposite igniters 435 in order to monitor the temperature of CPOX reaction zones 409 and provide a reformer control input as described in connection with the control system illustrated in FIG. 3A. Operation of the igniters causes radiant heat to be transferred to, and through, the walls of one or more nearby CPOX reactor units whereby CPOX is initiated within the CPOX reaction zone of such reactor unit(s). The thermal radiation emitted from the CPOX reaction zone(s) of these nearby CPOX reactor units then can initiate CPOX within the reaction zones of the remaining CPOX reactor units within the array as illustrated by the wavy arrows in FIG. 4C.

The provision of a single, or two, or at most a few, igniter(s) that avoid direct contact with CPOX reactor units provides several advantages over a CPOX igniter system in which each CPOX reactor unit has its own physically attached or integrated igniter. While use of the latter ignition system is contemplated by the present teachings, identification of an inoperative igniter can be problematic and its removal and replacement without damage to the CPOX reactor unit of which it is a part and/or disturbance to other reactor units in the array can be difficult. Accordingly, a single (or a few) igniter(s) appropriately positioned within an array or plurality of CPOX reactor units can permit easy and simple identification and extraction from CPOX reformer section of a failed or defective igniter, and its replacement with an operative igniter.

As shown in FIGS. 4C and 4H, where two igniters are used, each igniter to ignite a 2×7 array of CPOX reactor units, it can be advantageous to reverse the positions of igniter 435 and thermocouple 440 on one side of chamber 436 relative to the positions of igniter 435 and thermocouple 440 on the other side of the chamber, particularly where there can be significant thermal communication between the two chambers. Such an arrangement has been observed to result in a more rapid initiation of CPOX within the CPOX reaction zones of each separate array of CPOX reactor units. However, it should be understood that with the appropriately dimensioned and positioned CPOX reactor units within a chamber, a single igniter can be used to initiate CPOX within the CPOX reaction zones of the CPOX reactor units within the chamber.

In addition to processing liquid reformable fuels, liquid fuel reformer 401 illustrated in FIG. 4A includes components that enable it to co-process and/or alternately/sequentially process gaseous reformable fuels, a capability that optimizes fuel management where both types of reformable fuel are available, for example, but not necessarily at the same time. Moreover, this dual fuel processing capability is further advantageous in that it exploits the thermal profile within main conduit 404 during steady-state operation of the reformer by utilizing heat of exotherm resulting from the CPOX reaction to initiate CPOX of gaseous fuel within heat transfer zone 407.

As shown in FIG. 4A, reformer section 401 includes gaseous reformable fuel line 441 and gaseous fuel inlet 442 through which a gaseous fuel such as methane or natural gas is introduced into main conduit 404 at a location therein which is downstream from centrifugal blower system 402 and inlet 403 and upstream from first heating zone 405 and heat transfer zone 407. The gaseous fuel combines with the previously introduced ambient temperature air with the resulting gaseous fuel-air mixture then passing through first heating zone 405 and thereafter through heat transfer zone 407.

As shown, gas-permeable CPOX catalyst-containing support 443, for example, a close-fitting sleeve, insert, lining or coating provided as a porous refractory metal and/or ceramic material, is disposed within heat transfer zone 407 of main conduit 404 and extends for at least part of the length, or the full length, of heat transfer zone 407. The fuel-air mixture, heated within first heating zone 405 during a start-up mode of operation to a temperature sufficient to initiate CPOX, or to a CPOX-initiating temperature within heat transfer zone 407 during a steady-state mode of operation, undergoes CPOX upon contact with CPOX catalyst-containing support 443 to provide a hydrogen-rich reformate.

If desired, a liquid fuel CPOX reformer can be operated solely or intermittently with gaseous reformable fuel, or concurrently with both vaporized liquid fuel and gaseous reformable fuel. In the case of concurrent conversion of both types of fuel, the gaseous fuel is the first to undergo CPOX, such being effected by a CPOX catalyst-containing support disposed within a heat transfer zone. The hydrogen-rich reformate from this gaseous fuel CPOX reaction then combines downstream with a vaporized liquid fuel-air mixture, the latter thereafter undergoing CPOX within the CPOX reaction zones of tubular CPOX reactor units as described herein to produce an additional quantity of hydrogen-rich reformate.

The provision of a CPOX catalyst-containing support within a heat transfer zone of a conduit allows CPOX reforming of gaseous fuel to proceed therein under the milder temperature conditions that are typical of the more efficient CPOX conversion of gaseous fuels (e.g., from about 600° C. to about 850° C.) in contrast to the higher temperature regimes of the less efficient CPOX conversion of liquid reformable fuels such as diesel (e.g., from about 650° C. to 1,100° C.). Conducting gaseous fuel CPOX reforming within a CPOX catalyst-containing support at the aforementioned lower temperatures has the considerable advantage of reducing the risk of cracking of the fuel and consequent coke formation on the surfaces of the (main) conduit and CPOX reactor units. Such events would be more likely to occur and lead to CPOX reformer failure were the gaseous fuel to be added directly to the CPOX reactor units with or following the introduction of vaporized fuel-air mixtures therein. Therefore, in certain embodiments of integrated CPOX reformer and fuel cell systems that possess dual fuel conversion capacity, transitioning from the sole processing of gaseous fuel and back again following a period of liquid reformable fuel CPOX conversion and/or co-processing mixtures of vaporized liquid reformable fuel and gaseous reformable fuel can be readily and smoothly accomplished without risk to the integrity of the CPOX reformer section, its proper functioning, and the proper functioning of the overall integrated system.

Returning to FIG. 4I, enlarged manifold portion 450 of manifold 426 of reformer section 401 illustrated in FIGS. 4A and 4B includes upper housing structure 455, lower housing structure 456, manifold chamber 429, gaseous CPOX reaction mixture (gas) distributor 427 and gas distributor outlets 430 in fluid communication, for example, gaseous flow communication, with inlets 431 of tubular CPOX reactor units 408. Inlet ends 457 of tubular CPOX reactor units 408 are firmly seated within cavities 458 formed within upper housing structure 455 and are engaged in gas-tight relationship therewith by O-ring gaskets 459. Heated gaseous CPOX reaction mixture flows through outlets 430 of gas distributor 427, through inlets 431 of tubular CPOX reactor units 408 and into CPOX reaction zones 409, where the gaseous CPOX reaction mixture undergoes gaseous phase CPOX conversion to a hydrogen-rich, carbon monoxide-containing effluent reformate exiting the reactor units at their outlet ends 460 through associated outlets 454 and thereafter, for example, entering a tubular SOFC units constituting a fuel cell stack of a fuel cell section as more fully described herein. As shown, CPOX reactor units 408 are seated above thermally conductive element 434, which can be an orifice plate that includes orifices leading from the gas distributor to the inlets of the CPOX reactor units. The orifice plate can be physically the same structure as the manifold housing or can be a separate structure that is attached to or sealed to the manifold housing as shown. In the latter configuration, the orifice plate can act as the thermally conductive element, or "heat spreader," to prevent condensation of vaporized liquid fuel before it exits the manifold chamber.

As further shown in FIGS. 4J and 4K, gas permeable wall 451 of each tubular CPOX reactor unit 408 includes an inner surface 461, an outer surface 462, an open gaseous flow passageway 463 enclosed by gas-permeable wall 451, a portion of which constitutes CPOX reaction zone 409, and a catalytically effective amount of CPOX catalyst 464 supported within and/or comprising the structure of at least the section of gas-permeable wall 451 corresponding to second region 453 and CPOX reaction zone 409. As illustrated, to prevent or inhibit the loss of product hydrogen gas through gas-permeable wall 451, a hydrogen barrier 465 is attached to outer surface 462 of gas-permeable wall 451.

An open gaseous flow passageway can allow for the substantially unimpeded flow of gaseous CPOX reaction mixture and hydrogen-containing reformate therein, a structural feature of CPOX reactor units of the present teachings that contributes to the low back pressure which is characteristic of the operation of liquid fuel CPOX reformers of the present teachings. In the operation of a liquid fuel CPOX reformer and/or an integrated reformer-fuel cell system in accordance with the present teachings, back pressures of not more than about 3 inches of water (0.0075 bar), for example, not more than about 2 inches of water, or not more than about 1 inch of water, are readily achievable.

As previously mentioned herein, to prevent or inhibit the loss of hydrogen by diffusion through and beyond a gas-permeable wall that forms a CPOX reactor unit, in some embodiments of CPOX reactor units, a hydrogen barrier is associated with, for example, attached to or adhered to, an outer or external surface of the gas-permeable wall for at least that portion of the length of the CPOX reactor unit corresponding to its CPOX reaction zone. Materials capable of functioning as effective hydrogen barriers should be thermally stable at the high temperatures typical of CPOX reactions and should be sufficiently dense to prevent or deter permeation or diffusion of reformate gases, particularly hydrogen therethrough.

A variety of ceramic materials (inclusive of glasses and glass-ceramics) and metals meeting these requirements are known and are therefore suitable for providing hydrogen barrier. Specific materials for hydrogen barrier include, for example, aluminum, nickel, molybdenum, tin, chromium, alumina, recrystallized alumina, aluminides, alumino-silicates, titania, titanium carbide, titanium nitride, boron nitride, magnesium oxide, chromium oxide, zirconium phosphate, ceria, zirconia, mulite and the like, admixtures thereof and layered combinations thereof.

Where the nature of the material constituting a hydrogen barrier permits, the hydrogen barrier can be applied to at least that portion of an outer surface of a CPOX reactor unit wall corresponding to the CPOX reaction zone as a pre-formed layer, foil, film or membrane. The hydrogen barrier can be bonded to the wall with a refractory adhesive. Alternatively, a hydrogen barrier can be formed on an outer surface by employing any suitable deposition method, for example, any of the conventional or otherwise known ceramic-coating and metal-coating techniques such as spray coating, powder coating, brush coating, dipping, casting co-extrusion, metallizing, and the like, and any of their many variations. A suitable range of thickness for a hydrogen barrier will depend primarily on the hydrogen permeability characteristics of the selected barrier material and the gas permeability characteristics of the wall enclosing the CPOX reaction zone, such thickness being determined by those skilled in the art. For many barrier materials and reactor wall structures, the thickness of a hydrogen barrier can vary from about 2 microns to about 15 microns, for example, between about 5 microns and 12 microns.

In addition, a hydrogen barrier can be a pressurized fluid such as a pressurized gas associated with the external surface of a gas-permeable wall of a CPOX reactor unit, for example, at least the CPOX catalyst-containing wall section. With sufficient pressure, a pressurized fluid exterior to a CPOX reactor unit can create a barrier to prevent the loss of hydrogen through the gas-permeable wall that forms the CPOX reactor unit. Pressurized fluids typically are pressurized gases, such as inert gases (e.g., nitrogen) and/or air. The use of pressurized air as a hydrogen barrier has the additional advantage of oxygen diffusing from the exterior to the interior of the CPOX reactor unit, which diffused oxygen can adjust the O:C ratio of the gaseous CPOX reaction mixture about to and/or being reformed, particularly where such a hydrogen barrier is used and present around the CPOX reaction zone.

In certain embodiments, the CPOX reactor units can be located in an air-tight chamber but for their inlets and outlets thereby to permit pressurization of a fluid such as a gas in the environment exterior to the CPOX reactor units, which pressurized gas can create a hydrogen barrier associated with the external surfaces of the CPOX reactor units. In particular embodiments, because hydrogen is not produced in a CPOX reactor unit until the CPOX reaction zone, only the CPOX reaction zones of the CPOX reactor units are enclosed in an air-tight chamber that is pressurized with a fluid such as air. In embodiments where the CPOX reaction zone does not extend to the outlet of the CPOX reactor units, the beginning of the CPOX reaction zone to the outlet can be enclosed in an air-tight chamber to permit a pressurized gas to be used as a hydrogen barrier. In some designs, a chamber as described herein can encompass a portion of the CPOX reaction zone while another form of a hydrogen barrier can be present encompassing the remainder of the CPOX reaction zone.

In the embodiments where a chamber is used, such as an air-tight chamber, a conduit in fluid communication with the interior of the chamber can be used to pressurized the chamber with a fluid. For example, a pressurized fluid or gas conduit can provide operable fluid communication between the interior of the (air-tight) chamber and a source of pressurized or compressed fluid, such as a container a compressed gas such as compressed air.

As those skilled in the art will readily recognize and appreciate, the cross sectional configuration, number and dimensions of CPOX reactor units and the distances of their separation from each other measured from their geometric centers, or centroids, will be made to depend on the operational and mechanical performance specifications for a particular liquid fuel CPOX reactor. In the case of a CPOX reactor unit of substantially uniform circular cross section, for example, CPOX reactor unit 408 illustrated in FIGS. 4C, 4J and 4K, the number of such CPOX reactor units, their length, their internal and external diameters (defining the thickness of their gas-permeable walls) and the location, length and thickness of hydrogen barriers attached to outer surfaces of the gas-permeable walls will be determined by, among other things, the hydrogen-producing capacity of the CPOX reformer, which in turn is a function of several factors including the type, amount (loading and distribution of CPOX catalyst within the gas-permeable walls), the characteristics of the porous structure of walls, characteristics influencing the gas-permeability of the walls, (and therefore affecting the CPOX reaction) such as pore volume (a function of pore size), the principal type of pore (mostly open. i.e., reticulated, or mostly closed, i.e., non-reticulated), and pore shape (spherical or irregular), the volumetric flow rates of CPOX reaction mixture, CPOX temperature, back pressure, and the like.

The desired mechanical performance characteristics of a particular liquid fuel CPOX reformer will depend to a considerable extent on such factors as the thermal and mechanical properties of the material used for construction of the CPOX reactor units, the volume and morphology of the pores of the gas-permeable structure of the walls of the CPOX reactor units, the dimensions of the reactor units, particularly wall thickness, and related factors.

For a liquid fuel CPOX reformer to suitably function, the gas permeability property of the catalytically-active wall structure of a tubular CPOX reactor unit enclosing a gaseous phase CPOX reaction zone must be such as to allow the vaporized liquid reformable fuel, and in the case of diesel, its longer chain components such as the $C_{12}$-$C_{14}$ hydrocarbons, to freely enter and diffuse through such wall structure thereby making effective contact not only with surface CPOX catalyst but interior CPOX catalyst as well, if present. It should be noted that CPOX reactor unit wall structures having limited gas permeability for the vaporized reformable fuel can be mass transport limited so as to impede significantly CPOX conversion of the vaporized liquid reformable fuel to hydrogen-rich reformate. By contrast, catalytically-active reactor wall structures of suitable gas permeability promote CPOX conversion of the vaporized liquid reformable fuel and selectivity for hydrogen-rich reformates of desirable composition.

Guided by the present teachings and employing known and conventional testing procedures, those skilled in the art can readily construct CPOX reactor units having catalytically-active wall structures exhibiting optimal gas permeability properties for a particular liquid reformable fuel to be processed.

Materials from which the catalytically-active wall structure of a CPOX reaction zone of a tubular CPOX reactor unit can be fabricated are those that enable such wall structures to remain stable under the high temperatures and oxidative environments characteristic of CPOX reactions. Conventional and otherwise known refractory metals, refractory ceramics, and combinations thereof can be used for the construction of the catalytically-active wall structure of a CPOX reaction zone. Some of these materials, for example, perovskites, also can possess catalytic activity for partial oxidation and therefore can be useful not only for the fabrication of the catalytically-active wall structure of a CPOX reaction zone but also can supply part or even all of the CPOX catalyst for such structure.

In some embodiments, at least the section of the wall of a CPOX reaction zone or including a CPOX, catalyst of a CPOX reactor unit can be made of or can include a perovskite. For example, greater than about 20%, greater than about 30%, greater than about 40%, greater than about 50%, greater than about 60%, greater than about 70%, greater than about 80%, or greater than about 90% by weight of such wall section can be perovskite. Such a wall section can be made entirely of a perovskite, or the entire wall of a CPOX reactor unit can be made of a perovskite or can include the percentages of a perovskite described herein. The balance of the materials of the section of the wall at least corresponding to the CPOX reaction zone can include at least one component selected from metals, ceramics, refractory binders, and CPOX catalysts other than a perovskite.

The perovskite can be at least one member selected from $LaNiO_3$, $LaCoO_3$, $LaCrO_3$, $LaFeO_3$ and $LaMnO_3$. Perovskites can include lanthanum strontium manganite, lanthanum strontium ferrite, lanthanum strontium cobalt ferrite, lanthanum calcium manganite, lanthanum strontium chromite, lanthanum strontium gallate magnesite, and combinations thereof. When present as a catalyst, the perovskite can be $La_{1-x}Ce_xFe_2O_3$, $LaCr_{1-y}Ru_yO_3$, $La_{1-x}Sr_xAl_{1-y}Ru_yO_3$ and $La_{1-x}Sr_xFe_2O_3$, including combinations thereof, where x and y are numbers ranging from 0.01 to 0.5. In addition, other appropriately transition metal-doped perovskites can be used in the practice of the present teachings.

Among the useful refractory metals are titanium, vanadium, chromium, zirconium, molybdenum, rhodium, tungsten, nickel, iron and the like, their combinations with each other and/or with other metals and/or metal alloys, and the like. Refractory ceramics are a class of materials for the construction of the catalytically-active wall structures due to their relatively low cost compared to many refractory metals and metal alloys that are also useful for this purpose. The comparative ease with which such ceramics can be formed into tubular gas-permeable structures of fairly reproducible pore type employing known and conventional pore-forming procedures and the generally highly satisfactory structural/mechanical properties of ceramics (including coefficients of thermal expansion and thermal shock performance) and resistance to chemical degradation make them attractive materials. Suitable refractory ceramics for the construction of a CPOX reaction zone (which as previously stated, can include the entire wall structure of a CPOX reactor unit) include, for example, perovskites, spinels, magnesia, ceria, stabilized ceria, silica, titania, zirconia, stabilized zirconia such as alumina-stabilized zirconia, calcia-stabilized zirconia, ceria-stabilized zirconia, magnesia-stabilized zirconia, lanthana-stabilized zirconia and yttria-stabilized zirconia, zirconia stabilized alumina, pyrochlores, brownmillerites, zirconium phosphate, silicon carbide, yttrium aluminum garnet, alumina, alpha-alumina, gamma-alumina, beta-alumina, aluminum silicate, cordierite, $MgAl_2O_4$, and the like, various ones of which are disclosed in U.S. Pat. Nos. 6,402,989 and 7,070,752, the entire contents of which are incorporated by reference herein; and, rare earth aluminates and rare earth gallates various ones of which are disclosed in U.S. Pat. Nos. 7,001,867 and 7,888,278, the entire contents of which are incorporated by reference herein.

In general, the total or overall fuel conversion capacity of a CPOX reformer of a given design will be the sum of the fuel conversion capabilities of its individual CPOX reactor units. The minimum distance between adjacent CPOX reactor units will be such that in the steady-state mode of operation of the reformer, the temperature of the reactor units does not exceed a predetermined, or preset, maximum, and the maximum distance between adjacent CPOX reactor units is that distance beyond which the CPOX reaction fails to be initiated within one or more reactor units during a start-up mode of operation of the liquid fuel CPOX reformer or the temperature within one or more CPOX reactor units falls below a predetermined, or preset, minimum intended for the steady-state mode of operation of the reformer. The minimum and maximum distances between adjacent CPOX reactor units readily can be determined for a given reformer section design employing routine testing methods.

The present teachings contemplate the use of any of the heretofore known and conventional CPOX catalysts (including catalyst systems), methods of incorporating catalyst within a porous substrate or support, specifically, a gas-permeable wall of the a CPOX reactor unit, and patterns of catalyst distribution including, but not limited to, catalyst confined to a particular section of a wall, catalyst loading increased along the length of a reactor unit and/or decreased from an inner surface of a wall to its outer surface, CPOX catalyst that varies in composition along the length of the reactor unit, and similar variants. Thus, for example, increasing catalyst loading within a wall of a CPOX reactor unit from the start of a CPOX reaction zone to, or near, the end thereof can be helpful in maintaining a constant CPOX reaction temperature with this zone.

Among the many known and conventional CPOX catalysts that can be utilized herein are the metals, metal alloys, metal oxides, mixed metal oxides, perovskites, pyrochlores, their mixtures and combinations, including various ones of which are disclosed, for example, in U.S. Pat. Nos. 5,149,156; 5,447,705; 6,379,586; 6,402,989; 6,458,334; 6,488,907; 6,702,960; 6,726,853; 6,878,667; 7,070,752; 7,090,826; 7,328,691; 7,585,810; 7,888,278; 8,062,800; and, 8,241,600, the entire contents of which are incorporated by reference herein.

While numerous highly active noble metal-containing CPOX catalysts are known and as such can be useful herein, they are generally less used than other known types of CPOX catalysts due to their high cost, their tendency to sinter at high temperatures and consequently undergo a reduction in catalytic activity, and their proneness to poisoning by sulfur.

Perovskite catalysts are a class of CPOX catalyst useful in the present teachings as they are also suitable for the construction of the catalytically-active wall structures of a CPOX reactor unit. Perovskite catalysts are characterized by the structure $ABX_3$ where "A" and "B" are cations of very different sizes and "X" is an anion, generally oxygen, that bonds to both cations. Examples of suitable perovskite CPOX catalysts include $LaNiO_3$, $LaCoO_3$, $LaCrO_3$, $LaFeO_3$ and $LaMnO_3$.

A-site modification of the perovskites generally affects their thermal stability while B-site modification generally affects their catalytic activity. Perovskites can be tailor-modified for particular CPOX reaction conditions by doping at their A and/or B sites. Doping results in the atomic level dispersion of the active dopant within the perovskite lattice thereby inhibiting degradations in their catalytic performance. Perovskites also can exhibit excellent tolerance to sulfur at high temperatures characteristic of CPOX reforming. Examples of doped perovskites useful as CPOX catalysts include $La_{1-x}Ce_xFeO_3$, $LaCr_{1-y}Ru_yO_3$, $La_{1-x}Sr_xAl_{1-y}Ru_yO_3$ and $La_{1-x}Sr_xFeO_3$ wherein x and y are numbers from 0.05 to 0.5, for example, from 0.05 to 0.2, depending on the solubility limit and cost of the dopants.

As previously discussed in connection with FIG. 4J, a CPOX reactor unit can include a first, upstream region that is substantially devoid of CPOX catalyst and can extend from its inlet end to a second, downstream region that contains a CPOX catalyst. The second, downstream region typically extends from the end of the first region to its reformate effluent outlet, although the amount of catalyst near the outlet can decline. The length of these regions relative to the entire length of the CPOX reactor unit can vary considerably. Thus, for example, a first region can extend from about 20% to about 60%, for example, from about 30% to about 40% or about 50%, of the length of a CPOX reactor unit, with a second region extending the remainder of the length of the CPOX reactor unit. As explained in connection with the description of CPOX reformer 401 of FIG. 4A, during steady-state operation of CPOX reformer 401, first region 452 remains at a considerably lower temperature than second region 453 (corresponding to CPOX reaction zone 409) allowing manifold housing 428 of manifold 426 of FIG. 4A to be fabricated from any of numerous kinds of low cost, readily moldable thermoplastic or thermoset resins.

CPOX reactor unit 408, in addition to the circular cross section shown in FIG. 4K, can assume other cross sectional configurations such as those illustrated in FIGS. 4L and 4M. FIG. 4L illustrates a CPOX reactor unit having an alternating concave-convex, or bilobate, cross section. CPOX reactor units having such a cross sectional configuration can be especially advantageous where their outlet sections are to be joined to, or mated with, similarly configured tubular solid oxide fuel cell (SOFC) units as in the SOFC fuel cell assemblies and fuel cell devices disclosed in co-pending, commonly assigned U.S. Patent Application Publication No. 2013/0230787, by Finnerty et al., the entire contents of which are incorporated by reference herein for all purposes.

Alternatively or in combination with direct connection of a CPOX reactor unit to a tubular fuel cell unit, the outlets of two or more CPOX reactor units of a multi-tubular CPOX reformer can be in fluid communication with each other (and with additional outlets of CPOX reactor units) and the hydrogen-rich reformate from the outlets can be combined prior to introduction into a fuel cell. For example, the hydrogen-rich reformate effluent from two or more CPOX reactor units can be combined in a manifold or similar device and/or one or more conduits and then introduced into a fuel cell, which could be a multi-tubular fuel cell or a single fuel cell unit. Accordingly, a CPOX reformer of the present teachings can be adapted to various applications depending on its end use, for example, providing hydrogen-rich reformate to a single or multi-tubular fuel cell unit.

Integrated liquid fuel CPOX reformer-fuel cell system 400 of FIG. 4A includes fuel cell section 467 featuring SOFC stack 468 made up of individual tubular SOFC units 469 (two embodiments of which. 470 and 471, are illustrated in enlarged detail in FIGS. 4N and 4O, respectively). If desired, the tubular SOFC units can be made to correspond in number and/or cross sectional configuration to CPOX reformer units 408 of reformer section 401 to which they can be directly joined (as shown). The depicted integrated liquid fuel CPOX reformer-fuel cell system also includes catalyst afterburner 472 for the combustion of spent gas, or tail gas, exiting SOFC stack 468; centrifugal blower system 473 (identical or similar in construction if not in size and/or capacity to centrifugal blower system 402 of reformer section 401) for driving a flow of air via manifold 474 and passageways 475 to the cathode side of SOFC units 469 and to afterburner 472 to support combustion therein; thermocouples 476 and 477 for monitoring the temperatures of, respectively, SOFC stack 468 and afterburner 472; afterburner gas igniter 478; and current collector 479 in electrical contact with the cathode and anode components of tubular SOFC units 469.

Fuel cell section 467 further includes heat transfer zone 480 wherein heat is transferred from hot combustion gases exiting afterburner 472 to CPOX air passing through main conduit 404 of reformer section 401 during steady-state operation of integrated reformer-fuel cell system 400, and combustion exhaust port 481.

As shown in FIG. 4N, tubular SOFC unit 470 possesses a generally elongate cylindrical configuration. The cut-away portions of SOFC unit 470 reveal its wall structure to be made up of an inner anode layer 482 that generates electrons, an outer cathode layer 483 that consumes electrons and an intermediate electrolyte layer 484 that conducts ions but prevents electrons from passing.

In operation, hydrogen and any other electrochemically oxidizable component(s) of the reformate entering SOFC stack 468 from reformer section 401 combine with oxygen anions within anode layer 482 of tubular SOFC unit 470 to produce water and/or carbon dioxide and electrons. The electrons generated within the anode layer migrate through the external load and back to the cathode layer where oxygen combines with the electrons to provide oxygen anions which selectively pass through the electrolyte layer and the anode layer. The electrochemical processes occurring within a tubular SOFC unit of a SOFC fuel cell stack are fundamentally the same as those taking place within other types/configurations of fuel cells, specifically, the fuel cell sections of the embodiments of integrated liquid fuel CPOX reformer-fuel cell systems illustrated in FIGS. 5A-5D.

As shown, at least a portion of anode layer 482 of tubular SOFC unit 470 can include or otherwise be in contact with one or more catalysts 485 that are catalytically-active for reforming (e.g., CPOX reforming, steam reforming, and/or autothermal reforming), for the water gas shift reaction, or for catalyzing both reforming and water gas shift reactions. Provision of catalyst(s) allows for the utilization of unconsumed vaporized liquid fuel, cracked fuel and/or carbon monoxide that may be present in the reformate from reformer section thereby providing additional hydrogen for conversion within tubular SOFC unit to electricity. Suitable catalysts include the CPOX catalyst listed above. Many of these catalysts are also catalytically-active for steam reforming, autothermal reforming and the water gas shift reaction. The thermal stability of such catalyst throughout the entire range of reaction temperatures encountered during CPOX (e.g., 250° C. to 900° C.), and therefore at the high temperatures that are typical of liquid fuel CPOX reformates coming into contact with the anode components of tubular SOFC units, makes them well suited for functioning as catalysts. Because water (steam) is present in the reformate entering the tubular SOFC units and is also produced as a byproduct of the electrochemical reactions occurring within the SOFC units, it is particularly advantageous to employ a catalyst that is active for both reforming reactions and the water gas shift reaction.

The selected catalysts can be incorporated within (e.g., impregnated) and/or be on the surface of the anode component of the tubular SOFC units employing any suitable conventional or otherwise known technique such as impregnation, coating, layering, etc. Up to about 80% of the length of the anode component can contain or include one or more catalysts with metal loadings of from 1-10 weight percent based on the weight of the anode component being generally satisfactory.

It is within the scope of the present teachings to provide a CPOX reactor unit 408 and a tubular SOFC unit 469 as a single continuous tubular body with the composition, structural and dimensional properties of the body being arranged as required to provide its distinct reformer and fuel cell sections. Particularly advantageous processes for manufacturing such a tubular reformer-fuel cell body are disclosed in copending, commonly assigned U.S. Patent Application Publication No. 2013/0056911, by Finnerty et al., and copending, commonly assigned U.S. Patent Application Publication No. 2013/0059223, by Finnerty et al., the entire contents of which are incorporated by reference herein for all purposes.

It is also within the scope of the present teachings to provide the current collector components for a tubular SOFC stack, for example, in accordance with the teachings of copending, commonly assigned U.S. Patent Application Publication No. 2013/0230787, by Finnerty et al., the entire contents of which are incorporated by reference herein for all purposes. As described therein, the current collector components and a tubular SOFC stack to which they are electrically connected are designed and arranged in such a way as to resist the tendency for the current collector components to eventually pull away or separate from their associated electrodes during operation of the stack, the occurrence of which over time tends to result in significant ohmic losses.

One embodiment of a tubular SOFC unit employed in a current collector/fuel cell stack assembly described in U.S. Patent Application Publication No. 2013/0230787 possesses, for at least a portion thereof, a generally bilobate cross section as shown for SOFC unit 471 of FIG. 4O. When designing a fuel cell section of the present teachings, it can be advantageous to employ a tubular SOFC unit having the cross section shown in FIG. 4O and correspondingly-configured CPOX reactor units. The coupling of these two kinds of units can be simplified and any disruption of the pattern of gas flow from tubular CPOX reactor unit to and through the SOFC unit can be minimized or lessened.

Centrifugal blower system 402 of CPOX liquid fuel reformer 401 and centrifugal blower system 473 of fuel cell section 467, shown in greater detail in FIGS. 4P and 4Q, are disclosed in co-pending, commonly assigned U.S. Patent Application Publication No. 2012/0328969, by DeWald et al., the entire contents of which are incorporated by reference herein for all purposes. Among their other advantages, these centrifugal blower systems can possess the ability to make rapid adjustments in the volume of gas introduced into a conduit and/or in the rate of flow of the gases driven within their respective reformer and fuel cell sections in response to changes in the demand for product hydrogen-rich reformate that single centrifugal blowers of comparable air flow capacity are incapable of providing, as explained herein, without resorting to blowers of relatively high power consumption.

Single centrifugal blowers such as those utilized to provide gas flows for the operation of known and conventional reformers require suitable control of the full range of motor revolutions per minute (rpm) in order to meet fluctuating gas flow demands. Depending on the target gas flow requirements for a particular mode of operation of an integrated reformer-fuel cell system optimum performance of blowers for meeting the requirement a reformer section and a fuel cell section can involve employing blowers having an impeller of relatively small size driven at relatively high rpm, for example, about 20,000 rpm and above, or a blower having an impeller of relatively large size driven at relatively low rpm, for example, below about 20,000 rpm and more commonly, below about 10,000 rpm. The first arrangement, i.e., a single blower having a relatively small impeller driven at relatively high rpm, requires a more powerful and specialized motor which of necessity will draw a correspondingly greater amount of electrical power for its operation. The second arrangement, i.e., a single blower having a relatively large impeller driven at relatively low rpm, can make control and fine tuning of the blower output more difficult due to the greater inertia of a large impeller.

To prevent overshooting of the target pressure and gas flow requirements for a reformer section and a fuel cell section, a single blower having a relatively high inertia impeller must be overdamped when tuning the blower for its expected range of gas pressure and flow capacity. The effect of this overdamping to compensate for the relatively high inertia of the impeller is to cause the blower to be slow in responding to changing, and often rapidly changing, gas flow requirements. This characteristically slow response of a single centrifugal blower having a relatively high inertia impeller can require a more complicated control system for satisfactorily responding to fluctuations in gas flow demand.

Utilizing centrifugal blower systems 402 and 473 to drive gas flows within an integrated liquid fuel CPOX reformer-fuel cell system can enable the system to benefit from both low inertia impellers for control as well as low drive motor rpm and power draw to meet quickly target gas flow and pressure requirements. Controlling one or more blower units in an interconnected series of blowers such as centrifugal blower systems 402 and 473 to provide a major portion of the target gas pressure and gas flow, for example, about 60% to about 90% of the target gas pressure and gas flow, can enable the remainder of the target gas pressure and gas flow to be provided by one or more other blower units in the system. The result of splitting the task of providing target gas flows and pressures into an integrated CPOX reformer-fuel cell system between at least two integrated, i.e., interconnected, centrifugal blowers as in dual centrifugal blower systems 402 and 473 results in such flows and pressures being reached in less time and with greater accuracy than is possible with a single centrifugal blower unit. Additionally, the power draw and noise level can be low in a centrifugal blower system because the blower impellers do not require high rpm for their operation.

As shown in FIGS. 4P and 4Q, centrifugal blower system 402, the description of which applies to centrifugal blower system 473, includes first centrifugal blower unit 486 connected to second centrifugal blower unit 487 through duct 488. First blower unit 486 includes casing 489 having axial inlet 490 and radial outlet 491, impeller 492 disposed within casing 489 for drawing ambient air at a first pressure into axial inlet 490 and expelling air at a second higher pressure through radial outlet 491, and electric motor 493 for driving impeller 492. Second blower unit 487 includes casing 494 and, as shown by the cutaway section of duct 488 in FIG. 4P, impeller 495 disposed within casing 494 and driven by electrical motor 496, and axial inlet 497 for receiving gas discharged from outlet 491 of first blower unit 486. The second blower unit further includes radial outlet 498 and outlet gas stream housing 499, the discharge end of which can be connected to one end of a conduit, for example, main conduit 404 of liquid fuel CPOX reformer section 401 of FIG. 4A, as indicated by the dotted lines.

The arrows in FIGS. 4P and 4Q indicate the general direction of the ambient air through the radial outlet of each blower unit in the series of blowers constituting centrifugal blower system 402. As shown, for example, in FIG. 4P, the trajectory of the ambient air stream expelled through outlet 491 of first blower unit 486 and the trajectory of the ambient air stream expelled through outlet 498 of second blower unit 487 are not parallel to their respective outlets but are at some angle thereto. By arranging the geometry of duct 488 to receive the ambient air stream discharged through outlet 491 in such a manner that the stream remains approximately parallel to the interior walls of the duct, it can be possible to prevent or reduce the turbulence that would otherwise occur were the stream to impinge upon these walls. Turbulence can be advantageously minimized or avoided so as to reduce or eliminate it as a source of back pressure in a centrifugal blower system. For this same reason, it can be advantageous to arrange the angle of gas stream housing 499 so that its interior walls will be approximately parallel to the trajectory of the ambient air discharged through outlet 498 of second blower unit 487. The optimum geometry of the interior walls of a duct relative to the trajectory of its gas stream and the angle of offset of a gas stream housing can be readily determined for a given centrifugal blower system employing routine experimentation. In centrifugal blower system 402, interior, or guiding, surfaces of duct 488 and interior, or guiding, surfaces of gas stream housing 499 can be pitched at an angle $\alpha$ of from about 12° to about 20°, for example, from about 14° to about 18°, relative to outlets 491 and 498.

As additional embodiments of the present teachings, integrated liquid fuel CPOX reformer-fuel cell systems 500 of FIG. 5A, 520 of FIG. 5B, 540 of FIG. 5C and 560 of FIG. 5D, include most of the elements and features of, and operate in essentially the same way as, integrated liquid fuel CPOX reformer-fuel cell system 400 of FIGS. 4A-4H and therefore will be described only in respect of certain of their differences from the latter.

In integrated liquid fuel CPOX reformer-fuel cell system 500 illustrated in FIG. 5A, planar fuel cell section 501 includes centrifugal blower system 502, which introduces air both to the cathode side of the fuel cells and to afterburner 503 to support combustion of spent gases therein. Centrifugal blower system 504 introduces air into conduit 505 of liquid fuel CPOX reformer section 506, the air combining downstream with vaporized diesel to provide a gaseous CPOX reaction mixture. The gaseous CPOX reaction mixture then can undergo conversion within CPOX reactor units 507 to a hydrogen-rich reformate that subsequently flows to the anode (fuel) side of the fuel cells. During a steady-state mode of operation of integrated reformer-fuel cell system 500, heat contained within the hot combustion exhaust from afterburner 503 is transferred to air passing through conduit 505. In other aspects of its structure and in its modes of operation, integrated reformer-fuel cell system 500 is much like that of integrated reformer-fuel cell system 400 of FIG. 4A.

Integrated liquid fuel CPOX reformer-fuel cell system 520 illustrated in FIG. 5B possesses an especially compact configuration of its reformer section 521 and fuel cell section 522 owing to the disposition of a portion of the length of each tubular CPOX reactor unit 523 within a corresponding closed-ended tubular SOFC unit 524, such arrangement presenting a gaseous flow passageway 525 between the outer surface of the CPOX reactor unit and the inner, or anode, surface of the SOFC unit. Hydrogen rich reformate flowing from the CPOX reactor unit enters passageway 525 where it contacts the anode surface of the tubular SOFC unit. In other respects, the structure and operation of integrated reformer-fuel cell system 520 are similar to that of system 500 of FIG. 5A.

Integrated liquid fuel CPOX reformer-fuel cell system 540 illustrated in FIG. 5C includes a fuel cell section 541 of the monolithic type coupled to a reformer section 542 similar to that of system 400 of FIG. 4A. Operation of integrated reformer-fuel cell system 540 is similar to that of system 500 of FIG. 5A but without the afterburner heat recovery function of the latter.

Integrated liquid fuel CPOX reformer-fuel cell system 560 illustrated in FIG. 5D includes a fuel cell section 561 of the PEM type and a reformer section 562 where the carbon monoxide content of the hydrogen-rich reformate produced in reformer section is reduced by carbon monoxide reduction or similar device 563 to a level which is conducive to reliable operation of the fuel cell, for example, to a level which is low enough to avoid any appreciable poisoning of the PEM catalyst. In other respects, operation of integrated reformer-fuel cell system 560 is similar to that of system 400 of FIG. 4A.

Compared to gaseous reformable fuels such as methane, propane, butane, natural gas, petroleum gas, and the like, liquid fuels such as diesel, jet fuel and other distillates are less efficient sources of product reformate, generally undergoing CPOX with greater exothermicity. Means for cooling a CPOX reactor unit of a liquid fuel CPOX reformer of the present teachings, while optional, can be useful in providing further thermal management and control of the liquid fuel CPOX reformer. To provide such further degree of reformer control, CPOX reformers 600 and 650 of, respectively, FIGS. 6A and 6B, include heat exchangers for cooling their CPOX reactor units to within a preset range of temperature, for example, from about 750° C. to about 950° C.

As shown in FIG. 6A, CPOX reformer 600 includes centrifugal blower 601 for directing a coolant stream, for example, air at ambient temperature, against the exposed exterior surfaces of lower sections 602 of CPOX reactor units 603. In place of a centrifugal blower, any other suitable device for providing a coolant stream can be utilized, for example, a fan, an impeller, and the like.

Figure 6B:
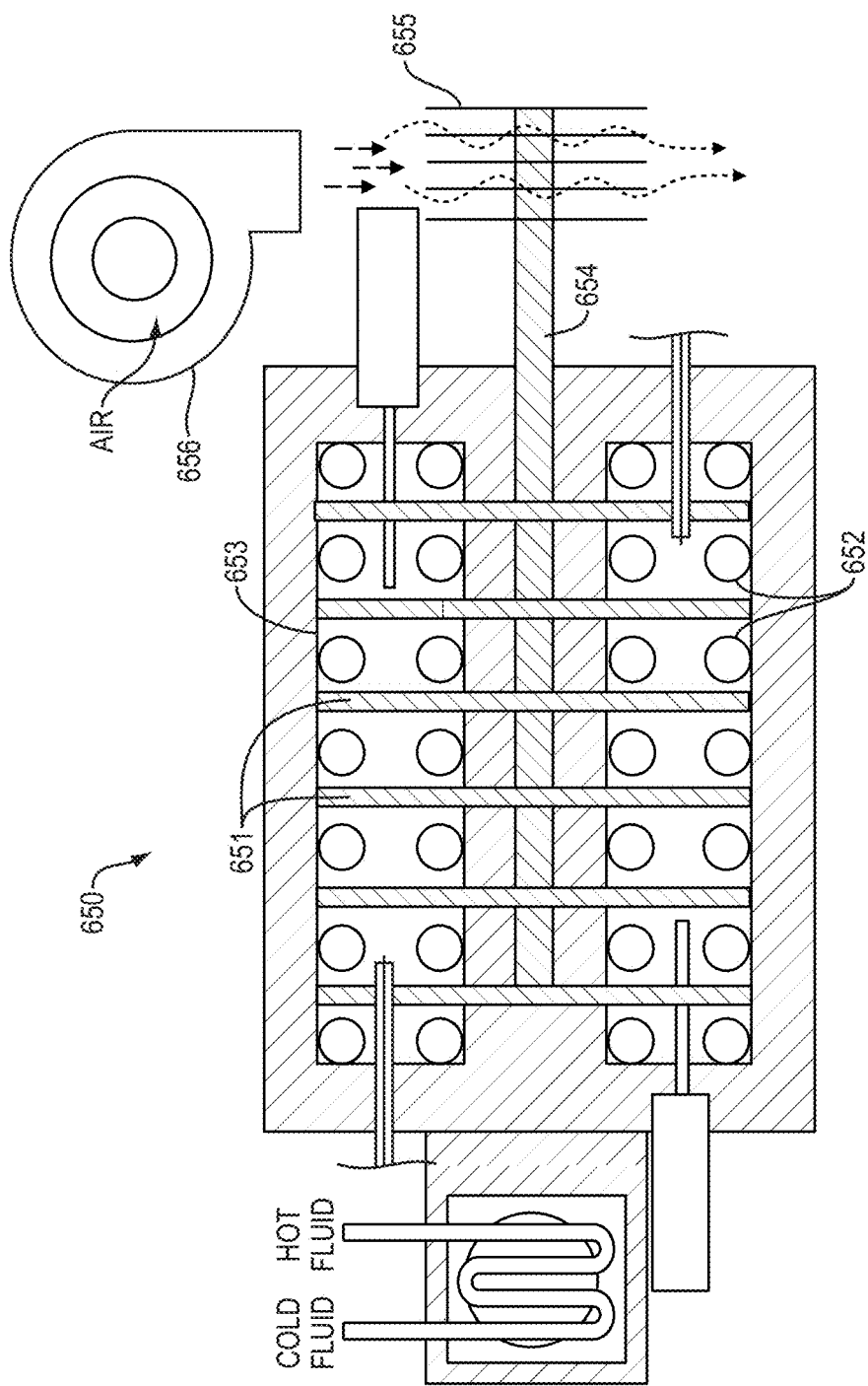

In CPOX reformer 650 of FIG. 6B, a heat conducting assembly includes variously configured and arranged heat-conducting members 651. Heat-conducting members can be provided, for example, as rods, plates, tubes, and the like, fabricated from materials having suitably high thermal conductivity, for example, metals (particularly copper and copper alloys), carbons, ceramics and composites, and the like. Heat-conducting members can conduct radiant heat, for example, heat radiated from the exposed exterior surfaces of CPOX reactor units 652 within chamber 653 to heat-conducting member 654, likewise fabricated from a material exhibiting high thermal conductivity such as copper, terminating in heat-radiative member 655, for example, the series of fins shown. Centrifugal blower unit 656 directs a coolant stream, for example, air at ambient temperature, against multiple fin-bearing heat-radiative member 655 to dissipate its heat.

Chamber 653 shown in FIGS. 6A and 6B can contain a pressurized fluid such as a pressurized gas that can act as a hydrogen barrier as discussed herein. Chamber 653 can be an air-tight chamber. As depicted, chamber 653 is generally located to include in the chamber the CPOX reaction zone (e.g., the section of the gas permeable wall including a CPOX catalyst) of each of the CPOX reactor units 652 as well as to include the main conduit, igniters and thermocouples (not labeled). As shown, although the chamber includes most of the CPOX reaction zone, one or more walls of the chamber can act as a hydrogen barrier where the CPOX reactor units traverse or extend through the walls, for example, above and below the interior of the chamber as shown. A pressurized fluid conduit such as a pressurized gas conduit (not shown) can provide operable fluid communication between the interior of the chamber and a source of pressurized or compressed fluid such as compressed air. The pressurization of the chamber can be controlled using the appropriate valve and pressure sensor assemblies to provide sufficient fluid pressure for an adequate hydrogen barrier.

Figure 7A:
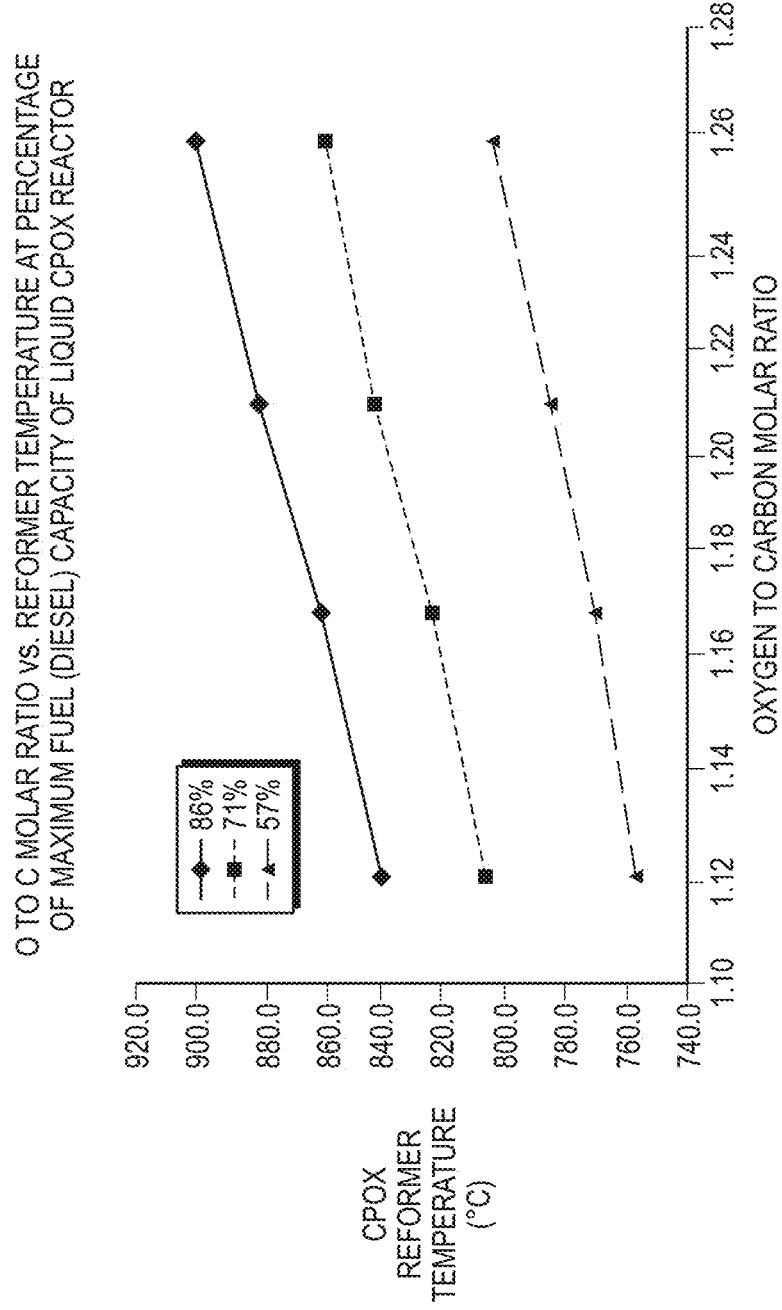
FIG. 7A presents graphical data showing the relationship between the molar ratio of oxygen to carbon of the CPOX reaction mixture on the CPOX reaction temperature within a liquid fuel CPOX reformer of the present teachings at varying percentages of maximum fuel (diesel) conversion capacity when the reformer is operating in the steady-state mode.

FIG. 7A presents graphical data demonstrating the relationship between the oxygen (O) to carbon (C) molar ratio of vaporized diesel fuel-air CPOX reaction mixtures and CPOX reaction temperature. As the data show, as the O to C molar ratio of the CPOX reaction mixture is gradually reduced, i.e., as the reaction mixture is adjusted from a relatively carbon-lean one to a relatively carbon-rich one, CPOX reaction temperature declines. These data hold several implications for optimized operations of a liquid fuel CPOX reformer in accordance with the present teachings.

To promote rapid heating of CPOX catalyst and, consequently, the onset of the gaseous phase CPOX reaction, gaseous CPOX reaction mixtures having higher O to C molar ratios (i.e., fuel-lean reaction mixtures) can be utilized during the start-up mode of operation of the reformer. The higher operating temperatures associated with fuel-lean CPOX reaction mixtures can facilitate a more rapid increase in CPOX catalyst temperature and reduced time to steady-state operation. Additionally, a fuel-lean ratio tends to help inhibit coke formation before the CPOX catalyst has attained its optimum temperature and become fully activated. Once the CPOX catalyst has reached a temperature of about 650° C. and above, the O to C molar ratio can be reduced as fuel flow is increased. Reducing the O to C molar ratio lowers the catalyst temperature and can enable more fuel to be processed without losing thermal control of the CPOX reactor units and in turn, the fuel vaporizer unit. The opposite action can be taken for the shut-down operation, i.e., fuel flow is reduced at a maintained O to C molar ratio. As the temperature of the CPOX reaction zones of the CPOX reactor units begin to approach or fall below a temperature resulting in coke formation, for example, below about 650° C., the O to C molar ratio can be increased to prevent or minimize coking as the CPOX catalyst deactivates. Typically, the CPOX reformer can be shut down when the temperature of the CPOX reaction mixture falls below about 500° C. The flow of oxygen-containing gas can be continued for up to about 15 to 20 seconds or so after fuel flow has been discontinued. Such a shut-down procedure can allow for vaporization and removal of fuel from the reformer that can be contained within a conduit or a section of fuel line between a fuel control valve and locus of introduction of the fuel into the conduit. This control characteristic can be influenced by various reformer components including the particular vaporizer system and controller unit components utilized in a specific reformer design.

The O to C molar ratio of the fuel-air CPOX reaction mixture can be controlled during the operation to tailor its output thermal conditions, with the understanding that changing the O to C molar ratio can result in changes to the quality and/or composition of the reformate. There is a range of O to C molar ratio that shifts from fuel-lean to fuel-rich as CPOX temperature increases above about 650° C. Different CPOX catalysts can affect the operational windows and CPOX temperatures. Additionally, different fuels (gaseous or liquid) can change the CPOX temperatures depending upon the efficiency of the reforming reactions.

Figure 7B:
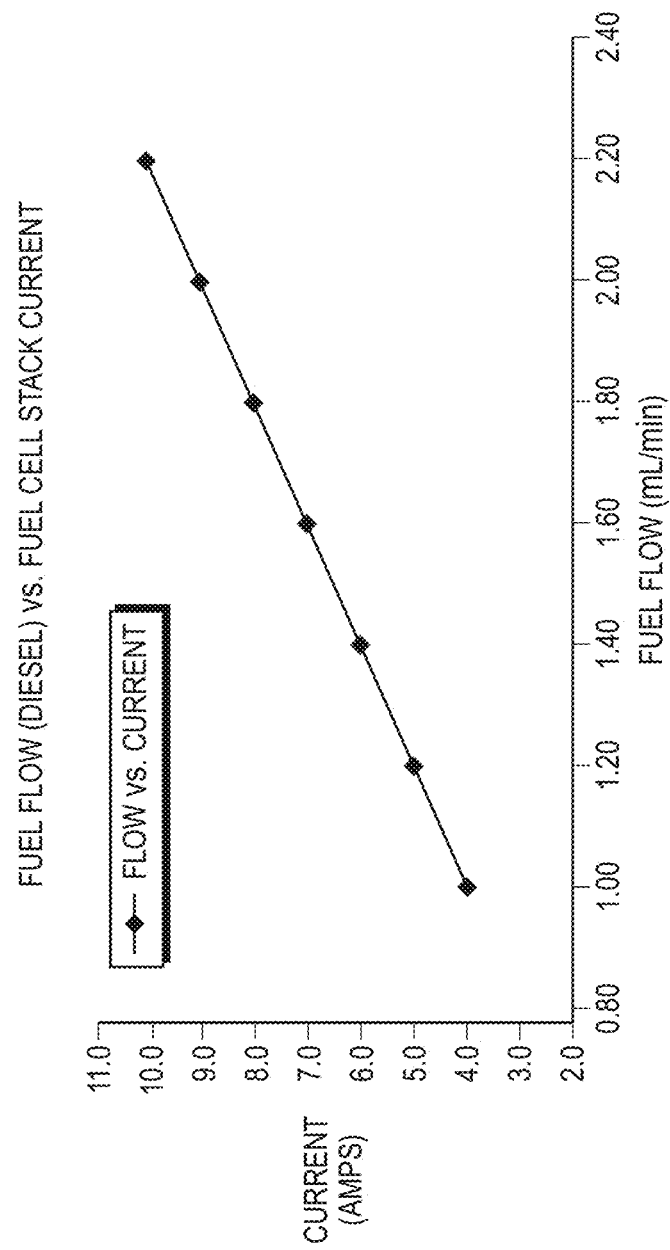
FIG. 7B presents graphical data showing the relationship between fuel (diesel) flow rate to the liquid fuel CPOX reformer section and current output of the fuel cell section of an integrated liquid fuel CPOX reformer-fuel cell system in accordance with the present teachings.

FIG. 7B presents graphical data showing the relationship of diesel fuel flow (mL/min) to the reformer section of an integrated CPOX reformer-fuel cell system in accordance with the present teachings, and current output (amps) from the fuel cell section of the integrated system.

Those skilled in the art, taking into account the various embodiments of the integrated liquid fuel CPOX reformers-fuel cell systems described herein and the principles of operation of the same, by employing routine experimental procedures can readily optimize the design of a particular integrated CPOX reformer-fuel cell system of desired liquid reformable fuel conversion and electrical power output capacities, structural characteristics, and mechanical properties in accordance with the present teachings.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

The invention claimed is:

1. An integrated liquid fuel CPOX reformer and fuel cell system, the integrated system comprising:
    an array of spaced-apart CPOX reactor units, each CPOX reactor unit comprising an elongate tube having a gas-permeable wall with an internal surface and an external surface, the gas-permeable wall enclosing an open gaseous flow passageway and defining an inlet and an outlet of the CPOX reactor unit, the open gaseous flow passageway being a hollow bore extending from the inlet to the outlet of the CPOX reactor unit, wherein a CPOX reactor unit is in thermal communication with at least the adjacent CPOX reactor unit(s) in the array, and
    a CPOX catalyst disposed within and/or comprising the structure of at least a section of the gas-permeable wall;
    a vaporizer in fluid communication with inlets of the CPOX reactor units;
    an igniter in thermal communication with the CPOX catalyst of at least one CPOX reactor unit;
    a fuel cell unit comprising an anode, a cathode, and an electrolyte disposed therebetween, wherein the anode is in fluid communication with the outlet of the CPOX reactor unit and the cathode is in fluid communication with an oxygen-containing gas; and
    a current collector electrically coupled to the anode and the cathode of the fuel cell unit.

2. The integrated system of claim 1, wherein a hydrogen barrier is associated with the external surface of at least the CPOX catalyst-containing wall section of the CPOX reactor unit.

3. The integrated system of claim 2, wherein the hydrogen barrier comprises pressurized gas.

4. The liquid CPOX reformer of claim 2 wherein the hydrogen barrier is attached or adhered to an outer layer or external surface of the gas-permeable wall for at least that portion of the length of a CPOX reactor unit corresponding to its CPOX reaction zone.

5. The liquid fuel CPOX reformer of claim 4 wherein the material of the hydrogen barrier is selected from the group consisting of aluminum, nickel, molybdenum, tin, chromium, alumina, recrystallized alumina, aluminides, alumino-silicates, titania, titanium carbide, titanium nitride, boron nitride, magnesium oxide, chromium oxide, zirconium phosphate, ceria, zirconia, mulite, admixtures thereof and layered combinations thereof.

6. The integrated system of claim 1, wherein the maximum distance between adjacent CPOX reactor units is that distance beyond which the heat from an operating CPOX reactor unit operating at a predetermined minimum temperature fails to initiate a CPOX reaction in an adjacent CPOX reactor unit and/or during a steady-state mode of operation, the temperature of the array of spaced-apart CPOX reactor units falls below a predetermined minimum array temperature; and the minimum distance between adjacent CPOX reactor units is that distance below which the temperature at an outlet of a CPOX reactor unit is greater than a predetermined maximum temperature.

7. The integrated system of claim 6, wherein the predetermined maximum temperature is a temperature that is tolerable by an inlet of a fuel cell stack in thermal and fluid communication with an outlet of a CPOX reactor unit.

8. The integrated system of claim 6, wherein the predetermined maximum temperature is about 900° C.

9. The integrated system of claim 6, wherein the predetermined minimum array temperature is about 600° C.

10. The integrated system of claim 1 comprising a source of liquid reformable fuel in fluid communication with the vaporizer.

11. The integrated system of claim 1 comprising more than one igniter, wherein each igniter is positioned in thermal communication with a CPOX catalyst of at least one CPOX reactor unit.

12. The integrated system of claim 1, comprising a source of oxygen-containing gas, wherein the source of oxygen-containing gas is in fluid communication with the vaporizer and in fluid communication with a mixing zone downstream of the vaporizer.

13. The integrated system of claim 12, comprising a first source of oxygen-containing gas in fluid communication with the vaporizer and a second source of oxygen-containing gas in fluid communication with a mixing zone downstream of the vaporizer.

14. The integrated system of claim 1, comprising an oxygen-containing gas conduit having a branch conduit, the oxygen-containing gas conduit providing fluid communication between a source of oxygen-containing gas and the vaporizer and the branch conduit providing fluid communication between the source of oxygen-containing gas and a mixing zone downstream of the vaporizer, wherein the oxygen-containing gas conduit and the branch conduit divide the delivery of an oxygen-containing gas from the source of oxygen-containing gas to the vaporizer and the mixing zone downstream of the vaporizer.

15. The integrated system of claim 1, comprising:
    a conduit comprising an oxygen-containing gas inlet and a gaseous CPOX reaction mixture outlet located downstream from an outlet of the vaporizer, wherein the conduit provides fluid communication between the oxygen-containing gas inlet and the gaseous CPOX reaction mixture outlet, and the gaseous CPOX reaction mixture outlet is in fluid communication with the inlets of the CPOX reactor units;
    a first source of heat comprising an electric heater, the first source of heat being disposed in the conduit at a location downstream from the oxygen-containing gas inlet and upstream from the outlet of the vaporizer; and
    a second source of heat comprising heat of exotherm from the liquid fuel CPOX reformer and/or the fuel cell unit, the second source of heat in thermal communication with the conduit and at a location downstream from the first source of heat and upstream from or coincident with the outlet of the vaporizer;
    wherein the outlet of the vaporizer is in fluid communication with the conduit.

16. The integrated system of claim 15, wherein the vaporizer is disposed in the conduit.

17. The integrated system of claim 15, comprising a third source of heat, the third source of heat comprising an electric heater and being disposed in the conduit at a location downstream from the first source of heat and upstream from the outlet of the vaporizer.

18. The integrated system of claim 15, comprising a thermally-regulating assembly, the thermally-regulating assembly comprising a heater and a cooler, the heater and/or the cooler being disposed in the conduit and/or in thermal communication with the conduit at a location downstream from the first source of heat and upstream from the outlet of the vaporizer.

19. The integrated system of claim 15, wherein the conduit comprises an inlet for gaseous reformable fuel, and a CPOX catalyst-containing section downstream from the gaseous reformable fuel inlet and the oxygen-containing gas inlet and upstream from the outlet of the vaporizer.

20. The integrated system of claim 15, wherein the vaporizer comprises a liquid reformable fuel inlet, and the liquid fuel CPOX reformer comprises a controller, the controller in operable communication with a thermocouple located in the conduit at or downstream from the outlet of the vaporizer, a thermocouple located in the conduit upstream of the outlet of the vaporizer, an oxygen-containing gas flow meter located in the conduit upstream of the vaporizer, a liquid reformable fuel flow meter located at or upstream of the vaporizer and in fluid communication with a source of liquid reformable fuel, a source of oxygen-containing gas, a source of liquid reformable fuel, the first source of heat, the second source of heat, and the third source of heat and/or thermally-regulating assembly, when present.

21. The integrated system of claim 1, wherein the vaporizer comprises or is a fuel spreader.

22. The integrated system of claim 1, wherein the fuel cell unit is a multi-tubular solid oxide fuel cell.

23. The integrated system of claim 1, wherein the anode of a fuel cell unit is in fluid communication with the outlet of a CPOX reactor unit via a conduit and the cathode of a fuel cell unit is in fluid communication with an oxygen-containing gas via another conduit.

24. The integrated system of claim 1, wherein the outlet of a CPOX reactor unit is connected directly to an inlet of the fuel cell unit, wherein the inlet of the fuel cell unit is in fluid communication with the anode of the fuel cell unit.

25. A method of CPOX reforming a liquid reformable fuel to a hydrogen-rich reformate and converting electrochemically a hydrogen-rich reformate into electricity, the method comprising:
    introducing a gaseous CPOX reaction mixture comprising a vaporized liquid reformable fuel into inlets of CPOX reactor units, the vaporized liquid reformable fuel being obtained by vaporization of a liquid reformable fuel by a vaporizer, wherein the CPOX reactor units form an array of spaced-apart CPOX reactor units, each CPOX reactor unit comprising an elongate tube having a wall with an internal surface and an external surface, the wall enclosing an open gaseous flow passageway and defining an inlet and an outlet of the CPOX reactor unit, the open gaseous flow passageway being a hollow bore extending from the inlet to the outlet of the CPOX reactor unit,
        wherein a CPOX reactor unit is in thermal communication with at least the adjacent CPOX reactor unit(s) in the array,
        a CPOX catalyst disposed within and/or comprising the structure of at least a section of the wall, and
        the CPOX catalyst-containing wall section is gas-permeable to allow gaseous CPOX reaction mixture to diffuse therein and product hydrogen-rich reformate to diffuse therefrom;
    initiating catalytic partial oxidation of the gaseous CPOX reaction mixture by an igniter in thermal communication with the CPOX catalyst to begin production of a hydrogen-rich reformate in at least one CPOX reactor unit;
    maintaining catalytic partial oxidation of the gaseous CPOX reaction mixture in the CPOX reactor units of the array to produce a hydrogen-rich reformate; and
    converting within a fuel cell unit, the fuel cell unit comprising an anode, a cathode, and an electrolyte disposed therebetween, wherein the anode is in fluid communication with the outlet of the CPOX reactor unit and the cathode is in fluid communication with an oxygen-containing gas, the hydrogen-rich reformate to electricity collected by a current collector.

26. The method of claim 25, wherein a hydrogen barrier is associated with the external surface of at least the CPOX catalyst-containing wall section of a CPOX rector unit.

27. The method of claim 25, wherein the maximum distance between adjacent CPOX reactor units is that distance beyond which the heat from an operating CPOX reactor unit operating at a predetermined minimum temperature fails to initiate a CPOX reaction in an adjacent CPOX reactor unit and/or during a steady-state mode of operation, the temperature of a CPOX reactor unit falls below a predetermined minimum array temperature; and the minimum distance between adjacent CPOX reactor units is that distance below which the temperature at an outlet of a CPOX reactor unit is greater than a predetermined maximum temperature.

28. The method of claim 25, wherein initiating catalytic partial oxidation comprises:
   initiating a CPOX reaction in one CPOX reactor unit;
   transferring the heat from the CPOX reaction to an adjacent CPOX reactor unit to initiate a CPOX reaction therein; and
   repeating transferring the heat to initiate a CPOX reaction in each of the CPOX reactors of the array.

29. The method of claim 25, wherein initiating catalytic partial oxidation comprises initiating more than a single igniter to initiate catalytic partial oxidation of the gaseous CPOX reaction mixture in each of the CPOX reactor units.

30. The method of claim 25, wherein maintaining catalytic partial oxidation of the gaseous CPOX reaction mixture comprises transferring heat among the CPOX reactor units to maintain a predetermined minimum array temperature.

31. The method of claim 30, wherein the predetermined minimum array temperature is substantially uniform across the array of CPOX reactor units.

32. The method of claim 25, comprising:
   mixing an oxygen-containing gas and a vaporized liquid reformable fuel to provide a gaseous CPOX reaction mixture having an oxygen (O):carbon (C) ratio; and
   mixing additional oxygen-containing gas with the gaseous CPOX reaction mixture to increase the O:C ratio of the gaseous CPOX reaction mixture prior to introducing the gaseous CPOX reaction mixture having an increased O:C ratio into the inlets of the CPOX reactor units.

33. The method of claim 32, wherein mixing an oxygen-containing gas and a vaporized liquid reformable fuel occurs in, coincident with or downstream from a vaporizer, and the amount of heat required to heat the vaporizer to its operating temperature is less than the amount of heat required in the absence of the step of mixing additional oxygen-containing gas with the gaseous CPOX reaction mixture, and the method provides a gaseous CPOX reaction mixture having the increased O:C ratio to the inlets of the CPOX reactor units.

34. The method of claim 25, wherein introducing a gaseous CPOX reaction mixture comprises:
   introducing an oxygen-containing gas into a conduit for routing fluids toward the inlet of a CPOX reformer unit;
   heating a stream of the oxygen-containing gas with a first source of heat comprising an electric heater disposed in the conduit to provide a stream of heated oxygen-containing gas; and
   introducing a liquid reformable fuel into the stream of heated oxygen-containing gas in, through, at or past the vaporizer to provide the gaseous CPOX reaction mixture.

35. The method of claim 34, comprising:
   heating the stream of the oxygen-containing gas and/or the stream of heated oxygen-containing gas with a second source of heat, the second source of heat in thermal communication with the conduit and comprising heat of exotherm from the CPOX reactor units and/or the fuel cell unit.

36. The method of claim 34, comprising:
   heating and/or cooling upstream of the outlet of the vaporizer the stream of oxygen-containing gas and/or the stream of heated oxygen-containing gas with a thermally-regulating assembly disposed in or in thermal communication with the conduit.

37. The method of claim 36, comprising:
   discontinuing heating the stream of oxygen-containing gas with the first source of heat; and
   reducing or discontinuing heating the stream of oxygen-containing gas and/or the stream of heated oxygen-containing gas with the thermally-regulated assembly.

38. The method of claim 34, comprising:
   monitoring the flow rate of the stream of heated oxygen-containing gas, the flow rate of liquid reformable fuel, the temperature of the vaporizer, the temperature of the stream of heated oxygen-containing gas and the temperature of the liquid reformable fuel; and
   controlling the vaporization of the liquid reformable fuel in response to feedback from the monitoring.

39. The method of any claim 25, wherein converting within a fuel cell unit the hydrogen-rich reformate to electricity comprises:
   contacting the hydrogen-rich reformate with an anode of the fuel cell unit; and
   contacting an oxygen-containing gas with a cathode of the fuel cell unit.

40. A method of CPOX reforming of liquid reformable fuel to produce hydrogen-rich reformate and electrochemically converting the reformate within a fuel cell to electricity, the method comprising:
   a) in a start-up mode:
   (i) introducing heated gaseous CPOX reaction mixture comprising oxygen-containing gas and vaporized liquid reformable fuel into the inlet of each of a plurality of spaced-apart CPOX reactor units, the vaporized liquid reformable fuel being obtained by vaporization of a liquid reformable fuel by a vaporizer, each reactor unit comprising an elongate tube having an inlet for gaseous CPOX reaction mixture, an outlet for hydrogen-rich reformate, a wall with internal and external surfaces, the wall enclosing an open gaseous flow passageway, the open gaseous flow passageway being a hollow bore extending from the inlet to an outlet of the CPOX reactor unit, with at least a section of the wall having CPOX catalyst disposed therein and/or comprising its structure, such catalyst-containing wall section and open gaseous flow passageway enclosed thereby defining a gaseous phase CPOX reaction zone, the catalyst-containing wall section being gas-permeable to allow gaseous CPOX reaction mixture to diffuse therein and product hydrogen-rich reformate to diffuse therefrom while remaining stable under CPOX reaction conditions,
   (ii) initiating CPOX of the gaseous CPOX reaction mixture within the CPOX reaction zones of the CPOX reactor units thereby commencing production of gaseous hydrogen-rich reformate, and
   (iii) conveying hydrogen-rich reformate produced in step (ii) to a fuel cell comprising at least one fuel cell unit, the fuel cell unit comprising an anode component, a cathode component, and an electrolyte disposed therebetween, such that reformate contacts the anode component of the fuel cell unit while at the same time conveying oxygen-containing gas to the fuel cell such that the gas contacts the cathode component of the fuel cell unit, the reformate undergoing conversion within the fuel cell unit to produce electricity collected by a current collector; and, b) in a steady-state mode:

(iv) introducing heated gaseous CPOX reaction mixture into the inlets of the CPOX reactor units, (v) discontinuing CPOX initiating step (ii) prior to, during or following step (iv) while maintaining the CPOX reaction within the CPOX reaction zones of the CPOX reactor units thereby continuing the production of hydrogen-rich reformate, and (vi) conveying hydrogen-rich reformate produced in step (v) to the anode component of the at least one fuel cell unit and at the same time conveying oxygen-containing gas to the cathode component of the at least one fuel cell unit, the reformate continuing to undergo conversion within the fuel cell unit to produce electricity collected by the current collector.

41. A method of CPOX reforming of liquid reformable fuel to produce hydrogen-rich reformate and electrochemically converting the reformate within a fuel cell to electricity, the method comprising:

a) in a start-up mode:

(xiv) introducing oxygen-containing gas into a conduit for routing gas toward the inlet of each of a plurality of CPOX reactor units, the conduit comprising an inlet for oxygen-containing gas, an inlet for liquid reformable fuel and an outlet for heated gaseous CPOX reaction mixture in gaseous flow communication with the inlets of the CPOX reactor units, each CPOX reactor unit comprising an elongate tube having an inlet for gaseous CPOX reaction mixture, an outlet for hydrogen-rich reformate, a wall with internal and external surfaces, the wall enclosing an open gaseous flow passageway, the open gaseous flow passageway being a hollow bore extending from the inlet to an outlet of the CPOX reactor unit, with at least a section of the wall having CPOX catalyst disposed therein and/or comprising its structure, such catalyst-containing wall section and open gaseous flow passageway enclosed thereby defining a gaseous phase CPOX reaction zone, the catalyst-containing wall section being gas-permeable to allow gaseous CPOX reaction mixture to diffuse therein and product hydrogen-rich reformate to diffuse therefrom while remaining structurally stable under CPOX reaction conditions, (xv) heating the oxygen-containing gas, (xvi) introducing liquid reformable fuel into the conduit, (xvii) vaporizing the liquid reformable fuel introduced into the conduit by a vaporizer, the vaporized fuel combining with heated oxygen containing gas from step (xv) to provide heated gaseous CPOX reaction mixture, (xviii) introducing heated gaseous CPOX reaction mixture from step (xvii) into the inlets of the CPOX reactor units, (xix) initiating CPOX of the gaseous CPOX reaction mixture by an igniter in thermal communication with the CPOX catalyst within the CPOX reaction zones of the CPOX reactor units thereby commencing the production of hydrogen-rich reformate, and (xx) conveying hydrogen-rich reformate produced in step (xix) to a fuel cell comprising at least one fuel cell unit, the fuel cell unit comprising an anode component, a cathode component, and an electrolyte disposed therebetween, such that reformate contacts the anode component of the fuel cell unit while at the same time conveying oxygen-containing gas to the fuel cell such that the gas contacts the cathode component of the fuel cell unit, the reformate undergoing conversion within the fuel cell unit to produce electricity collected by a current collector; and, b) in a steady-state mode:

(xxi) introducing oxygen-containing gas into the conduit, the oxygen-containing gas having been heated prior to or following its introduction into the conduit, (xxii) introducing liquid reformable fuel into the conduit, (xxiii) vaporizing the liquid reformable fuel by a vaoprizer, the vaporized fuel combining with heated oxygen-containing gas from step (xxi) to provide heated gaseous CPOX reaction mixture, (xxiv) introducing heated gaseous CPOX reaction mixture from step (x) into the inlets of the CPOX reactor units, (xxv) discontinuing initiating step (xix) prior to, during or following step (xxiv) while maintaining the CPOX reaction within the CPOX reaction zones of the CPOX reactor units thereby continuing the production of hydrogen-rich reformate, and (xxvi) conveying hydrogen-rich reformate produced in step (xxv) to the anode component of the at least one fuel cell unit and at the same time conveying oxygen-containing gas to the cathode component of the at least one fuel cell unit, the reformate continuing to undergo conversion within the fuel cell unit to produce electricity collected by the current collector.

* * * * *